US010194074B2

(12) United States Patent
Kinoshita

(10) Patent No.: US 10,194,074 B2
(45) Date of Patent: Jan. 29, 2019

(54) IMAGING SYSTEM, WARNING GENERATION DEVICE AND METHOD, IMAGING DEVICE AND METHOD, AND PROGRAM

(71) Applicant: Sony Corporation, Tokyo (JP)

(72) Inventor: Masaya Kinoshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/037,160

(22) PCT Filed: Jan. 6, 2015

(86) PCT No.: PCT/JP2015/050094
§ 371 (c)(1),
(2) Date: May 17, 2016

(87) PCT Pub. No.: WO2015/107928
PCT Pub. Date: Jul. 23, 2015

(65) Prior Publication Data
US 2016/0295107 A1 Oct. 6, 2016

(30) Foreign Application Priority Data

Jan. 17, 2014 (JP) .................................. 2014-006725

(51) Int. Cl.
H04N 5/232 (2006.01)
G03B 17/18 (2006.01)
(Continued)

(52) U.S. Cl.
CPC ......... H04N 5/23222 (2013.01); G03B 17/18 (2013.01); H04N 5/2351 (2013.01);
(Continued)

(58) Field of Classification Search
CPC ............................ H04N 5/23222; G03B 17/18
See application file for complete search history.

(56) References Cited

U.S. PATENT DOCUMENTS 4,737,847 A * 4/1988 Araki ............... G08B 13/19602
348/161
6,064,429 A * 5/2000 Belk ..................... G01N 21/94
348/128
(Continued)

FOREIGN PATENT DOCUMENTS

JP 63-309936 A 12/1988
JP 2003-262909 A 9/2003
(Continued)

Primary Examiner — Cynthia Segura
(74) Attorney, Agent, or Firm — Michael Best & Friedrich LLP

(57) ABSTRACT

The present technology relates to an imaging system, a warning generation device and method, an imaging device and method, and a program capable of more simply checking an imaging situation.
A camera-control detection processing unit of the imaging device performs a detection process for various types of control based on a captured image, and an image quality control processing unit detects occurrence of abnormality corresponding to each cause based on the result of the detection process. A warning determination processing unit generates a warning flag indicating whether or not abnormality occurs based on the detection result by the image quality control processing unit, and a wireless transmission unit transmits the warning flag to a warning generation device. A wireless reception unit of the warning generation device receives the warning flag, and a warning means control processing unit instructs warning according to the warning flag. A display processing unit displays a warning icon on a display unit according to the instruction of the warning means control processing unit. The present technology can be applied to an action camera.

19 Claims, 34 Drawing Sheets

(51) Int. Cl.
*H04N 5/235* (2006.01)
*H04N 5/243* (2006.01)
*H04N 9/73* (2006.01)

(52) U.S. Cl.
CPC ......... *H04N 5/2352* (2013.01); *H04N 5/2353* (2013.01); *H04N 5/23212* (2013.01); *H04N 5/23258* (2013.01); *H04N 5/23287* (2013.01); *H04N 5/23293* (2013.01); *H04N 5/243* (2013.01); *H04N 9/735* (2013.01); *G03B 2205/0007* (2013.01); *G03B 2217/005* (2013.01)

(56) References Cited

U.S. PATENT DOCUMENTS

| | | | | |
|---|---|---|---|---|
| 7,556,442 | B2* | 7/2009 | Frantz | G03B 7/26 257/428 |
| 8,068,639 | B2* | 11/2011 | Ishiwata | G06K 9/00228 382/103 |
| 8,121,404 | B2* | 2/2012 | Xiao | G03B 7/091 348/229.1 |
| 8,798,345 | B2* | 8/2014 | Sasaki | G06F 19/345 382/128 |
| 9,633,669 | B2* | 4/2017 | Salvador | G10L 21/0202 |
| 2004/0141064 | A1* | 7/2004 | Ezawa | H04M 1/021 348/207.99 |
| 2005/0083432 | A1* | 4/2005 | Honda | H04N 5/232 348/362 |
| 2005/0174229 | A1* | 8/2005 | Feldkamp | G08B 13/19656 340/506 |
| 2006/0044452 | A1* | 3/2006 | Hagino | G02B 7/28 348/345 |
| 2008/0013851 | A1* | 1/2008 | Ishiwata | G06K 9/00228 382/255 |
| 2008/0070623 | A1* | 3/2008 | Ogawa | H04N 5/232 455/556.1 |
| 2009/0109292 | A1* | 4/2009 | Ennis | A42B 3/042 348/158 |
| 2009/0284637 | A1* | 11/2009 | Parulski | H04N 1/00183 348/333.12 |
| 2011/0057783 | A1* | 3/2011 | Yagi | B60R 1/00 340/436 |
| 2011/0074954 | A1* | 3/2011 | Lin | H04N 7/181 348/148 |
| 2011/0261176 | A1* | 10/2011 | Monaghan, Sr. | G02B 27/017 348/61 |
| 2012/0206262 | A1* | 8/2012 | Grasso | A63F 13/12 340/540 |
| 2012/0242844 | A1* | 9/2012 | Walker | G11B 27/034 348/207.1 |
| 2013/0107062 | A1* | 5/2013 | Okazaki | H04N 5/23203 348/207.1 |
| 2013/0188044 | A1* | 7/2013 | Tsou | H04N 7/181 348/143 |
| 2013/0258122 | A1* | 10/2013 | Keane | H04N 5/23258 348/208.4 |
| 2013/0330088 | A1* | 12/2013 | Oshima | H04B 10/11 398/130 |
| 2014/0049636 | A1* | 2/2014 | O'Donnell | G08C 17/02 348/143 |
| 2015/0334285 | A1* | 11/2015 | Zhang | H04N 5/23222 348/211.2 |
| 2016/0119617 | A1* | 4/2016 | Sagar | H04N 5/23222 348/187 |
| 2016/0212326 | A1* | 7/2016 | Kang | H04N 5/23212 |
| 2016/0295206 | A1* | 10/2016 | Tanaka | H04N 5/361 |
| 2016/0330366 | A1* | 11/2016 | Kinoshita | H04N 5/23212 |
| 2017/0213451 | A1* | 7/2017 | Potucek | A61H 33/005 |

FOREIGN PATENT DOCUMENTS

| | | |
|---|---|---|
| JP | 2005-062469 A | 3/2005 |
| JP | 2006-325150 A | 11/2006 |
| JP | 2008-011473 A | 1/2008 |

* cited by examiner

IMAGING SYSTEM, WARNING GENERATION DEVICE AND METHOD, IMAGING DEVICE AND METHOD, AND PROGRAM

TECHNICAL FIELD

The present technology relates to an imaging system, a warning generation device and method, an imaging device and method, and a program, and more particularly, an imaging system, a warning generation device and method, an imaging device and method, and a program capable of more simply grasping imaging situation.

BACKGROUND ART

In recent years, as one of digital video cameras, a camera called an action camera having impact resistance and water resistance has appeared. The camera is also called a wearable camera because of its features. The camera is mounted on a body of a user through a mount to perform imaging, so that imaging is available at such an angle or in such a situation that the imaging cannot be performed in a camera of traditional examples.

In order to maintain the impact resistance or the water resistance, a considerable number of the action cameras are assumed to be used with a compact size and in a state that the action camera is accommodated in a housing, or in order to perform imaging in a state that the action camera is attached on a user's body or others, in most cases, a display device for the captured image is not mounted.

Among the cameras, although there is an action camera where the display device is mounted, in order to maintain the size of the action camera, a display device having relatively low resolution, size, and image quality in comparison with recording image quality is used. As a result, although the captured image is displayed on the display device mounted on the action camera, the user can merely check which side is imaged.

In this manner, a display device is not mounted on the action camera, or otherwise, a display device having an insufficient quality is merely mounted. Therefore, although a photographing person can grasp whether or not recording is performed by a tally lamp or the like, the person cannot check whether or not the imaging is performed in a desired imaging situation such as an angle of view, exposure, focal position, and white balance.

In recent years, a method of transmitting a captured image to a separate display device of a smartphone or the like by wireless communication of a short distance and checking an angle of view by the external display device has been proposed and commercialized (for example, refer to Patent Document 1).

CITATION LIST

Patent Document

Patent Document 1: Japanese Patent Application Laid-Open No. 2006-325150

SUMMARY OF THE INVENTION

Problems to be Solved by the Invention

However, in cases of using an action camera, it is actually difficult to continuously check a situation by an external display device during the imaging.

Therefore, although recording is started with confidence in an appropriate imaging situation before the starting of the recording, in the middle of the imaging, the direction of the action camera is greatly changed or a situation of a subject is greatly changed, and thus, focus, exposure, white balance, or hand shaking correction is no longer automatically tracked. However, a photographing person may not recognize this situation until checking the captured image again. Accordingly, an opportunity of imaging is lost, or the photographing person is under stress.

As described, it is preferable that, during the imaging of a compact imaging device such as an action camera, a user can more simply grasp an imaging situation.

By taking into consideration the above-described problems, the present technology is to allow the imaging situation to be more simply grasped.

Solutions to Problems

An imaging system according to a first aspect of the present technology includes: an imaging device; and a warning generation device, wherein the imaging device includes: an imaging unit which images an image to be captured; a detection unit which monitors an imaging situation of the captured image and detects abnormality associated with the imaging situation; and a transmission unit which transmits information representing a detection result of the abnormality to the warning generation device, and the warning generation device includes: a reception unit which receives the information representing the detection result of the abnormality transmitted from the transmission unit; a warning means control processing unit which instructs warning based on the information representing the detection result of the abnormality; and a warning unit which issues the warning according to the instruction of the warning by the warning means control processing unit.

According to the first aspect of the present technology, in an imaging system including an imaging device and a warning generation device, an image to be captured is imaged by the imaging device, an imaging situation of the captured image is monitored, abnormality associated with the imaging situation is detected, and information representing a detection result of the abnormality is transmitted to the warning generation device. In the warning generation device, the information representing the detection result of the abnormality is received, warning is instructed based on the information representing the detection result of the abnormality, and the warning is issued according to the instruction of the warning.

A warning generation device according to a second aspect of the present technology includes: a reception unit which receives information which is transmitted from an imaging device imaging an image to be captured and represents a detection result of abnormality associated with an imaging situation of the captured image; a warning means control processing unit which instructs warning based on the information representing the detection result of the abnormality; and a warning unit which issues the warning according to the instruction of the warning by the warning means control processing unit.

The warning unit may issue the warning which is different according to types of the abnormality.

The abnormality associated with the imaging situation may be at least one of abnormality associated with exposure control, abnormality associated with white balance control, abnormality associated with focus control, abnormality associated with hand shaking correction, abnormality associated with imaging direction, abnormality associated with face detection, and abnormality associated with battery.

The warning unit may issue the warning by performing warning display.

The warning unit may issue the warning by outputting audio.

The warning unit may issue the warning by vibrating.

The warning unit may issue the warning by emitting light.

The reception unit may further receive the captured image from the imaging device, and the warning generation device may further include a display unit which displays the captured image.

The reception unit may receive information representing the detection result of the abnormality in a wireless manner.

A warning generating method or a program according to the second aspect of the present technology includes: a reception step of receiving information which is transmitted from an imaging device imaging an image to be captured and represents a detection result of abnormality associated with an imaging situation of the captured image; a warning means control processing step of instructing warning based on the information representing the detection result of the abnormality; and a warning step of issuing the warning according to the instruction of the warning by the warning means control processing step.

According to the second aspect of the present technology, information which is transmitted from an imaging device imaging an image to be captured and represents a detection result of abnormality associated with an imaging situation of the captured image is received, waning is instructed based on information representing the detection result of the abnormality, and the warning is issued according to the instruction of the warning.

An imaging device according to a third aspect of the present technology include: an imaging unit which images an image to be captured; a detection unit which monitors an imaging situation of the captured image and detects abnormality associated with the imaging situation; and a transmission unit which transmits information representing a detection result of the abnormality to the warning generation device.

An imaging method or a program according to the third aspect of the present technology includes: an imaging step of imaging an image to be captured; a detection step of monitoring an imaging situation of the captured image and detecting abnormality associated with the imaging situation; and a transmission step of transmitting information representing a detection result of the abnormality to a warning generation device which issues warning of occurrence of the abnormality.

According to the third aspect of the present technology, an image to be captured is imaged, an imaging situation of the captured image is monitored, abnormality associated with an imaging situation is detected, and information representing a detection result of the abnormality is transmitted to a warning generation device issuing warning of occurrence of the abnormality.

Effects of the Invention

According to the first to third aspects of the present technology, it is possible to more simply grasp the imaging situation.

Furthermore, the effects described herein are not necessarily limited, but any one of the effects described in the present disclosure can be obtained.

MODE FOR CARRYING OUT THE INVENTION

Hereinafter, embodiments to which the present technology is applied will be described with reference to the drawings.

First Embodiment

Configuration Example of Outer Appearance of Imaging System

First, an overview of the present technology will be described.

The present technology is to notify a change of imaging situation of an imaging device, that is, occurrence of abnormality thereof to a user who is a photographing person by constantly monitoring the imaging situation of the imaging device and issuing warning by a device mounted on a main body of the imaging device or a body separated from the imaging device in the case where the imaging situation is deviated from a predefined specified imaging situation. By doing so, the user can more simply grasp the imaging situation without constantly monitoring the captured image, so that it is possible to reduce user's stress and to reduce loss of imaging opportunities.

The present technology can be applied to a compact digital video camera called an action camera, or other entire devices capable of capturing an image and being equipped with no display device or with only a display device having insufficient quality. Hereinafter, an example where the present technology is applied to an imaging system configured with an imaging device such as an action camera and a warning generation device of a multi-functional mobile phone or the like will be described.

Figure 1:
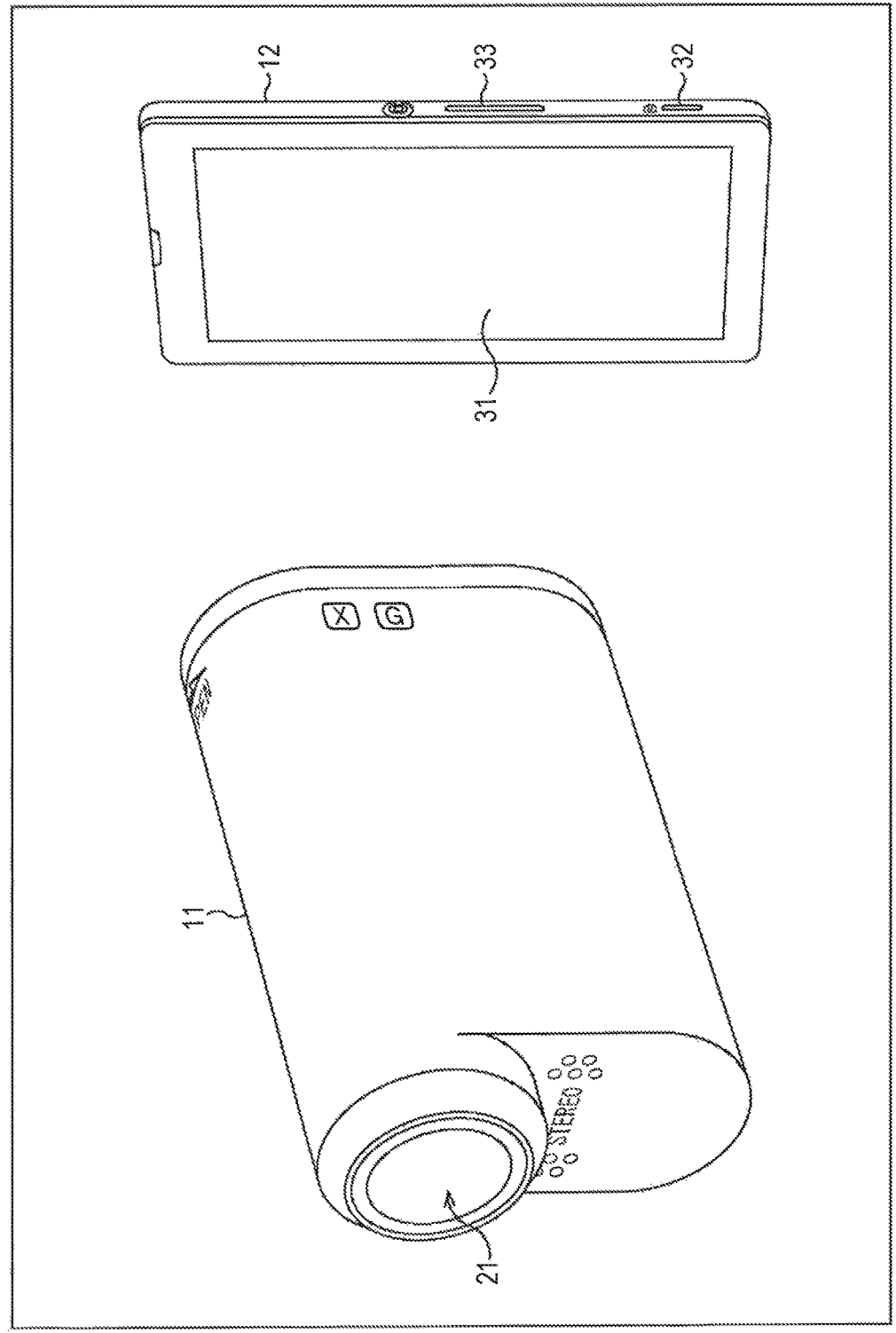
FIG. 1 is a diagram illustrating a configuration example of outer appearance of an imaging system.

FIG. 1 is a diagram illustrating a configuration example of outer appearance of an imaging system to which the present technology is applied.

The imaging system is configured to include an imaging device 11 configured with a compact digital camera such as an action camera and a warning generation device 12 configured with a multi-functional mobile phone. The imaging device 11 and the warning generation device 12 are configured to be capable of receiving and transmitting images and various types of information through wireless communication, and a captured image imaged by the imaging device 11 is displayed in the warning generation device 12.

The imaging device 11 can be mounted on the head or the like of a user through a mount or the like, and for example, the user wears the imaging device 11 on a user's own desired portion at the time of imaging.

An optical system 21 which guides light incident from a subject to an imager (not shown) is installed in front of the imaging device 11, and the user performs imaging by allowing the optical system 21 to face the desired subject.

In addition, various buttons such as a record button (not shown) are installed on the back surface of the imaging device 11, and the user instructs imaging or replaying by manipulating the buttons.

The warning generation device 12 is configured with a mobile phone having a display function, and a display unit 31 configured with a liquid crystal panel and the like is installed in the warning generation device 12. A touch panel (not shown) is installed in the display unit 31 to be overlapped. For example, the user views images displayed on the display unit 31 or manipulates icons displayed on the display unit 31.

In addition, on the side surface of the warning generation device 12, a shutter button 32 that functions as a shutter button at the time of imaging by a camera function and various types of buttons such as a button 33 for audio volume adjustment are installed.

In the imaging system, at the time of imaging, for example, the user wears the imaging device 11 on the head or the like and performs imaging, and the imaging device 11 transmits a captured image obtained by the imaging or information on the imaging situation to the warning generation device 12 through wireless communication.

The warning generation device 12 receives the captured image or various types of information from the imaging device 11 through wireless communication and displays the captured image on the display unit 31 or issues warning indicating that abnormality occurs in the imaging situation to the user based on the information received from the imaging device 11.

The user carries the warning generation device 12 and performs imaging work while appropriately correcting an imaging direction, imaging settings, or the like by viewing the captured image displayed on the warning generation device 12 or referring to the issued warning if necessary.

<Configuration Example of Functions of Imaging Device and Warning Generation Device>

Figure 2:
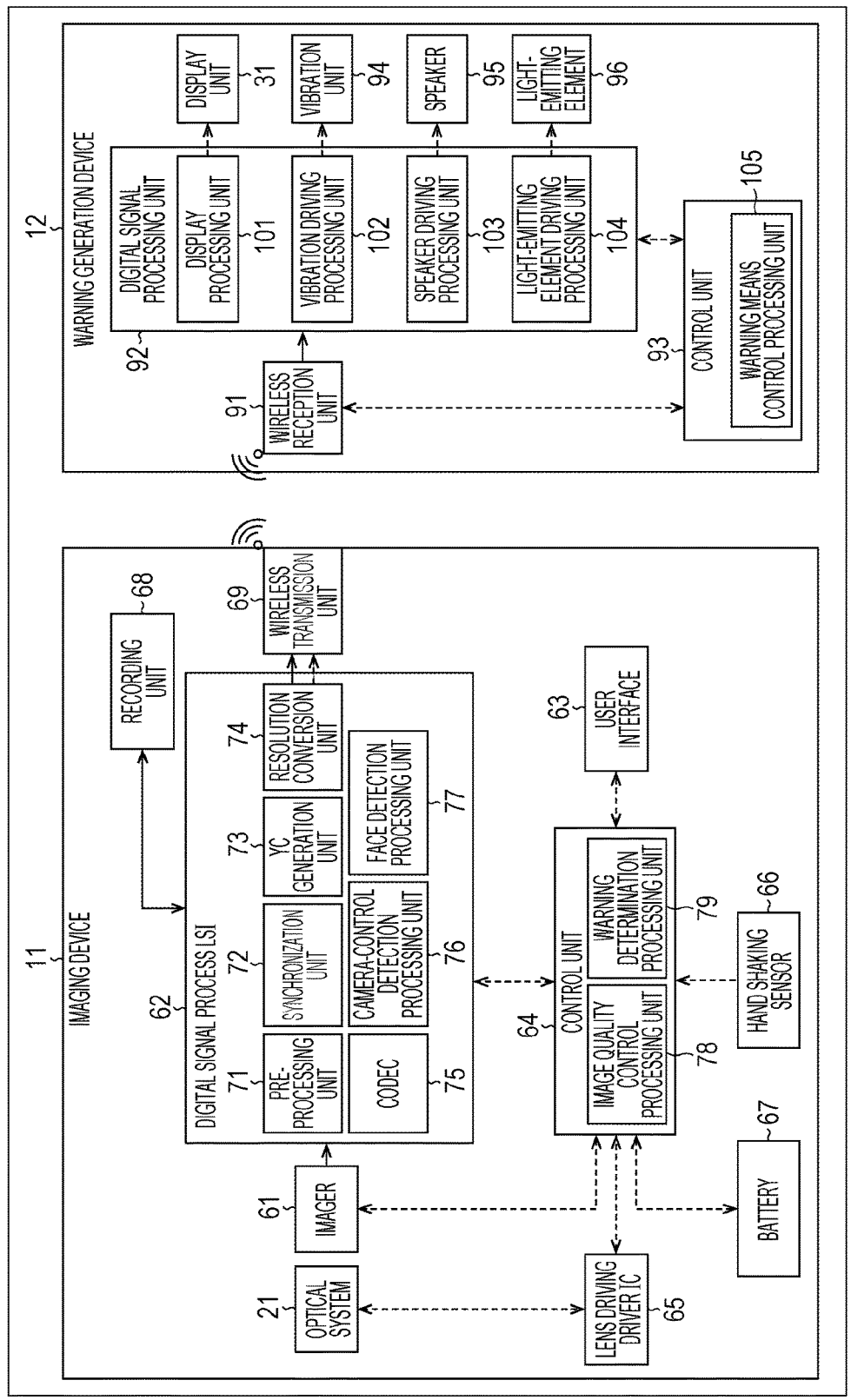
FIG. 2 is a diagram illustrating a configuration example of functions of an imaging device and a warning generation device.

In addition, a configuration of functions of the imaging device 11 and warning generation device 12 illustrated in FIG. 1 is illustrated in, for example, FIG. 2. Furthermore, in FIG. 2, the components corresponding to those of FIG. 1 are denoted by the same reference numerals, and the description thereof is appropriately omitted.

The imaging device 11 illustrated in FIG. 2 is configured to include an optical system 21, an imager 61, a digital signal process large scale integration (LSI) 62, a user interface 63, a control unit 64, a lens driving driver integrated circuit (IC) 65, a hand shaking sensor 66, a battery 67, a recording unit 68, and a wireless transmission unit 69.

The optical system 21 is configured with a plurality of lenses such as zoom lenses, focus lenses, and shift lenses, an aperture mechanism, a shutter mechanism, and the like and collects the light incident from the subject on a light-receiving surface of the imager 61.

The imager 61 is configured with, for example, an imaging element such as a charge coupled devices (CCD) or a complementary metal oxide semiconductor (CMOS). The imager 61 receives and photoelectrically converts the light incident from the optical system 21 and supplies the captured image obtained as the result, more specifically, image data of the captured image to the digital signal process LSI 62.

The digital signal process LSI 62 applies various signal processes on the captured image supplied from the imager 61. The digital signal process LSI 62 is configured to include a pre-processing unit 71, a synchronization unit 72, an YC generation unit 73, a resolution conversion unit 74, a CODEC 75, a camera-control detection processing unit 76, and a face detection processing unit 77.

The pre-processing unit 71 performs a clamping process, a defective pixel correction process, and the like on the captured image. The synchronization unit 72 performs a demosaic process on the captured image so that each of the pixels of the captured image on which the defective pixel correction process and the like are performed has each of R, G, and B color components.

The YC generation unit 73 generates a luminance signal and a color signal from the demosaic-processed captured image. The resolution conversion unit 74 performs resolution conversion on the captured image. The CODEC 75 performs an encoding process on the resolution-converted captured image or performs a decoding process on the encoded captured image.

The camera-control detection processing unit 76 performs a detection process by using the captured image if necessary at the time of performing exposure control, auto white balance control, or autofocus control and supplies a result of the detection process to the control unit 64. The face detection processing unit 77 detects the face of a person from the captured image.

The user interface 63 is configured with various manipulation buttons and the like such as a record button and supplies a signal according to user's manipulation to the control unit 64.

The control unit 64 controls the overall operations of the imaging device 11. For example, the control unit 64 controls imaging of an image to be captured by the imager 61. In addition, the control unit 64 controls the lens driving driver IC 65 based on the output of the hand shaking sensor 66 to move the shift lens of the optical system 21 to perform optical hand shaking correction or controls the lens driving driver IC 65 to drive the aperture mechanism or the focus lens of the optical system 21.

The control unit 64 is configured to include an image quality control processing unit 78 and a warning determination processing unit 79.

The image quality control processing unit 78 performs control of exposure, focus, and white balance based on the result of the detection process supplied from the camera-control detection processing unit 76. In addition, the image quality control processing unit 78 detects the abnormality of the imaging situation by monitoring, the result of the detection process, the output of the hand shaking sensor 66, and the remaining amount of the battery 67.

The warning determination processing unit 79 determines based on detection result for the abnormality of the imaging situation by the image quality control processing unit 78 whether or not warning is needed and performs instruction of warning according to the determination result.

Under the control of the control unit 64, the lens driving driver IC 65 moves the focus lens and the like constituting the optical system 21 to perform a focusing operation or to perform the aperture mechanism driving or the optical hand shaking correction. The hand shaking sensor 66 is configured with, for example, a gyro sensor and detects movement of the imaging device 11 to supply the movement of the imaging device to the control unit 64.

Under the control of the control unit 64, the battery 67 supplies power to the components of the imaging device 11 or supplies information indicating the remaining amount of the battery to the control unit 64. The recording unit 68 is configured with, for example, removable media detachable to the imaging device 11 and records date of the captured image and the like supplied from the digital signal process LSI 62 or supplies the recorded data to the digital signal process LSI 62.

The wireless transmission unit 69 transmits various types of images such as the captured image supplied from the digital signal process LSI 62 or various types of information to the warning generation device 12 through wireless communication such as Wi-Fi (registered trademark).

In addition, the warning generation device 12 is configured to include a wireless reception unit 91, a digital signal processing unit 92, a control unit 93, a display unit 31, a vibration unit 94, a speaker 95, and a light-emitting element 96.

Under the control of the control unit 93, the wireless reception unit 91 receives the captured image or various types of information and the like transmitted from the imaging device 11 to supply the captured image or various types of information and the like to the digital signal processing unit 92.

The digital signal processing unit 92 supplies information or the like supplied from the wireless reception unit 91 to the control unit 93 or drives the display unit 31 and the vibration unit 94 to the light-emitting element 96 according to the instruction of the control unit 93. The digital signal processing unit 92 is configured to include a display processing unit 101, a vibration driving processing unit 102, a speaker driving processing unit 103, and a light-emitting element driving processing unit 104.

The display processing unit 101 converts, for example, the captured image into a format which can be displayed on the display unit 31 and supplies the converted captured image to the display unit 31 to be displayed. The vibration driving processing unit 102 drives the vibration unit 94 to be vibrated. The speaker driving processing unit 103 supplies an audio signal to the speaker 95 to reproduce an audio. The light-emitting element driving processing unit 104 drives the light-emitting element 96 to emit light.

The control unit 93 controls overall operations of the warning generation device 12. In addition, the control unit 93 is configured to include a warning means control processing unit 105. The warning means control processing unit 105 instructs the display processing unit 101 to the light-emitting element driving processing unit 104 to issue warning based on information on the warning received from the imaging device 11.

Under the control of the vibration driving processing unit 102, the vibration unit 94 vibrates in a predetermined pattern to vibrate the warning generation device 12. The speaker 95 reproduces the audio based on the audio signal supplied from the speaker driving processing unit 103. The light-emitting element 96 is configured with, for example, a light emitting diode (LED) and the like and emits light in a predetermined pattern under the control of the light-emitting element driving processing unit 104.

<Overview of Processes of Imaging System>

Subsequently, overview of processes of the imaging system will be described with reference to FIGS. 3 to 5.

Figure 3:
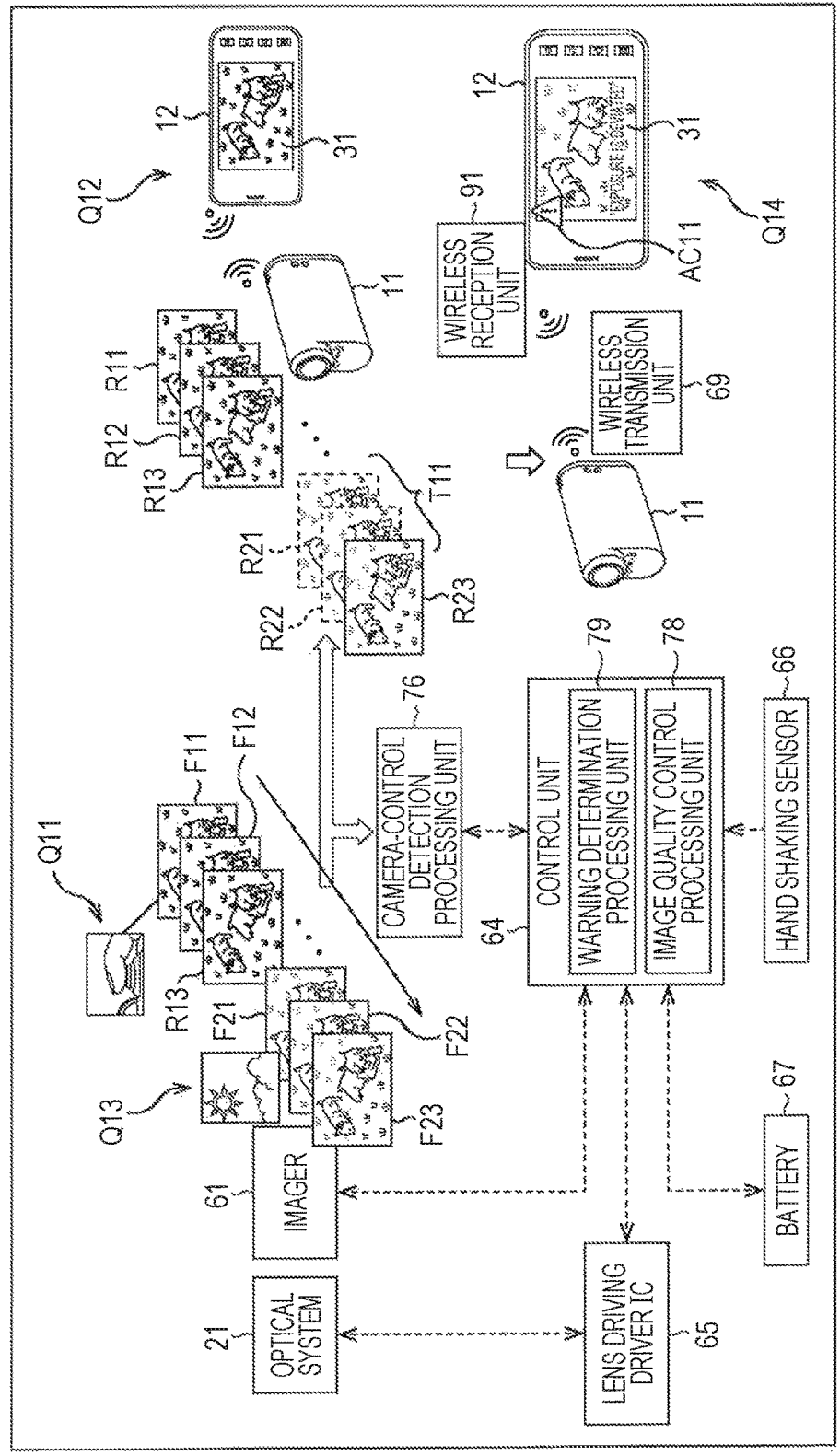
FIG. 3 is a diagram for explaining overview of processes of the imaging system.

For example, as indicated by an arrow Q11 of FIG. 3, when the record button is manipulated by the user and imaging of a moving picture starts, the imager 61 receives the light incident through the optical system 21 and photoelectrically converts the light. By doing so, captured images F11 to F23 at respective time points, that is, respective frames are obtained.

Herein, among the captured images F11 to F23, the one closer to the front side of the figure is the captured image captured at the later time point, that is, at the time point closer to the current time point. Therefore, in this example, the captured image captured initially is the captured image F11, and the captured image captured last is the captured image F23.

At the time of imaging the captured images of the respective frames constituting the moving picture, the camera-control detection processing unit 76 performs a detection process based on the captured images of the respective frames. The image quality control processing unit 78 performs control of exposure, focus, white balance, and the like based on the result of the detection process of the camera-control detection processing unit 76. For example, the image quality control processing unit 78 controls the lens driving driver IC 65 to drive the focus lens and the aperture mechanism of the optical system 21. By doing so, the focus and the exposure are controlled.

In addition, when the captured images F11 to F23 of the respective frames are obtained, a developing process is sequentially performed on the captured images, and captured images R11 to R23 obtained as the result are obtained as an imaged moving picture.

The imaging device 11 supplies the obtained captured image to the recording unit 68 to record the captured image and, if necessary, transmits the obtained captured image to the warning generation device 12 through the wireless communication. The warning generation device 12 receives the captured image transmitted from the imaging device 11 and displays the captured image on the display unit 31 as indicated by an arrow Q12.

The user can check the imaging situation of the captured image such as exposure state, focus state, and how the subject is to be imaged by viewing the captured image displayed on the display unit 31 of the warning generation device 12. The user performs the imaging while appropriately checking the captured image displayed in this manner.

In this example, since the imaging device 11 has no function of displaying the image, the user checks the imaging situation of the captured image by viewing the display unit 31 of the warning generation device 12 separated from the imaging device 11. Furthermore, if not particularly necessary, the captured image may not be displayed on the display unit 31.

As illustrated in the left side of the figure, it is assumed that in a predetermined period immediately after start of imaging, for example, in the period including the captured images F11 to F13 just before the captured image F21, the imaging was performed at an appropriate exposure. However, after that, as indicated by an arrow Q13, it is assumed that the light source condition was suddenly greatly changed, so that appropriate exposure control was not able to be performed.

In this example, since the space for which the imaging is to be performed becomes excessively bright, although the image quality control processing unit 78 takes any combination of an aperture value of the aperture of the optical system 21, a gain value of the imager 61, and a shutter speed as the exposure control, the imaging situation becomes overexposure. Namely, the brightness of the imaging environment exceeds the scope where the captured image can be adjusted into optimal brightness by using the aperture value, the gain value, and the shutter speed.

Therefore, the captured images F21 to F23 after the captured image F21 have inappropriate brightness. Therefore, the captured image R21 to R23 obtained by developing the captured images F21 to F23 are overexposed.

As described above, since the user mostly performs the imaging while moving in the state that the user wears the imaging device 11, the user does not constantly watch the display unit 31 to check the captured image. Therefore, when the user glances at the display unit 31, if a subject is being imaged on the display unit 31, the user may not recognize the above-described change of the light source condition, that is, the abnormality of the imaging situation.

Accordingly, the image quality control processing unit 78 of the imaging device 11 monitors the imaging situation such as the brightness of the imaging space based on the a result of the detection process of the camera-control detection processing unit 76, a detection result of the hand shaking sensor 66, a remaining amount of the battery 67, and the like. In the case where the abnormality of the imaging situations has continued only for a predetermined time like, for example, a time period T11 of the right side of the figure, the imaging device 11 performs control so that warning is issued.

More specifically, for example, the warning determination processing unit 79 of the imaging device 11 generates a warning flag indicating necessity or unnecessity of the warning based on a monitoring result for the imaging situation, and the wireless transmission unit 69 transmits the warning flag to the warning generation device 12. In addition, the wireless reception unit 91 of the warning generation device 12 receives the warning flag from the imaging device 11, and the warning generation device 12 issues the warning according to the received warning flag.

In this example, as the abnormality of the imaging situations indicated by an arrow Q14, an warning icon AC11 indicating that abnormality associated with the exposure occurs and a warning message expressing "exposure is deviated" are displayed on the display unit 31. In this manner, the warning of the occurrence of abnormality is issued by displaying an image such as the warning icon AC11 or an warning message, so that the user can more simply grasp the occurrence of abnormality, that is, the current imaging situation.

For example, in the case where the surrounding environment is bright, if a subject is displayed on the display unit 31, only when the user glances at the display unit 31, although the brightness of the subject is abnormal, the user may not recognize this abnormality. On the contrary, in the warning generation device 12, since the warning indication such as the warning icon AC11 is displayed, the user can easily recognize the occurrence of abnormality by viewing the warning indication.

In particular, if the warning icon AC11 indicated as the warning is set as an image specialized in a cause of abnormality such as the change of the light source condition, that is, an image for every cause of abnormality, the user can easily graph what the cause of the occurrence of abnormality is.

As described heretofore, in the case where the warning is issued when the abnormality occurs in the imaging situation, as the cause of abnormality, various causes such as the above-described sudden change of the light source condition and a decrease in the remaining amount of the battery 67 can be considered. Hereinafter, examples of the causes of the occurrence of abnormality, that is, the types of abnormality will be described.

Figure 4:
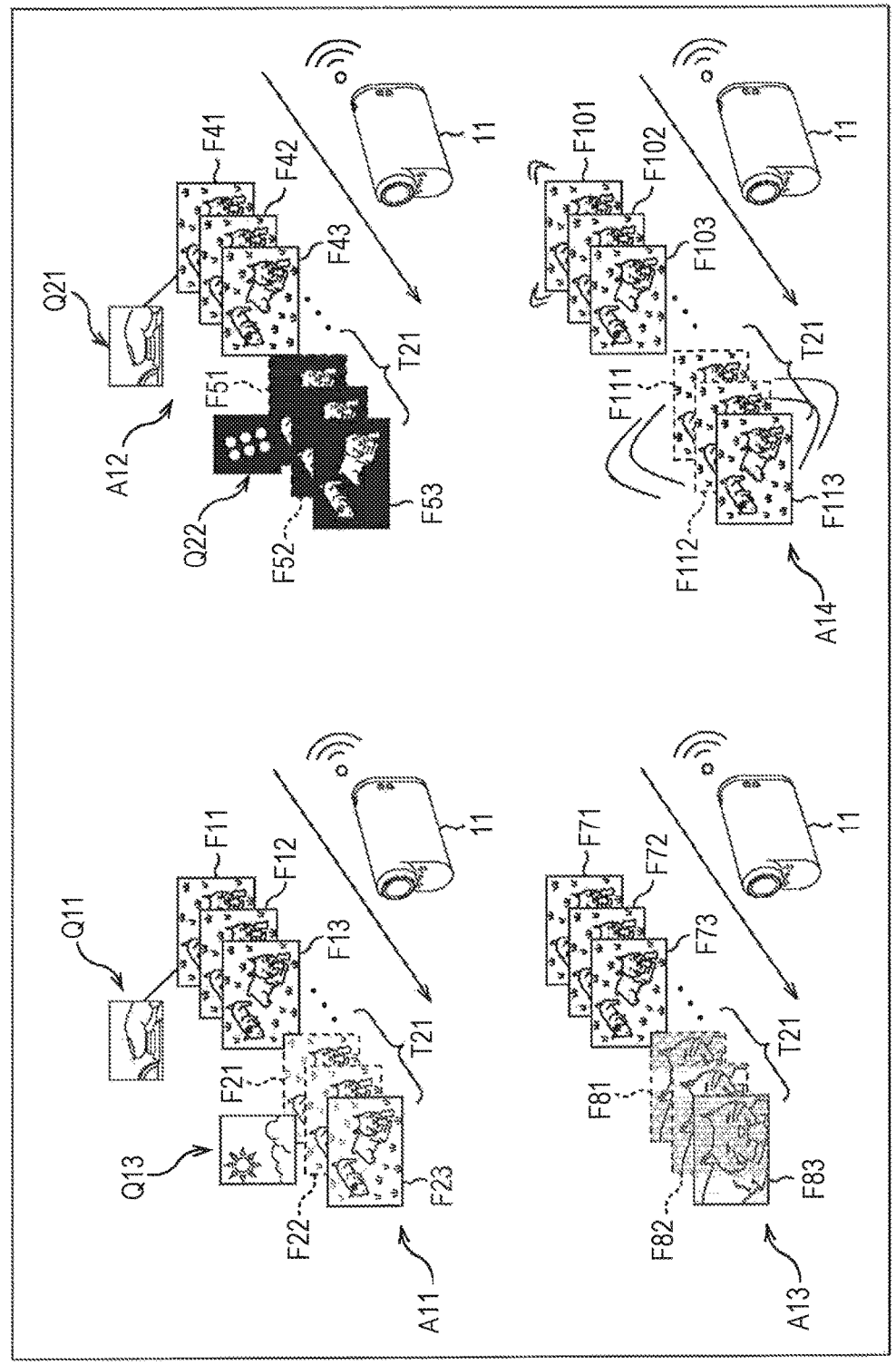
FIG. 4 is a diagram for explaining causes of occurrence of abnormality.

First, as indicated by an arrow A11 of the left upper portion of FIG. 4, the above-described great change of the light source condition is regarded as one of the causes of the occurrence of abnormality. Furthermore, in FIG. 4, portions corresponding to those of FIG. 3 are denoted by the same reference numerals, and the description thereof is appropriately omitted.

In this example, as indicated by the arrow Q13, the light source condition is greatly changed from the imaging time point of the captured image F21, and in the state, appropriate exposure control cannot be performed. Next, the state that the appropriate exposure control cannot be performed and, namely, the brightness of the light source exceeds the scope where the captured image can be adjusted into the optimal exposure continues only for a predetermined time T21.

Hereinafter, the abnormality state that appropriate exposure control cannot be performed due to the great change of the light source condition as described above is also referred to as the abnormality caused by the light source condition. The abnormality caused by the light source condition is the abnormality associated with the exposure control.

In addition, for example, as indicated by an arrow A12 of the right upper portion of the figure, abnormality where optimal white balance control cannot be performed is also considered.

Namely, as indicated by an arrow Q21, it is assumed that the record button is manipulated and imaging starts, and captured images F41 to F43 of the respective frames are imaged.

After that, although captured images F51 to F53 of the respective frames are imaged, as indicated by an arrow Q22, it is assumed that, at the imaging time point of the captured image F51, the illumination condition is greatly changed. For example, it is assumed that the subject is illuminated by a light source which does not exist until now and, thus, color temperature of the light illuminating the imaging space is greatly changed.

In this example, the state that, due to the change of the illumination condition, balance of gains of red (R), green (G), and blue (B) of the captured image exceeds the scope where the colors of the subject on the captured image can be adjusted to have appropriate white balance continues only for the predetermined time T21.

Therefore, the captured images F51 to F53 captured after the great change of the illumination condition become images having inappropriate white balance.

Hereinafter, the abnormality state that appropriate white balance control cannot be performed due to the great change of the illumination condition is also referred to as the abnormality caused by the illumination condition. The abnormality caused by the illumination condition is the abnormality associated with the white balance control.

In addition, for example, as indicated by an arrow A13 of the left lower portion of the figure, abnormality where, since the imaging distance to the subject is too short, appropriate autofocus control cannot be performed is also considered.

For example, it is assumed that the record button is manipulated and imaging starts, and captured images F71 to F73 of the respective frames are imaged. After that, although captured images F81 to F83 of the respective frames are imaged, at the time of imaging the captured image F81, the imaging device 11 to the subject is too short, and thus, the subject cannot be focused.

Namely, since the focus lens for the focus alignment constituting the optical system 21 continues to be located at the end of the so-called near side (wide), and thus, the focus lens cannot be further moved to the near side, and in the state, the subject cannot be focused.

In this example, the state that the target position of the focus lens continues to exceed the autofocus range, that is, the movable range continues only for the predetermined time T21. This is the state that, for example, when the image quality control processing unit 78 performs focus control in a contrast scheme, although the focus lens is moved, contrast of a target subject of the captured image continues to be not sufficiently high.

Like this, at the time of imaging the captured images F81 to F83, since the target position of the focus lens becomes the position outside the movable range, the captured images become images where the subject is blurred.

Hereinafter, the abnormality state that, since the imaging distance to the subject is too short, appropriate autofocus control cannot be performed is referred to as the abnormality caused by the imaging distance. The abnormality caused by the imaging distance is the abnormality associated with the focus control.

In addition, for example, as indicated by an arrow A14 of the right lower portion of the figure, abnormality where, since the imaging device 11 is greatly shifted, namely, continues to be greatly shaken by some causes, shaking of the subject caused by the shaking cannot be corrected in the hand shaking correction is also considered.

For example, it is assumed that the record button is manipulated and imaging starts, and captured images F101 to F103 of the respective frames are imaged. After that, although captured images F111 to F113 of the respective frames are imaged, it is assumed that, at the time of imaging the captured image F111, the imaging device 11 is greatly moved, and thus, in this state, the shaking (blur) of the subject cannot be corrected in the hand shaking correction.

Namely, since the shift lens for the hand shaking correction constituting the optical system 21 continues to be located at the end of the movable range, and thus, the shift lens cannot be further moved to the side separated away from the center of the optical axis, and in the state, the subject on the captured image is blurred by the hand shaking.

In this example, the state that the target position of the shift lens continues to exceed the movable range continues only for the predetermined time T21.

Like this, at the time of imaging the captured images F111 to F113, since the target position of the shift lens for the hand shaking correction becomes the position outside the movable range, the captured images become images where the subject is shaken (blurred).

Hereinafter, the abnormality state that appropriate hand shaking correction cannot be performed due to too much hand shaking is referred to as the abnormality caused by the hand shaking.

Figure 5:
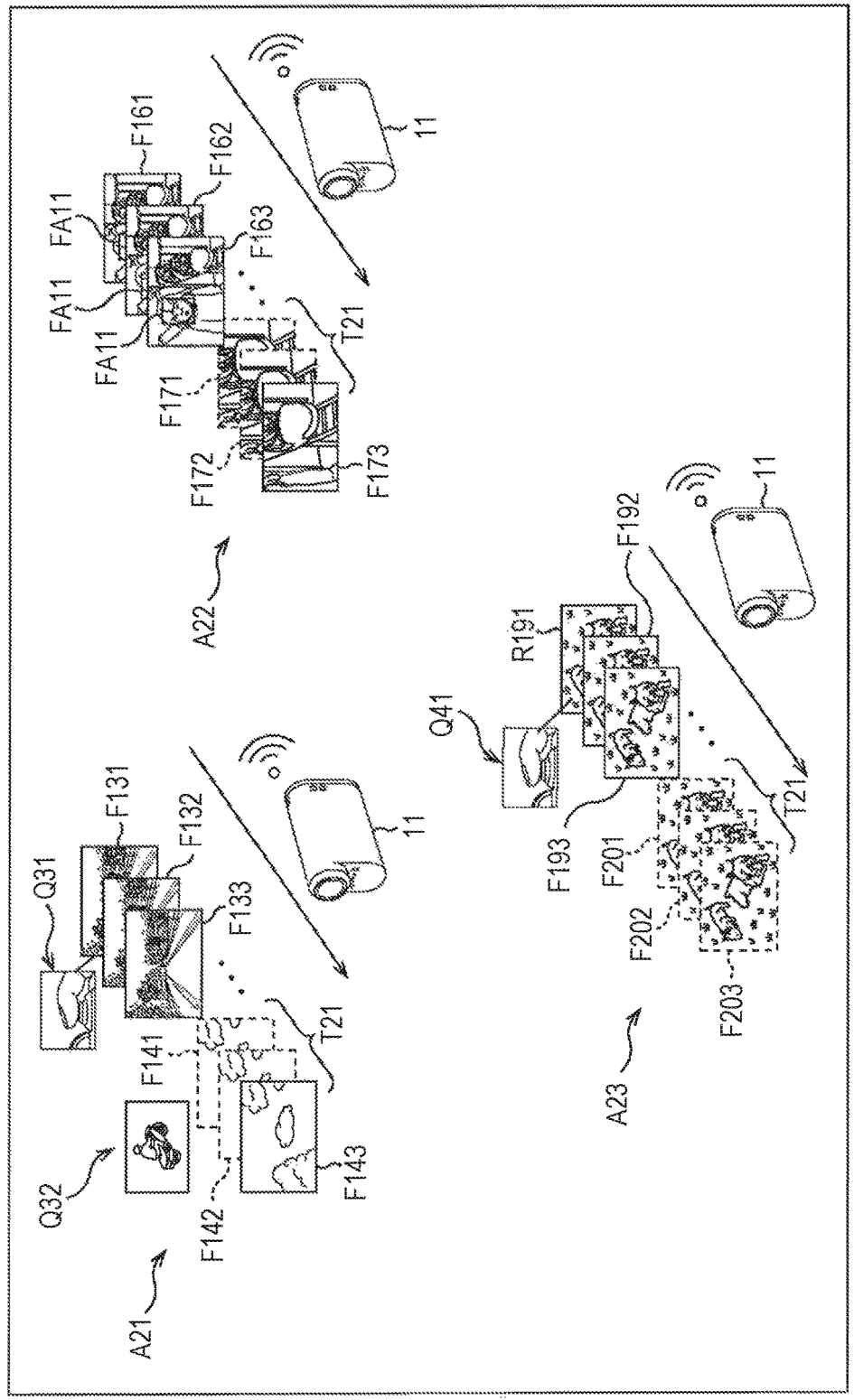
FIG. 5 I is a diagram for explaining causes of occurrence of abnormality.

In addition, as indicated by an arrow A21 of the left upper portion of FIG. 5, considered is abnormality where, since the imaging direction of the imaging device 11 is greatly deviated by some causes, the user cannot recognize the deviation, and the imaging continues to be performed in a direction which the user does not intend.

Namely, it is assumed that, as indicated by an arrow Q31, the record button is manipulated and imaging starts, captured images F131 to F133 of the respective frames are imaged. After that, it is assumed that, although captured images F141 to F143 of the respective frames are imaged, as indicated by an arrow Q32, for example, due to the cause that the imaging device 11 is impacted, at the imaging time point of the captured image F141, the direction of the imaging device 11 is greatly deviated.

In this example, the state that the imaging is performed in a direction which the user does not intend due to the change of the imaging direction continues only for the predetermined time T21. Therefore, the captured images F141 to F143 imaged after the imaging direction is greatly changed become images of which recording is meaningless to the user.

Furthermore, the great change of the imaging direction can be detected by scene change. More specifically, for example, the case where, after the optimal exposure balance or the optimal white balance which has been stable up to now is changed, the balance becomes stable again may be regarded as the case where the imaging direction is greatly changed.

Hereinafter, the abnormality state that the imaging is performed in a direction which is not an originally intended direction due to the great change of the imaging direction is referred to as the abnormality caused by the imaging direction.

In addition, as indicated by an arrow A22 of the right upper portion of the figure, abnormality where, although the autofocus has been performed by the face detection function, since a person as the subject moves outside an angle of view, the face is not detected, and the autofocus control using the face detection function cannot be performed is also considered.

Namely, it is assumed that the record button is manipulated and imaging starts, and captured images F161 to F163 of the respective frames are imaged. In this example, the target face of the person is detected from the captured images, and a face detection range FA11 is displayed to surround the area of the face.

After that, it is assumed that, although the captured images F171 to F173 of the respective frames are imaged, since the person as the subject greatly moves, at the imaging time point of the captured image F171, the face of the person is not detected from the captured image F171.

In this example, the face of the person who has been detected until now is not detected from the captured images F171 to F173, and the state that the face is not detected continues only for the predetermined time T21. Therefore, the imaging device 11 is in the state that there is no subject which is to be focused.

Hereinafter, the abnormality state that a face cannot be detected from the captured image is referred to as the abnormality caused by the face loss.

In addition, as indicated by an arrow A23 of the lower side of the figure, abnormality where, since the remaining amount of the battery 67 is decreased after the imaging starts, power supply cannot be performed in this state and the imaging cannot be performed is also considered.

Namely, it is assumed that, as indicated by an arrow Q41, the record button is manipulated and imaging starts, and captured images F191 to F193 of the respective frames are imaged. After that, it is assumed that, although captured images F201 to F203 of the respective frames are imaged, at the imaging time point of the captured image F201, the remaining amount of the battery 67 becomes lower than a predetermined amount.

In this example, the state that the remaining amount is insufficient continues only for the predetermined time T21. Therefore, the user needs to replace the battery 67 of the imaging device 11 at an appropriate timing.

Hereinafter, the abnormality state that the remaining amount of the battery 67 is insufficient is also referred to as the abnormality caused by the battery.

The imaging device 11 detects the occurrence of each abnormality described heretofore by monitoring the imaging situation based on the result of the detection process by the camera-control detection processing unit 76 and instructs the warning generation device 12 to issue the warning according to the detection result. Namely, a warning flag is generated and transmitted to the warning generation device 12.

<Description of Imaging Processes>

Next, specific operations of the imaging device 11 and the warning generation device 12 will be described.

First, the imaging processes of the imaging device 11 will be described with reference to a flowchart of FIG. 6.

In step S11, the imager 61 images an image to be captured.

More specifically, the imager 61 photoelectrically converts the light incident from the subject through the optical system 21 and supplies the obtained captured image corresponding to one frame to the digital signal process LSI 62. The components constituting the digital signal process LSI 62 such as the pre-processing unit 71 and the synchronization unit 72 apply various types of processes to the captured image supplied from the imager 61 to perform developing of the captured image.

In step S12, the face detection processing unit 77 performs the face detection on the captured image obtained by the imaging to detect the face area of a person. For example, in the face detection, the face area is detected based on a feature amount extracted from the captured image. The face detection processing unit 77 supplies the detection result of the face area to the control unit 64.

In step S13, the camera-control detection processing unit 76 performs the detection process for imaging control for the captured image based on the captured image obtained by the imaging.

For example, the camera-control detection processing unit 76 divides the captured image into M×N areas, sets each of the divided areas as a divided area, and generates a luminance signal of each pixel in the divided area for every divided area. For example, the luminance signal may be allowed to be generated by the YC generation unit 73.

In addition, the camera-control detection processing unit 76 applies a filtering process using a high pass filter or the like on the luminance signal of each pixel in the divided area to extract a high-frequency band component and takes the absolute value of the obtained high-frequency band component. In addition, the camera-control detection processing unit 76 performs a high-frequency band component noise removal process and a limiter process on the absolute value of the high frequency band component obtained with respect to each pixel in the divided area and, after that, calculates a focusing evaluation value of the divided area by integrating the absolute values of the high frequency band components of the respective pixels in the divided area. Namely, a sum of the absolute values of the high-frequency band components of the respective pixels in the divided area becomes the focusing evaluation value of the divided area.

In the captured image, since the edge component dominantly appears in the focused area, that is, the area where the degree of focusing is high, the better the area is focused, the larger the focusing evaluation value, that is, the integration value of the high-frequency band components is.

The camera-control detection processing unit 76 supplies the obtained focusing evaluation value of each divided area as the result of the detection process for focus control to the control unit 64.

In addition, the camera-control detection processing unit 76 calculates, for every divided area, the integration value of the luminance values, that is, the sum of the luminance values of the respective pixels in the divided areas and supplies the integration value as the result of the detection process for the exposure control to the control unit 64.

In addition, the camera-control detection processing unit 76 calculates, for every divided area, the integration value of the pixel values, that is, the sum of the pixel values of the pixels of the respective colors in the divided area with respect to the respective colors of R, G, and B and supplies the integration value as the result of the detection process for the white balance control to the control unit 64. In the detection process, with respect to each divided area, the integration value for the R component, the integration value for G component, and the integration value for the B component can be obtained.

In addition, the hand shaking sensor 66 detects the movement of the imaging device 11 by the detection process and supplies the result of the detection to the control unit 64.

In step S14, the image quality control processing unit 78 performs the image quality control process based on the result of the detection process performed in step S13.

More specifically, the image quality control processing unit 78 calculates a control instruction value for the white balance control based on the result of the detection process for the white balance control supplied from the camera-control detection processing unit 76, that is, the integration values of the respective color components of each divided area and the result of the face detection process supplied from the face detection processing unit 77.

For example, the image quality control processing unit 78 obtains gain values of the respective color components so that the ratios of the integration value of the R component, the integration value of the G component, and the integration value of the B component to the entire face area detected from the captured image are the same and supplies the gain values as the control instruction values to the digital signal process LSI 62. The digital signal process LSI 62 performs the white balance adjustment for the captured image by multiplying the pixels of the respective color components of the captured image with the gain values of the respective color components as the control instruction values supplied from the image quality control processing unit 78.

In addition, the image quality control processing unit 78 calculates, based on the result of movement detection supplied from the handshaking sensor 66, a lens movement amount at the time of moving the shift lens of the optical system 21 so that the movement of the imaging device 11 is removed as the control instruction value of the hand shaking correction. The image quality control processing unit 78 controls the lens driving driver IC 65 based on the calculated control instruction value of the hand shaking correction and performs optical hand shaking correction by moving the shift lens of the optical system 21.

In addition, the image quality control processing unit 78 calculates a control instruction value for the exposure control based on the result of the detection process for the exposure control supplied from the camera-control detection processing unit 76, that is, the integration values of the luminance values of each divided area and the result of the face detection process supplied from the face detection processing unit 77.

For example, the image quality control processing unit 78 calculates the aperture value of the aperture of the optical system 21, the shutter speed, and the gain value (ISO sensitivity) of the imager 61 as the control instruction values of the aperture, the shutter, and the gain for the exposure control. The aperture value, the shutter speed, and the gain value are determined so that, for example, the face area in the captured image has optimal brightness.

The image quality control processing unit 78 controls the lens driving driver IC 65 based on the control instruction value of the aperture to adjust the aperture of the optical system 21 and controls the imager 61 based on the control instruction value of the gain to allow the imaging to be performed at a predetermined ISO sensitivity.

In addition, the image quality control processing unit 78 controls the lens driving driver IC 65 based on the control instruction value for the shutter and performs the shutter control so that the shutter installed in the optical system 21 is operated at the shutter speed determined by the control instruction value. Therefore, in the process of step S11 performed as the next process, the imaging is performed at the shutter speed determined by the control instruction value.

In addition, the image quality control processing unit 78 calculates the position of the focus lens of the optical system 21 so that the focus lens is focused on a predetermined object, as the control instruction value for the focusing, based on the result of the detection process for the focus control supplied from the camera-control detection processing unit 76, that is, the focusing evaluation value of each divided area and the result of the face detection process supplied from the face detection processing unit 77.

For example, when the focus lens is moved, the position of the focus lens where the focusing evaluation value of a predetermined area such as a face area becomes highest is calculated as the control instruction value for the focusing.

In step S15, the image quality control processing unit 78 controls the lens driving driver IC 65 based on the calculated control instruction value for the focusing and performs the focusing operation by moving the focus lens of the optical system 21.

In step S16, the digital signal process LSI 62 supplies the captured image on which the white balance adjustment is performed to the recording unit 68 and allows the captured image to be recorded.

In addition, the digital signal process LSI 62 supplies the captured image on which the white balance adjustment is performed and which is reduced appropriately by the resolution conversion of the resolution conversion unit 74 to the wireless transmission unit 69.

In step S17, the wireless transmission unit 69 transmits the captured image supplied from the digital signal process LSI 62 to the warning generation device 12 in a wireless manner.

In step S18, the control unit 64 determines whether or not the process is ended. For example, in the case where user interface 63 is manipulated by the user and the recording stop is instructed, it is determined that the process is ended.

In the case where it is determined in step S18 that the process is not ended, the process returns to step S11, and the above-described processes are repeated.

On the contrary, in the case where it is determined in step S18 that the process is ended, the imaging process is ended.

In the manner described above, the imaging device 11 records the captured image obtained by the imaging and transmits the captured image to the warning generation device 12.

<Description of Display Process>

If the captured image is transmitted to the warning generation device 12 in this manner, the warning generation device 12 performs the display process of receiving and displaying the captured image. Hereinafter, the display process by the warning generation device 12 will be described with reference to a flowchart of FIG. 7.

In step S41, the wireless reception unit 91 receives the captured image transmitted from the wireless transmission unit 69 of the imaging device 11 in a wireless manner and supplies the captured image to the digital signal processing unit 92. Namely, the image corresponding to one frame of the captured image that is a moving picture is received.

In step S42, the display processing unit 101 of the digital signal processing unit 92 supplies the captured image supplied from the wireless reception unit 91 to the display unit 31 and allows the captured image to be displayed.

By doing so, the user can check the imaging situation of the captured image by viewing the captured image displayed on the display unit 31.

In step S43, the control unit 93 determines whether or not the process is ended. For example, in the case where a frame of a new captured image is not transmitted from the imaging device 11, it is determined that the process is ended.

In the case where it is determined in step S43 that the process is not ended, the process returns to step S41, and the above-described processes are repeated.

On the contrary, in the case where it is determined in step S43 that the process is ended, the display process is ended.

In the manner described above, the warning generation device 12 receives and displays the captured image. Therefore, the user can check an angle of view and the like by viewing the captured image displayed on the warning generation device 12 separated from the imaging device 11.

<Description of Detection Process for Occurrence of Abnormality Caused by Light Source Condition>

In addition, if the imaging of the captured image is started, while performing the imaging process described with reference to FIG. 6, the imaging device 11 simultaneously performs a process of detecting the occurrence of abnormality associated with the imaging situation. Hereinafter, the process of detecting the occurrence of abnormality for each cause, that is, for each type of abnormality will be described in detail with reference to FIGS. 8 to 14.

Figure 8:
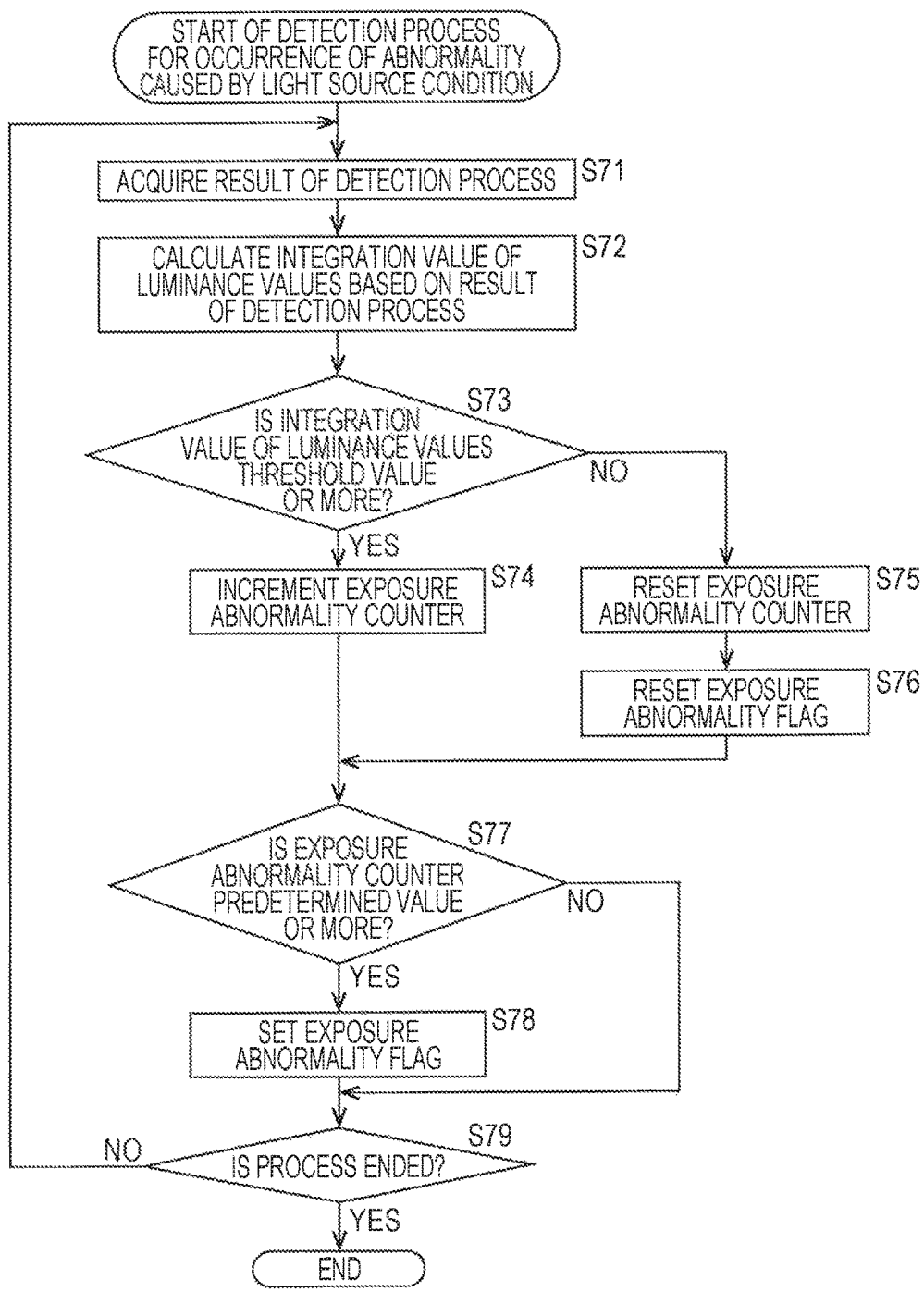
FIG. 8 is a flowchart for explaining a detection process for occurrence of abnormality caused by a light source condition.

First, the detection process for the occurrence of abnormality caused by the light source condition performed by the imaging device 11 will be described with reference to a flowchart of FIG. 8.

Figure 6:
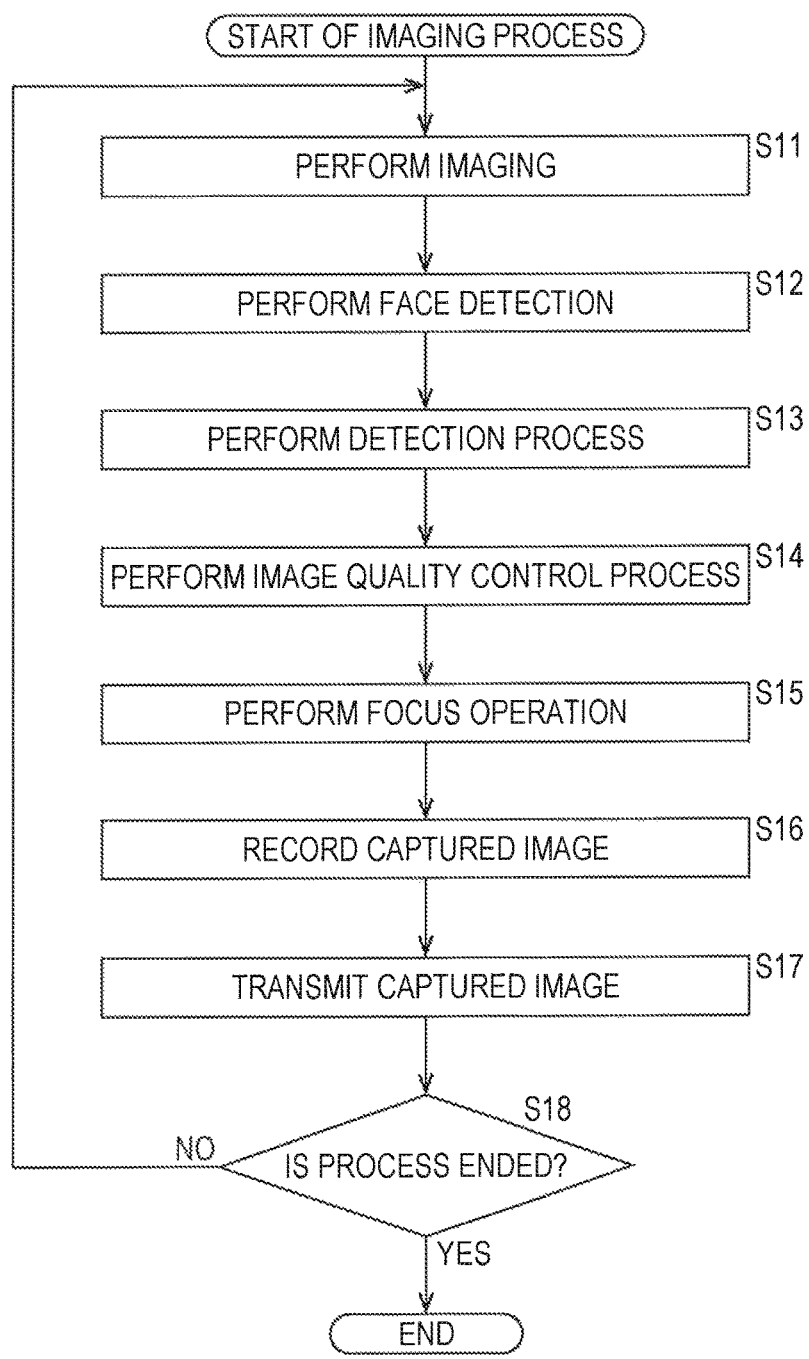
FIG. 6 is a flowchart for explaining an imaging process.

In step S71, the image quality control processing unit 78 acquires the result of the detection process performed in step S13 of FIG. 6 from the camera-control detection processing unit 76. More specifically, the integration value of the luminance values of each divided area which is calculated as the result of the detection process for the exposure control is acquired.

In step S72, the image quality control processing unit 78 calculates the integration value of the luminance values of the entire captured image based on the acquired result of the detection process. Namely, the image quality control processing unit 78 obtains a sum of the integration values of the luminance values of each divided area as the integration value of the luminance values of the entire captured image. Hereinafter, the integration value of the luminance values of the entire captured image is also referred to as a total luminance integration value.

Furthermore, herein, although the example where the total luminance integration value is obtained by setting the entire captured image as the process object is described, for example, in the case where a face is detected by face detection, the integration value of the luminance value of a face area may be calculated to be used as the total luminance integration value. In addition, the total luminance integration value may be calculated by applying a weighting factor to the face area.

In step S73, the image quality control processing unit 78 determines whether or not the integration value of the luminance values of the entire captured image, that is, the total luminance integration value is a predetermined threshold value or more.

Herein, with respect to the threshold value which is to be compared with the total luminance integration value, if the total luminance integration value is the threshold value or more, even any value of the aperture value of the aperture of the optical system 21, the shutter speed, and the gain value of the imager 61 becomes a value by which the captured image having appropriate brightness cannot be obtained. Namely, the threshold value becomes the value representing overexposure.

Therefore, in the case where the total luminance integration value is the threshold value or more, the captured image having appropriate exposure cannot be obtained, and in the state, the abnormality caused by the light source condition is detected.

In the case where it is determined in step S73 that the total luminance integration value is the threshold value or more, in step S74, the image quality control processing unit 78 increments the exposure abnormality counter stored in advance by 1.

Herein, the exposure abnormality counter represents the number of times of consecutive determination that the total luminance integration value is the threshold value or more, that is, the time (number of frames) of consecutive detection of the abnormality caused by the light source condition.

In addition, the image quality control processing unit 78 also stores the exposure abnormality flag which is set (on) when the exposure abnormality counter is the predetermined value or more. In the image quality control processing unit 78, in the case where it is continuously determined consecutively a predetermined number of times or more that the total luminance integration value is the threshold value or more, that is, in the case where the abnormality caused by the light source condition is continuously detected consecutively a predetermined number of frames or more, it is determined that the abnormality caused by the light source condition occurs, and the exposure abnormality flag is set.

Therefore, the case where the exposure abnormality flag is set (on) represents that the abnormality caused by the light source condition occurs; and the case where the exposure abnormality flag is reset (off) represents that the abnormality caused by the light source condition does not occur.

If the exposure abnormality counter is incremented in step S74, after that, the process proceeds to step S77.

On the other hand, in the case where it is determined in step S73 that the total luminance integration value is not the threshold value or more, in step S75, the image quality control processing unit 78 resets the exposure abnormality counter.

In step S76, the image quality control processing unit 78 resets (off) the exposure abnormality flag.

Namely, in the case where the total luminance integration value is less than the threshold value, since appropriate exposure control is available and the abnormality caused by the light source condition does not occur, the exposure abnormality counter is reset to 0, and the exposure abnormality flag is also reset. By doing so, if the exposure abnormality flag is reset, the process proceeds to step S77.

If the exposure abnormality counter is incremented in step S74 or if the exposure abnormality flag is reset in step S76, in step S77, the image quality control processing unit 78 determines whether or not the exposure abnormality counter is a predetermined value or more.

In the case where it is determined in step S77 that the exposure abnormality counter is the predetermined value or more, in step S78, the image quality control processing unit 78 sets (on) the exposure abnormality flag.

Namely, in the case where it is determined that the exposure abnormality counter is the predetermined value or more, since the state that appropriate exposure control is not available is continuously maintained for a certain time or more, it is determined that the abnormality caused by the light source condition occurs, and the exposure abnormality flag is set. If the exposure abnormality flag is set, after that, the process proceeds to step S79.

In addition, in the case where it is determined in step S77 that the exposure abnormality counter is not the predetermined value or more, it is determined that the abnormality caused by the light source condition does not occur, and the process proceeds to step S79.

If the exposure abnormality flag is set in step S78 or if it is determined in step S77 that the exposure abnormality counter is not the predetermined value or more, in step S79, the image quality control processing unit 78 determines whether or not the process is ended.

For example, in the case where the imaging process described with reference to FIG. 6 is ended, that is, in the case where the imaging is ended, it is determined that the process is ended.

In the case where it is determined in step S79 that the process is not ended, the process returns to step S71, and the above-described processes are repeated.

On the contrary, in the case where it is determined in step S79 that the process is ended, the detection process for the occurrence of abnormality caused by the light source condition is ended.

In the manner described above, the imaging device 11 detects the occurrence of abnormality caused by the light source condition based on the detection result for the luminance. In this manner, by detecting the occurrence of abnormality caused by the light source condition, warning can be issued to the user if necessary. Therefore, the user can more simply grasp the imaging situation, for example, the occurrence of abnormality caused by the light source condition.

Furthermore, herein, although the example where the total luminance integration value is used for determining whether or not appropriate exposure control is available is described, any information about the luminance of the captured image may be used.

For example, the average value of the total luminance integration values of some number of most recent frames may be configured to be compared with the threshold value. In addition, targets values of the aperture value, the gain value, and the shutter speed may be calculated based on the integration value of the luminance values of each divided area, and the abnormality caused by the light source condition may be detected based on the calculated values.

<Description of Detection Process for Occurrence of Abnormality Caused by Illumination Condition>

Figure 9:
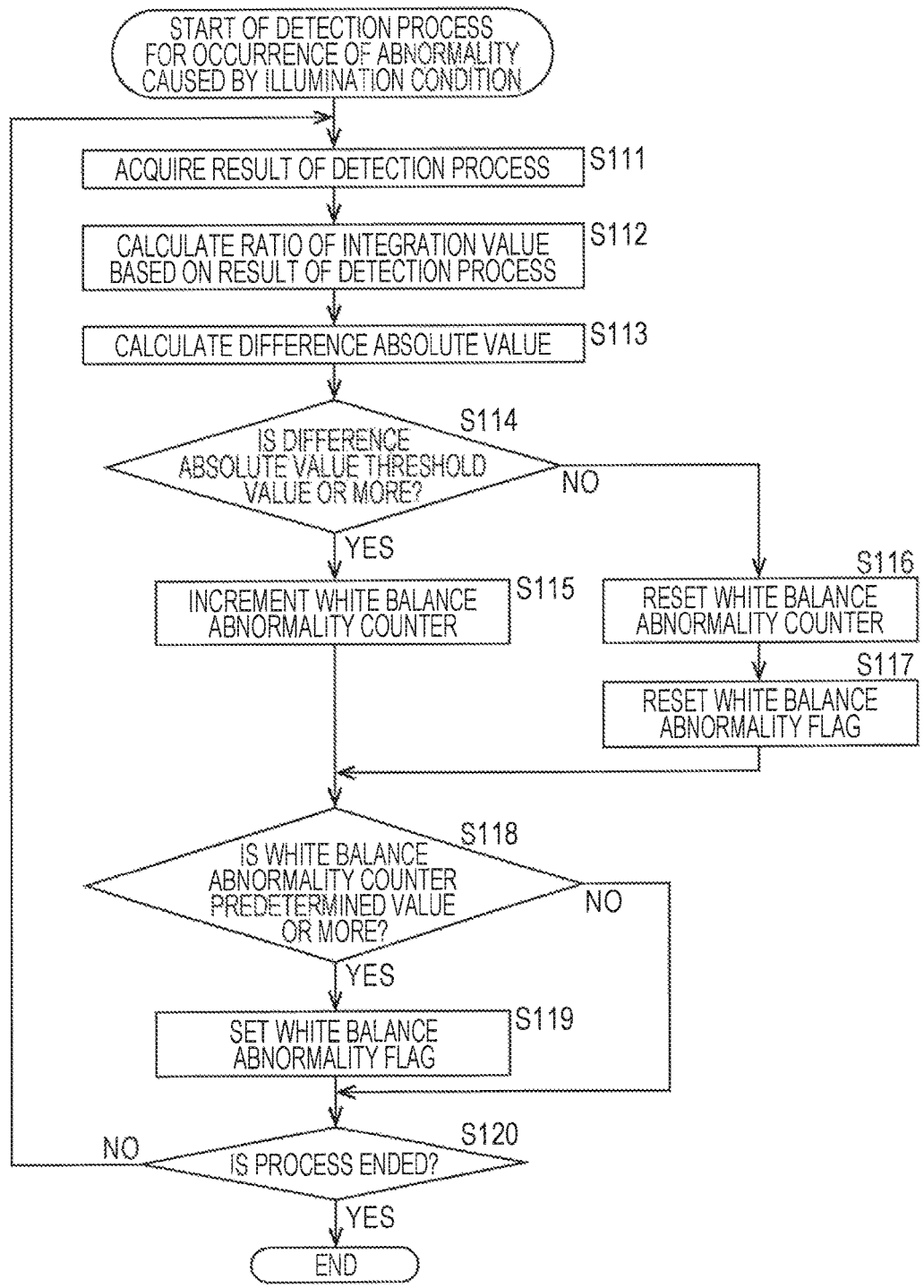
FIG. 9 is a flowchart for explaining a detection process for occurrence of abnormality caused by an illumination condition.

Next, the detection process for the occurrence of abnormality caused by the illumination condition performed by the imaging device 11 will be described with reference to a flowchart of FIG. 9.

In step S111, the image quality control processing unit 78 acquires the result of the detection process performed in step S13 of FIG. 6 from the camera-control detection processing unit 76. More specifically, the integration values of the respective color components of R, G, and B obtained for every divided area, which are calculated as the result of the detection process for the white balance control, are acquired.

In step S112, the image quality control processing unit 78 calculates the ratios of the integration values of the respective color components of the entire captured image are calculated based on the acquired result of the detection process.

Namely, the image quality control processing unit 78 obtains the integration value of the R components of the entire captured image by obtaining a sum of the integration values of the R component of the respective divided areas. Similarly, the image quality control processing unit 78 obtains a sum of the integration values of the G component of the respective divided areas as the integration value of the G components of the entire captured image and obtains a sum of the integration values of the B component of the respective divided areas as the integration value of the B components of the entire captured image.

Next, the image quality control processing unit 78 selects arbitrary two color components among the R, G, and B color components and calculates a ratio of the integration values of the entire captured image for the two color components. For example, a ratio of the integration value of the R component of the entire captured image and the integration value of the G component of the entire captured image is obtained. In this case, for example, the ratio is obtained so that the small integration value becomes the denominator.

The image quality control processing unit 78 calculates the ratios of the integration values of the color components of the entire captured image by combining the color components.

Furthermore, herein, although the example where the entire captured image is defined as the process object and the ratios of the integration values of the respective color components are calculated is described, in the case where the face is detected by the face detection, the face area may be defined as the process object, and the ratios of the integration values of the respective color components may be calculated for the face area. In addition, the integration values of the respective color components of the entire captured image may be calculated by applying a weighting factor to the face area.

In step S113, the image quality control processing unit 78 calculates the difference absolute values between the ratios of the integration values of the color components of the entire captured image and 1. Namely, for every ratio of the integration values calculated in step S112, the absolute value of the difference between 1 and the integration value is calculated.

In step S114, the image quality control processing unit 78 determines whether or not the difference absolute value calculated in step S113 is a threshold value or more.

For example, with respect to a plurality of the difference absolute values obtained by combinations of the color components, in the case where there is even one difference absolute value which is the threshold value or more, in step S114, it is determined that the difference absolute value is the threshold value or more.

Herein, with respect to the threshold value which is to be compared with the difference absolute value, if the difference absolute value is the threshold value or more, the captured image having appropriate white balance cannot be obtained even though the white balance is adjusted by multiplying the gain value with the pixel values of the respective color components of the captured image.

Therefore, in the case where the difference absolute value is the threshold value or more, the captured image having appropriate white balance cannot be obtained, and the abnormality caused by the illumination condition is detected.

In the case where it is determined in step S114 that the difference absolute value is the threshold value or more, in step S115, the image quality control processing unit 78 increments the white balance abnormality counter stored in advance by 1.

Herein, the white balance abnormality counter is similar to the exposure abnormality counter and represents the number of times of consecutive determination that the difference absolute value is the threshold value or more, that is, the time (number of frames) of consecutive detection of the abnormality caused by the illumination condition.

In addition, the image quality control processing unit 78 also stores the white balance abnormality flag which is set (on) when the white balance abnormality counter is the predetermined value or more. The case where the white balance abnormality flag is set (on) represents that the abnormality caused by the illumination condition occurs, and the case where the white balance abnormality flag is reset (off) represents that the abnormality caused by the illumination condition does not occur.

If the white balance abnormality counter is incremented in step S115, after that, the process proceeds to step S118.

On the other hand, in the case where it is determined in step S114 that the difference absolute value is not the threshold value or more, in step S116, the image quality control processing unit 78 resets the white balance abnormality counter.

In step S117, the image quality control processing unit 78 resets (off) the white balance abnormality flag.

Namely, in the case where the difference absolute value is less than the threshold value, since appropriate white balance control is available and the abnormality caused by the illumination condition does not occur, the white balance abnormality counter is rest to 0, and the white balance abnormality flag is also reset. By doing so, if the white balance abnormality flag is reset, the process proceeds to step S118.

If the white balance abnormality counter is incremented in step S115 or if the white balance abnormality flag is reset in step S117, in step S118, the image quality control processing unit 78 determines whether or not the white balance abnormality counter is a predetermined value or more.

In the case where it is determined in step S118 that the white balance abnormality counter is the predetermined value or more, in step S119, the image quality control processing unit 78 sets (on) the white balance abnormality flag.

In this case, since the state that appropriate white balance control is not available is continuously maintained for a certain time or more, it is determined that the abnormality caused by the illumination condition occurs, and the white balance abnormality flag is set. If the white balance abnormality flag is set, after that, the process proceeds to step S120.

In addition, in the case where it is determined in step S118 that the white balance abnormality counter is not the predetermined value or more, it is determined that the abnormality caused by the illumination condition does not occur, and the process proceeds to step S120.

If the white balance abnormality flag is set in step S119 or if it is determined in step S118 that the white balance abnormality counter is not the predetermined value or more, in step S120, the image quality control processing unit 78 determines whether or not the process is ended.

For example, in the case where the imaging process described with reference to FIG. 6 is ended, that is, in the case where the imaging is ended, it is determined that the process is ended.

In the case where it is determined in step S120 that the process is not ended, the process returns to step S111, and the above-described processes are repeated.

On the contrary, in the case where it is determined in step S120 that the process is ended, the detection process for the occurrence of abnormality caused by the illumination condition is ended.

In the manner described above, the imaging device 11 detects the occurrence of abnormality caused by the illumination condition based on the detection result for each color component. In this manner, by detecting the occurrence of abnormality caused by the illumination condition, warning can be issued to the user if necessary. Therefore, the user can more simply grasp the imaging situation, for example, the occurrence of abnormality caused by the illumination condition.

Furthermore, herein, although the example where difference absolute values of the ratios of the integration values of the color components are used for determining whether or not appropriate white balance control is available is described, any information about each color component of the captured image may be used.

For example, the difference absolute value between the average value of the ratios of the integration values of the color components of some number of most recent frames and 1 may be configured to be compared with the threshold value.

In addition, the abnormality caused by the illumination condition may be configured to be detected based on the gain value of each color component for the white balance control.

<Description of Detection Process for Occurrence of Abnormality Caused by Imaging Distance>

Next, the detection process for the occurrence of abnormality caused by the imaging distance performed by the imaging device 11 will be described with reference to a flowchart of FIG. 10.

In step S151, the image quality control processing unit 78 acquires the result of the detection process performed in step S13 of FIG. 6 from the camera-control detection processing unit 76. More specifically, the focusing evaluation value of each divided area, which is calculated as the result of the detection process for the focus control, is acquired.

In step S152, the image quality control processing unit 78 calculates the control target value of the position of the focus lens of the optical system 21 and the peak value of the focusing evaluation value based on the acquired result of the detection process.

Namely, the image quality control processing unit 78 calculates a control target value indicating a position of a movement destination of the focus lens based on the focusing evaluation value of a predetermined area such as a face area obtained when the focus lens is located at each position so that the focus lens is moved in a direction where the focusing evaluation value is increased. In addition, the image quality control processing unit 78 obtains the maximum value of the focusing evaluation value of a predetermined area such as a face area obtained when the focus lens is located at each position as the peak value of the focusing evaluation value.

In step S153, the image quality control processing unit 78 defines the control instruction value based on the control target value of the focus lens.

For example, if the focus lens is moved to the position indicated by the control target value, the focusing evaluation value is increased, so that the subject of interest on the captured image can be focused. However, in some cases, with respect to the position indicated by the control target value, the focus lens may be located outside the movable range.

In this case, actually, since the focus lens cannot be allowed to be moved to the position indicated by the control target value, the limiter process is performed on the control target value, so that the movement amount is limited to be the control instruction value. Therefore, in the case where limiter process is performed, if the focus lens is moved based on the control instruction value, the focus lens is located at the end of the movable range.

Furthermore, the process of calculating the control instruction value indicating the position of the movement destination of the focus lens is the process same as the image quality control process in step S14 of FIG. 6. Namely, performing of the process of calculating the control instruction value may be the performing of the image quality control process or may be the performing of the processes of steps S152 and S153.

In step S154, the image quality control processing unit 78 determines whether or not the peak value of the focusing evaluation value is a threshold value or less.

For example, in the case where the peak value of the focusing evaluation value is the threshold value or less, even though the focus lens is moved to any position, in the state, the captured image having sufficient contrast cannot be obtained, namely, the subject cannot be sufficiently focused.

In this manner, in the case where appropriate focus control cannot be performed, in many cases, the focus lens is located at the end of the near side. Therefore, the state that the peak value of the focusing evaluation value is the threshold value or less may be the state that appropriate autofocus control cannot be performed, since the imaging distance to the subject is too close. Furthermore, in the case where the limiter process is performed on the control target value, it may be determined that, in the state, appropriate focus control cannot be performed, namely, it may be determined that the abnormality caused by the imaging distance is detected.

In the case where it is determined in step S154 that the peak value is the threshold value or less, in step S155, the image quality control processing unit 78 increments the focus abnormality counter stored in advance by 1.

Herein, the focus abnormality counter is similar to the exposure abnormality counter and represents the number of times of consecutive determination that the peak value is the threshold value or less, that is, the time (number of frames) of consecutive detection of the abnormality caused by the imaging distance.

In addition, the image quality control processing unit 78 also stores the focus abnormality flag which is set (on) when the focus abnormality counter is the predetermined value or more. The case where the focus abnormality flag is set (on) represents that the abnormality caused by the imaging distance occurs, and the case where the focus abnormality flag is reset (off) represents that the abnormality caused by the imaging distance does not occur.

If the focus abnormality counter is incremented in step S155, the process proceeds to step S158.

On the other hand, in the case where it is determined in step S154 that the peak value is not the threshold value or less, in step S156, the image quality control processing unit 78 resets the focus abnormality counter.

In step S157, the image quality control processing unit 78 resets (off) the focus abnormality flag.

Namely, in the case where the peak value is more than the threshold value, since appropriate focus control is available and the abnormality caused by the imaging distance does not occur, the focus abnormality counter is reset to 0, and the focus abnormality flag is also reset. By doing so, if the focus abnormality flag is reset, the process proceeds to step S158.

If the focus abnormality counter is incremented in step S155 or if the focus abnormality flag is reset in step S157, in step S158, the image quality control processing unit 78 determines whether or not the focus abnormality counter is a predetermined value or more.

In the case where it is determined in step S158 that the focus abnormality counter is the predetermined value or more, in step S159, the image quality control processing unit 78 sets (on) the focus abnormality flag.

In this case, since the state that appropriate focus control is not available is continuously maintained for a certain time or more, it is determined that the abnormality caused by the imaging distance occurs, and the focus abnormality flag is set. If the focus abnormality flag is set, after that, the process proceeds to step S160.

In addition, in the case where it is determined in step S158 that the focus abnormality counter is not the predetermined value or more, it is determined that the abnormality caused by the imaging distance does not occur, and the process proceeds to step S160.

If the focus abnormality flag is set in step S159 or if it is determined in step S158 that the focus abnormality counter is not the predetermined value or more, in step S160, the image quality control processing unit 78 determines whether or not the process is ended.

For example, in the case where the imaging process described with reference to FIG. 6 is ended, that is, in the case where the imaging is ended, it is determined that the process is ended.

In the case where it is determined in step S160 that the process is not ended, the process returns to step S151, and the above-described processes are repeated.

On the contrary, in the case where it is determined in step S160 that the process is ended, the detection process for the occurrence of abnormality caused by the imaging distance is ended.

In the manner described above, the imaging device 11 detects the occurrence of abnormality caused by the imaging distance based on the detection result for the focus control. In this manner, by detecting the occurrence of abnormality caused by the imaging distance, warning can be issued to the user if necessary. Therefore, the user can more simply grasp the imaging situation.

<Description of Detection Process for Occurrence of Abnormality Caused by Hand Shaking>

Figure 11:
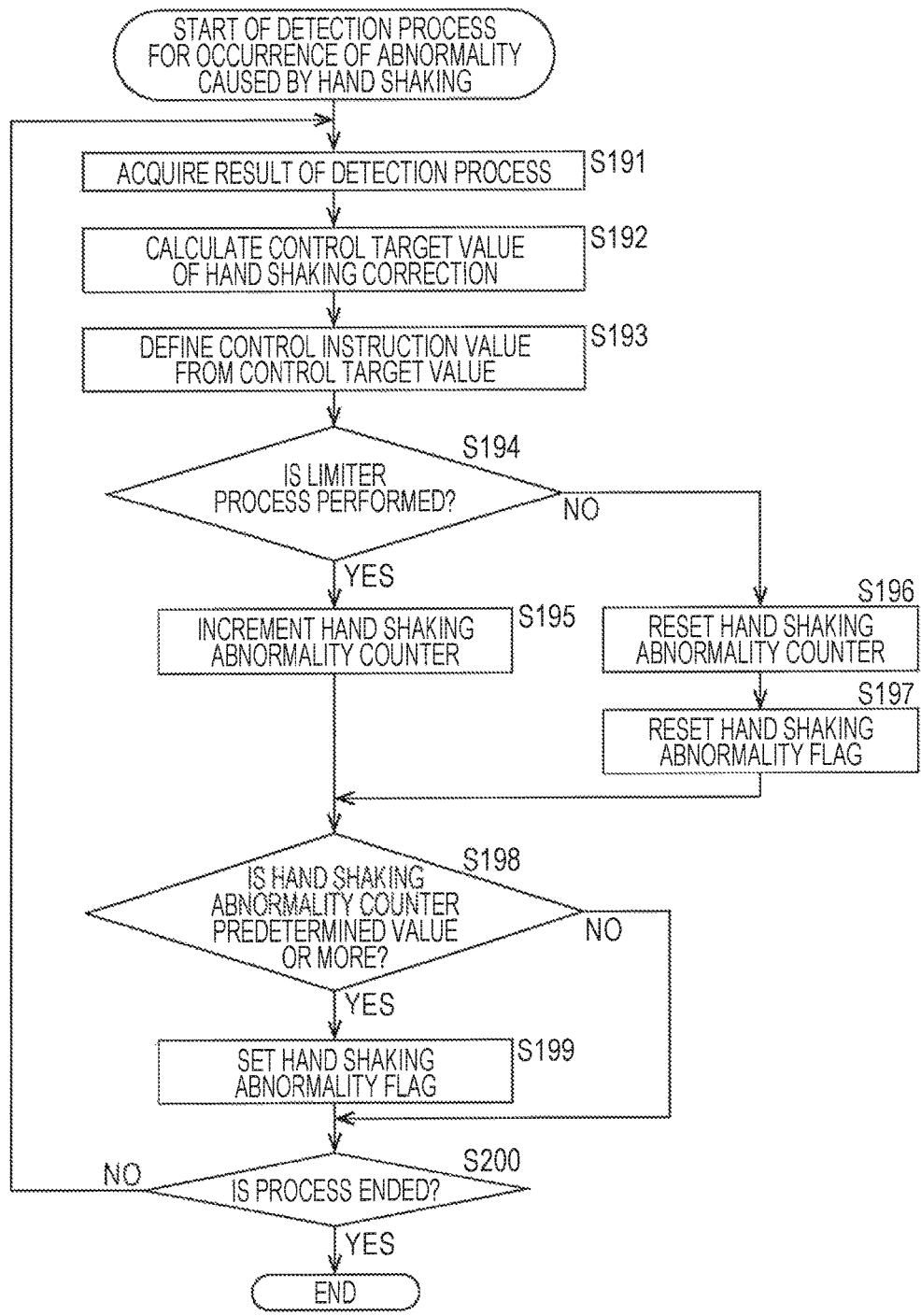
FIG. 11 is a flowchart for explaining a detection process for occurrence of abnormality caused by hand shaking.

Next, the detection process for the occurrence of abnormality caused by the hand shaking performed by the imaging device 11 will be described with reference to a flowchart of FIG. 11.

In step S191, the image quality control processing unit 78 acquires the result of the detection process performed in step S13 of FIG. 6 from the hand shaking sensor 66. More specifically, the detection result for the movement of the imaging device 11 obtained as the result of the detection process for the hand shaking correction is acquired.

In step S192, the image quality control processing unit 78 calculates the control target value of the hand shaking correction based on the acquired result of the detection process.

Namely, the image quality control processing unit 78 calculates a lens movement amount at the time of moving the shift lens of the optical system 21 so that the movement of the imaging device 11 is removed as the control target value of the hand shaking correction.

In step S193, the image quality control processing unit 78 defines the control instruction value from the obtained control target value of the hand shaking correction.

More specifically, if the shift lens of the optical system 21 is moved by the movement amount indicated in the control target value of the hand shaking correction, the blur of the subject on the captured image caused by the shaking of the imaging device 11 can be removed. However, if the shift lens is allowed to be moved according to the control target value, in some cases, the shift lens may be located outside the movable range.

In this case, actually, since the shift lens cannot be allowed to be moved by the movement amount indicated by the control target value, the limiter process is performed on the control target value, so that the movement amount is limited to be the control instruction value. Therefore, in the case where the limiter process is performed, if the shift lens is moved based on the control instruction value, the shift lens is located at the end of the movable range of the shift lens.

Herein, the process of calculating the control instruction value of the handshaking correction is the process same as the image quality control process in step S14 of FIG. 6. Namely, performing of the process of calculating the control instruction value of the hand shaking correction may be the performing of the image quality control process or may be the performing of the processes of steps S192 and S193.

In step S194, the image quality control processing unit 78 determines at the time of determining the control instruction value in step S193 whether or not the limiter process is performed.

For example, in the case where the limiter process is performed on the control target value to define the control instruction value, the shift lens of the optical system 21 is located at the end of the movable range, and in the state, appropriate hand shaking correction cannot be performed.

In the case where it is determined in step S194 that the limiter process is performed, in step S195, the image quality control processing unit 78 increments the hand shaking abnormality counter stored in advance by 1.

Herein, the hand shaking abnormality counter is similar to the exposure abnormality counter and represents the number of times of consecutive limiter processes, that is, the time (number of frames) of consecutive detection of the abnormality caused by the hand shaking.

In addition, the image quality control processing unit 78 also stores the hand shaking abnormality flag which is set (on) when the hand shaking abnormality counter is the predetermined value or more. The case where the hand shaking abnormality flag is set (on) represents that the abnormality caused by the hand shaking occurs, and the case where the hand shaking abnormality flag is reset (off) represents that the abnormality caused by the hand shaking does not occur.

If the hand shaking abnormality counter is incremented in step S195, after that, the process proceeds to step S198.

On the other hand, in the case where it is determined in step S194 that the limiter process is not performed, in step S196, the image quality control processing unit 78 resets the hand shaking abnormality counter.

In step S197, the image quality control processing unit 78 resets (off) the hand shaking abnormality flag.

Namely, in the case where the limiter process is not performed, since the appropriate hand shaking correction is available and the abnormality caused by the hand shaking does not occur, the hand shaking abnormality counter is reset to 0 and the hand shaking abnormality flag is also reset. By doing so, if the hand shaking abnormality flag is reset, the process proceeds to step S198.

If the hand shaking abnormality counter is incremented in step S195 or if the hand shaking abnormality flag is reset in step S197, in step S198, the image quality control processing unit 78 determines whether or not the hand shaking abnormality counter is a predetermined value or more.

In the case where it is determined in step S198 that the handshaking abnormality counter is the predetermined value or more, in step S199, the image quality control processing unit 78 sets (on) the hand shaking abnormality flag.

In this case, since the state that appropriate hand shaking correction is not available is continuously maintained for a certain time or more, it is determined that the abnormality caused by the hand shaking occurs, and the hand shaking abnormality flag is set. If the hand shaking abnormality flag is set, after that, the process proceeds to step S200.

In addition, in the case where it is determined in step S198 that the hand shaking abnormality counter is not the predetermined value or more, it is determined that the abnormality caused by the hand shaking does not occur, and the process proceeds to step S200.

If the hand shaking abnormality flag is set in step S199 or if it is determined in step S198 that the hand shaking abnormality counter is not the predetermined value or more, in step S200, the image quality control processing unit 78 determines whether or not the process is ended.

For example, in the case where the imaging process described with reference to FIG. 6 is ended, that is, in the case where the imaging is ended, it is determined that the process is ended.

In the case where it is determined in step S200 that the process is not ended, the process returns to step S191, and the above-described processes are repeated.

On the contrary, in the case where it is determined in step S200 that the process is ended, the detection process for the occurrence of abnormality caused by the hand shaking is ended.

In the manner described above, the imaging device 11 detects the occurrence of abnormality caused by the hand shaking based on the detection result by the handshaking sensor 66. In this manner, by detecting the occurrence of abnormality caused by the hand shaking, warning can be issued to the user if necessary. Therefore, the user can more simply grasp the imaging situation.

<Description of Detection Process for Occurrence of Abnormality Caused by Imaging Direction>

Subsequently, the detection process for the occurrence of abnormality caused by the imaging direction performed by the imaging device 11 will be described with reference to a flowchart of FIG. 12.

In step S231, the image quality control processing unit 78 acquires the result of the detection process performed in step S13 of FIG. 6 from the camera-control detection processing unit 76. More specifically, the integration value of the luminance values of each divided area calculated as the result of the detection process for the exposure control and the integration value for every color component of each divided area calculated as the result of the detection process for the white balance control are acquired.

In step S232, the image quality control processing unit 78 calculates a control target value for the exposure control and a control target value for the white balance control based on the acquired result of the detection process.

More specifically, the image quality control processing unit 78 calculates, as the control target value, each value of the aperture value of the aperture of the optical system 21, the shutter speed, the gain value of the imager 61 so that the brightness of the captured image becomes optimal brightness based on the integration value of the luminance values of each divided area and the result of the face detection process supplied from the face detection processing unit 77.

In addition, the image quality control processing unit 78 calculates, as the control target values of respective color components, the gain values of the respective color components so that the captured image has optimal white balance based on the integration values of the respective color components of each divided area and the result of the face detection process supplied from the face detection processing unit 77.

However, since the respective control target values such as the aperture, the shutter speed, and the gain of the imager 61 or the respective control target values of the gains of the color components for the white balance control are target values, in some actual cases, the control target values may exceed the values of the settable range.

Therefore, in step S233, the image quality control processing unit 78 determines the control instruction value by applying the limiter process on each control target value obtained by the process of step S232 if necessary. Namely, in the case where the control target value exceeds the value of the settable range, the control target value is corrected to a value within the settable range to be the control instruction value.

Herein, the process of calculating the control instruction value of the exposure control or the white balance control is the process same as the image quality control process of step S14 of FIG. 6. Namely, performing of the process of calculating the control instruction value of the exposure control or the white balance control may be the performing of the image quality control process or may be the performing of the processes of steps S232 and S233.

In step S234, the image quality control processing unit 78 calculates the average value of the control target values from a history of the previous control target values.

More specifically, the image quality control processing unit 78 stores the control target values of the exposure control or the white balance control which are calculated from the previous frames where the abnormality caused by the imaging direction is not detected as a history list of the control target values. For example, as the history list of the control target values, a predetermined number of the control target values defined in advance are stored for each of the aperture, the shutter speed, the gain of the imager 61, and the gains for color components.

The image quality control processing unit 78 calculates the average value of the control target values stored in the history list for each of the aperture, the shutter speed, the gain of the imager 61, and the gains of the color components.

In step S235, the image quality control processing unit 78 determines whether or not a difference between the average value of the control target values calculated in step S234 and the control target value calculated in step S232 is a threshold value or more.

For example, differences between the average value of the control target values for each of the aperture, the shutter speed, the gain of the imager 61, and the gains of the color components and the control target values are compared with the threshold value, and in the case where there is any one difference which is the threshold value or more, it is determined that the difference is the threshold value or more.

For example, in the case where the difference between the average value of the control target values and the control target values is the threshold value or more, since the difference between the up-to-now average control target value and the control target value of the current frame is large, it is determined that the imaging situation is greatly changed. Herein, the imaging situation is, for example, the brightness of the imaging space or the color balance of the imaging space.

Therefore, in the case where the difference between the average value of the control target values and the control target value is the threshold value or more, it is determined that scene change, that is, a great change of the imaging direction occurs. Therefore, in the case where the frames that are determined that the differences between the average value of the control target values and the control target values are the threshold value or more continuously exist a predetermined number of frames, since the abnormality caused by the imaging direction occurs, it may be determined that, after optimal exposure balance or white balance which is stable up to now is greatly changed, the exposure balance or the white balance is continuously stable.

In the case where it is determined in step S235 that the difference is the threshold value or more, in step S236, the image quality control processing unit 78 increments the imaging direction abnormality counter stored in advance by 1.

Herein, the imaging direction abnormality counter is similar to the exposure abnormality counter and represents the number of times of consecutive determination that the difference between the average value of the control target values and the control target value is the threshold value or more, that is, the time (number of frames) of consecutive detection of the abnormality caused by the imaging direction.

In addition, the image quality control processing unit 78 also stores the imaging direction abnormality flag which is set (on) when the imaging direction abnormality counter is the predetermined value or more. The case where the imaging direction abnormality flag is set (on) represents that the abnormality caused by the imaging direction occurs, and the case where the imaging direction abnormality flag is reset (off) represents that the abnormality caused by the imaging direction does not occur.

If the imaging direction abnormality counter is incremented in step S236, after that, the process proceeds to step S240.

On the other hand, in the case where it is determined in step S235 that the difference is not the threshold value or more, in step S237, the image quality control processing unit 78 resets the imaging direction abnormality counter.

In step S238, the image quality control processing unit 78 adds each control target value of the current frame, which is calculated in step S232 to the history list. In this case, if necessary, the control target value of the frame of the earliest time point among the frame stored up to now in the history list is removed.

In step S239, the image quality control processing unit 78 resets (off) the imaging direction abnormality flag.

Namely, in the case where the difference is not the threshold value or more, since the exposure or the white balance is stable and the abnormality caused by the imaging direction is not detected, the imaging direction abnormality counter is reset to 0 and the imaging direction abnormality flag is also reset.

In addition, since the abnormality caused by the imaging direction is not detected, the updating of the history list is also performed. Furthermore, the control target value for the frame where the abnormality caused by the imaging direction is not detected is added to the history list, for example, in order that the control target value of an exceptional frame, for example, a frame where a person goes across the front of the imaging device 11 is not added to the history list.

By doing so, if the imaging direction abnormality flag is reset, the process proceeds to step S240.

If the imaging direction abnormality counter is incremented in step S236 or if the imaging direction abnormality flag is reset in step S239, in step S240, the image quality control processing unit 78 determines whether or not the imaging direction abnormality counter is a predetermined value or more.

In the case where it is determined in step S240 that the imaging direction abnormality counter is the predetermined value or more, in step S241, the image quality control processing unit 78 sets (on) the imaging direction abnormality flag.

In this case, after the optimal exposure balance or white balance which has been stable up to now is greatly changed, the exposure balance or the white balance becomes stable gain. Therefore, it is determined that the abnormality caused by the imaging direction occurs, and the imaging direction abnormality flag is set. If the imaging direction abnormality flag is set, after that, the process proceeds to step S242.

In addition, in the case where it is determined in step S240 that the imaging direction abnormality counter is not the predetermined value or more, it is determined that the abnormality caused by the imaging direction does not occur, and the process proceeds to step S242.

If the imaging direction abnormality flag is set in step S241 or if it is determined in step S240 that the imaging direction abnormality counter is not the predetermined value or more, in step S242, the image quality control processing unit 78 determines whether or not the process is ended.

For example, in the case where the imaging process described with reference to FIG. 6 is ended, that is, in the case where the imaging is ended, it is determined that the process is ended.

In the case where it is determined in step S242 that the process is not ended, the process returns to step S231, and the above-described processes are repeated.

On the contrary, in the case where it is determined in step S242 that the process is ended, the detection process for the occurrence of abnormality caused by the imaging direction is ended.

In the manner described above, the imaging device 11 detects the occurrence of abnormality caused by the imaging direction based on the detection result for the exposure control or the white balance control. In this manner, by detecting the occurrence of abnormality caused by the imaging direction, warning can be issued to the user if necessary.

Therefore, the user can more simply grasp the imaging situation.

<Description of Detection Process for Occurrence of Abnormality Caused by Face Loss>

Figure 13:
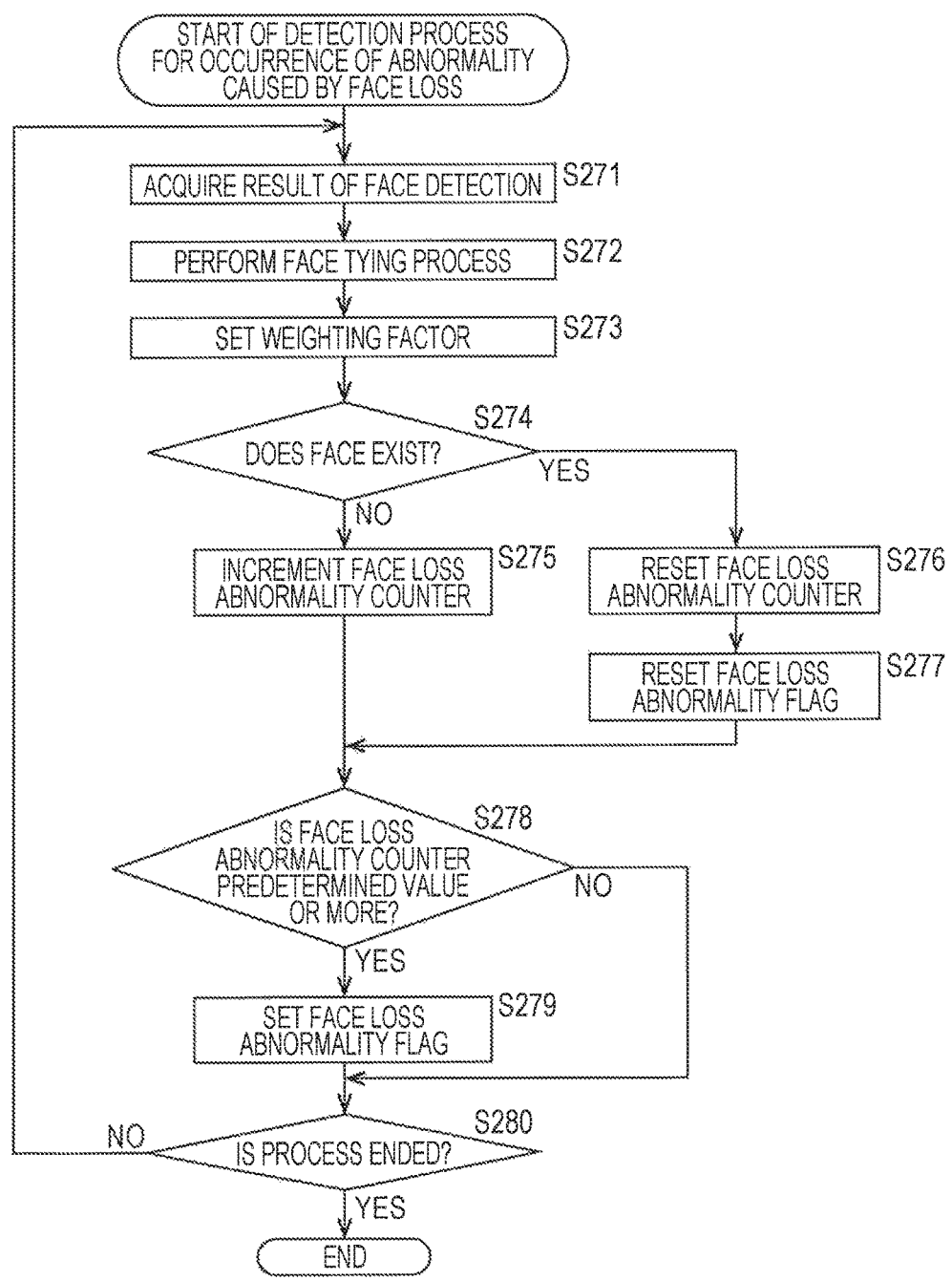
FIG. 13 is a flowchart for explaining a detection process for occurrence of abnormality caused by face loss.

In addition, the detection process for the occurrence of abnormality caused by the face loss performed by the imaging device 11 will be described with reference to a flowchart of FIG. 13.

In step S271, the image quality control processing unit 78 acquires the result of face detection performed in step S12 of FIG. 6 from the face detection processing unit 77

In step S272, the image quality control processing unit 78 performs a face tying process based on the acquired result of face detection.

Namely, it is identified whether or not there is a face which is a tracking target in the faces detected from the captured image of the current frame. In the case where it is identified that there is a face which is a tracking target, the area of the identified face as an area of the tracking target face can be allowed to be in association with the respective areas of the tracking target face of the previous frames.

Herein, the face which is a tracking target may be a face designated in the captured image of the first frame by the user's manipulating the user interface 63 or may be a face which is registered in advance. In the case where faces of respective persons are registered in advance, feature amounts of the respective faces may be recorded in the recording unit 68 or the like in advance. In addition, in the case where one face is detected from the captured image of the first frame, the face may be set as the tracking target.

For example, in the face tying process, in the case where the face detected from the captured image of the current frame is located within a predefined distance from the position of the tracking target face in the captured image of the frame just before the current frame, the face of the captured image of the current frame is set as the tracking target face.

In addition, by comparing the feature amount calculated with respect to the tracking target face with the feature amount extracted from the area of the face on the captured image of the current frame, it may be identified whether or not the face on the captured image of the current frame is the tracking target face.

In step S273, the image quality control processing unit 78 sets a weighting factor to the result of the detection process so that the image quality of the area of the tracking target face identified in the process of step S272 becomes an optimal image quality.

Figure 10:
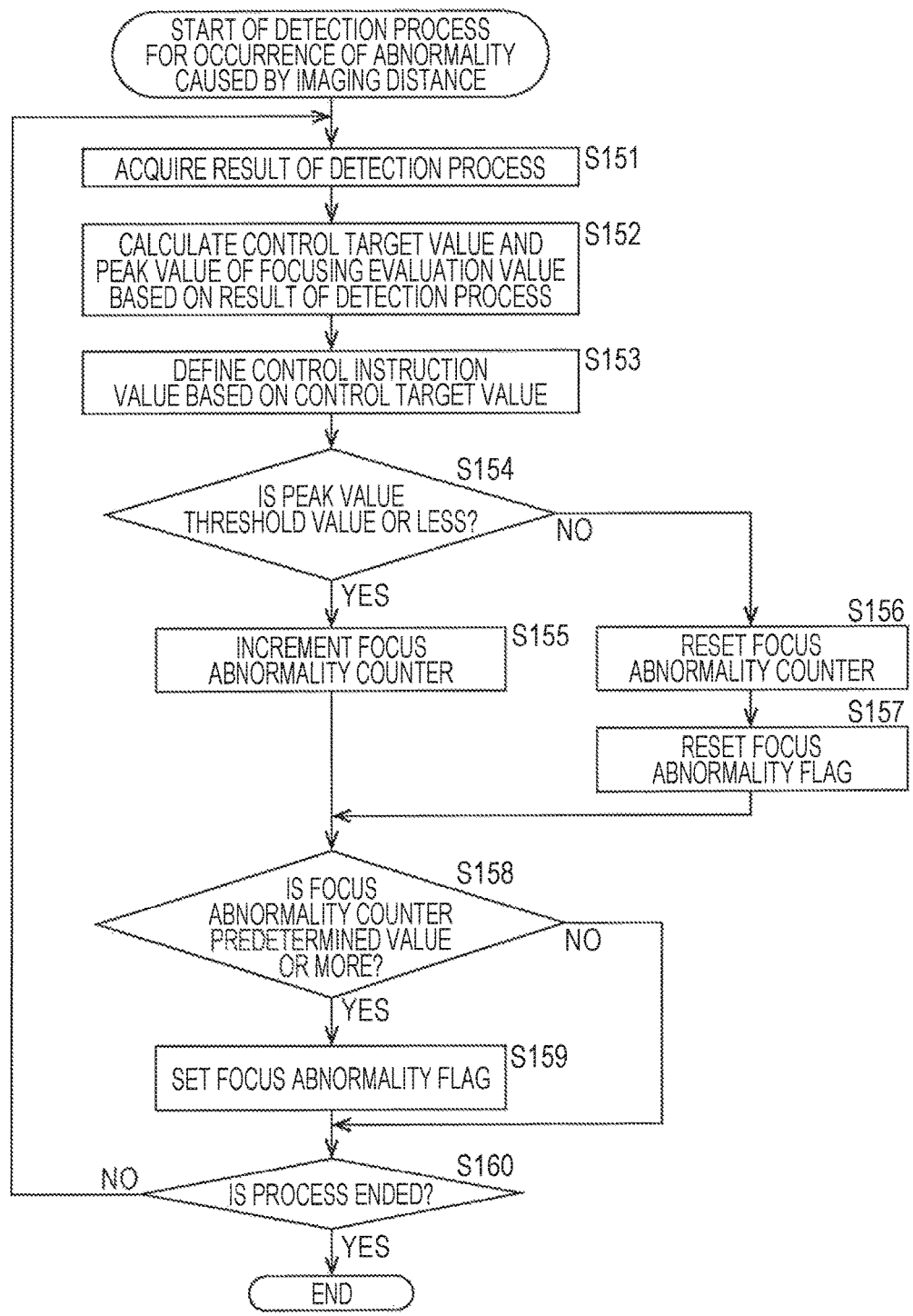
FIG. 10 is a flowchart for explaining a detection process for occurrence of abnormality caused by an imaging distance.
Figure 12:
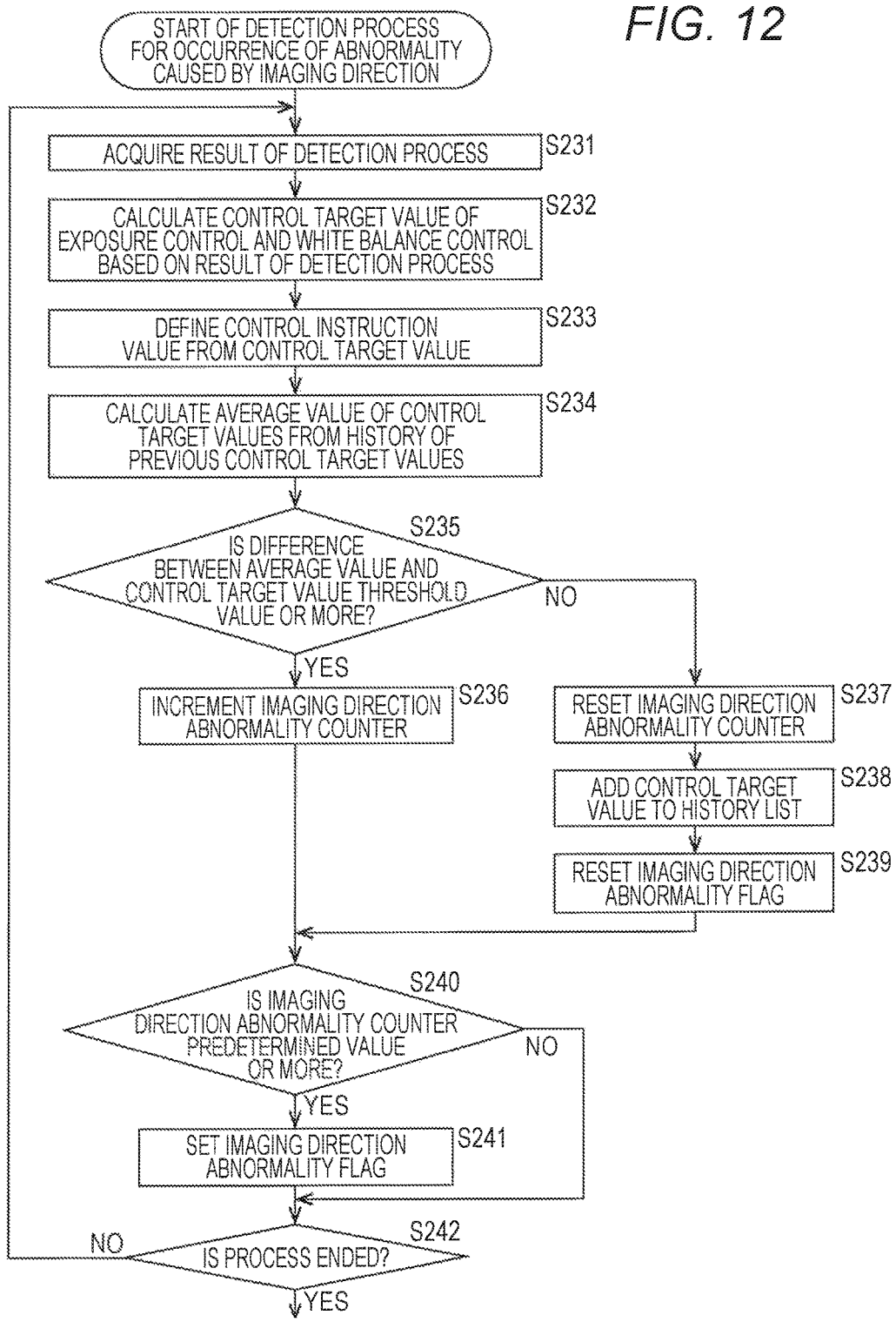
FIG. 12 is a flowchart for explaining a detection process for occurrence of abnormality caused by an imaging direction.

The above-described calculation of the respective control instruction values (control target values), that is, the process of step S14 of FIG. 6, the processes of steps S152 and S153 of FIG. 10, and the processes of steps S232 and S233 of FIG. 12 are performed based on the weighting factor which is set in this manner.

Therefore, for example, in step S152 of FIG. 10, the control target value of the focus lens is calculated so that the face area is focused. In addition, for example, in step S232 of FIG. 12, the control target value of the exposure control or the white balance control is calculated by placing emphasis on the face area.

In step S274, the image quality control processing unit 78 determines whether or not a face which is a tracking target exists on the captured image of the current frame.

For example, in the face tying process of step S272, in the case where it is identified that there is a face which is a tracking target, it is determined that the tracking target face exists.

Herein, the state that a tracking target face which exists up to now does not exist on the captured image of the current is the state that a person who is a tracking target is outside an imaging view (frame) of the imaging device 11. Therefore, in this case, in the state, the abnormality caused by the face loss is detected.

In the case where it is determined in step S274 that the face does not exist, in step S275, the image quality control processing unit 78 increments the face loss abnormality counter stored in advance by 1.

Herein, the face loss abnormality counter is similar to the exposure abnormality counter and represents the number of times of consecutive determination that the tracking target face does not exist, that is, the time (number of frames) of consecutive detection of the abnormality caused by the face loss.

In addition, the image quality control processing unit 78 also stores the face loss abnormality flag which is set (on) when the face loss abnormality counter is the predetermined value or more. The case where the face loss abnormality flag is set (on) represents that the abnormality caused by the face loss occurs, and the case where the face loss abnormality flag is reset (off) represents that the abnormality caused by the face loss does not occur.

If the face loss abnormality counter is incremented in step S275, after that, the process proceeds to step S278.

On the other hand, in the case where it is determined in step S274 that the face exists, in step S276, the image quality control processing unit 78 resets the face loss abnormality counter.

In step S277, the image quality control processing unit 78 resets (off) the face loss abnormality flag.

Namely, in the case where the tracking target face exists, since the tracking of a desired face is successful and the abnormality caused by the face loss is not detected, the face loss abnormality counter is reset to 0 and the face loss abnormality flag is also reset. By doing so, if the face loss abnormality flag is reset, the process proceeds to step S278.

If the face loss abnormality counter is incremented in step S275 or if the face loss abnormality flag is reset in step S277, in step S278, the image quality control processing unit 78 determines whether or not the face loss abnormality counter is a predetermined value or more.

In the case where it is determined in step S278 that the face loss abnormality counter is the predetermined value or more, in step S279, the image quality control processing unit 78 sets (on) the face loss abnormality flag.

In this case, since the abnormality caused by the face loss is continuously detected for a predetermined time or more, it is determined that the abnormality caused by the face loss occurs, and the face loss abnormality flag is set. If the face loss abnormality flag is set, after that, the process proceeds to step S280.

In addition, in the case where it is determined in step S278 that the face loss abnormality counter is not the predetermined value or more, it is determined that the abnormality caused by the face loss does not occur, and the process proceeds to step S280.

If the face loss abnormality flag is set in step S279 or if it is determined in step S278 that the face loss abnormality counter is not the predetermined value or more, in step S280, the image quality control processing unit 78 determines whether or not the process is ended.

For example, in the case where the imaging process described with reference to FIG. 6 is ended, that is, in the case where the imaging is ended, it is determined that the process is ended.

In the case where it is determined in step S280 that the process is not ended, the process returns to step S271, and the above-described processes are repeated.

On the contrary, in the case where it is determined in step S280 that the process is ended, the detection process for the occurrence of abnormality caused by the face loss is ended.

In the manner described above, the imaging device 11 identifies based on the result of face detection whether or not the tracking target face exists and detects the occurrence of the abnormality caused by the face loss. In this manner, by detecting the occurrence of the abnormality caused by the face loss, warning can be issued to the user if necessary.

Therefore, the user can more simply grasp the imaging situation.

<Description of Detection Process for Occurrence of Abnormality Caused by Battery>

Figure 14:
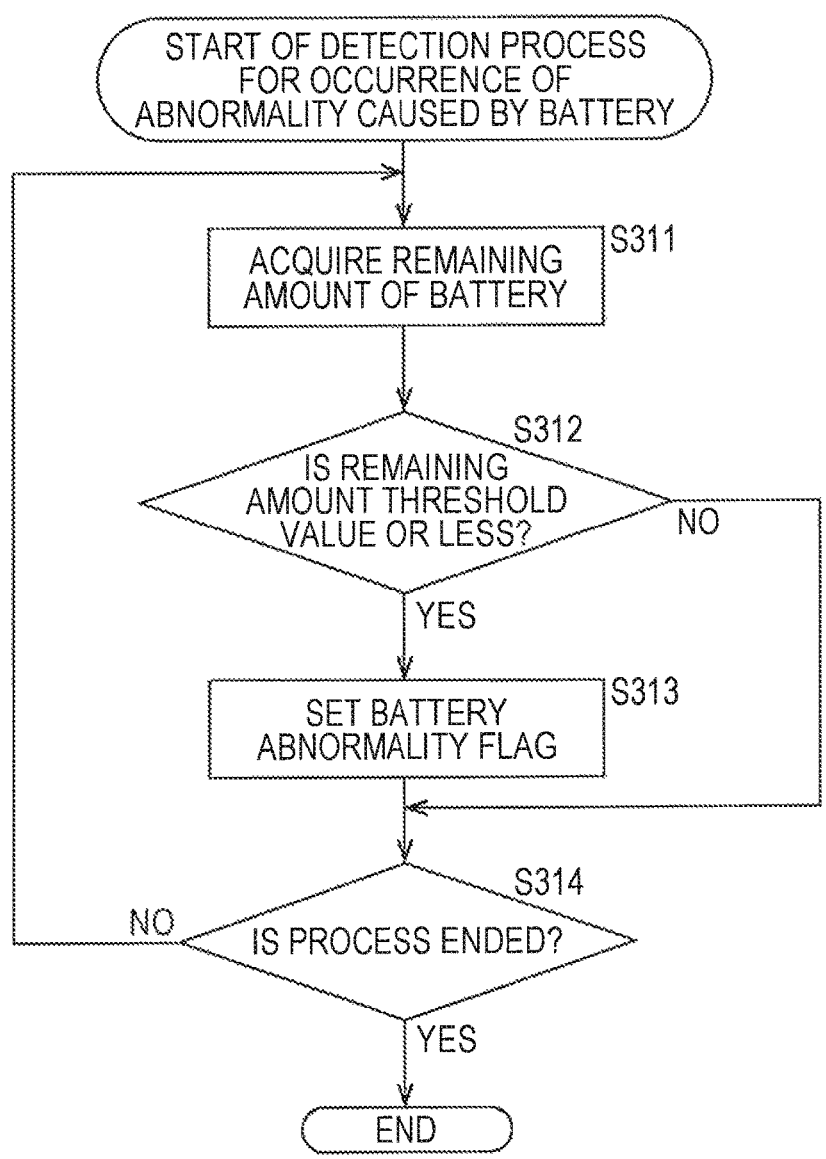
FIG. 14 is a flowchart for explaining a detection process for occurrence of abnormality caused by a battery.

In addition, the detection process for the occurrence of abnormality caused by the battery performed by the imaging device 11 will be described with reference to a flowchart of FIG. 14.

In step S311, the image quality control processing unit 78 acquires the remaining amount of the battery 67 from the battery 67.

In step S312, the image quality control processing unit 78 determines whether or not the remaining amount of the battery 67 is a threshold value or less.

In the case where it is determined in step S312 that the remaining amount is the threshold value or less, in step S313, the image quality control processing unit 78 sets (on) the battery abnormality flag. If the battery abnormality flag is set, after that, the process proceeds to step S314.

The image quality control processing unit 78 stores the battery abnormality flag which is set (on) where the remaining amount of the battery 67 is the predetermined value or less. The case where the battery abnormality flag is set (on) represents that the abnormality caused by the battery occurs, and the case where the battery abnormality flag is reset (off) represents that the abnormality caused by the battery does not occur.

In addition, in the case where it is determined in step S312 that the remaining amount is not the threshold value or less, the process proceeds to step S314.

If the battery abnormality flag is set in step S313 or if it is determined in step S312 that the remaining amount is not the threshold value or less, in step S314, the image quality control processing unit 78 determines whether or not the process is ended.

For example, in the case where the imaging process described with reference to FIG. 6 is ended, that is, in the case where the imaging is ended, it is determined that the process is ended.

In the case where it is determined in step S314 that the process is not ended, the process returns to step S311, and the above-described processes are repeated.

On the contrary, in the case where it is determined in step S314 that the process is ended, the detection process for the occurrence of abnormality caused by the battery is ended.

In the manner described above, the imaging device 11 detects the occurrence of the abnormality caused by the battery based on the remaining amount of the battery 67. In this manner, by detecting the occurrence of the abnormality caused by the battery, warning can be issued to the user if necessary. Therefore, the user can more simply grasp the imaging situation.

<Description of Warning Determination Process>

In addition, while performing the process of detecting the occurrence of the abnormality corresponding to each cause described above during the imaging, the imaging device 11 simultaneously performs the warning determination process to generate a warning flag according to the detection result for the occurrence of abnormality and transmits the warning flag to the warning generation device 12.

For example, the warning flag is generated for every cause of the above-described abnormality, that is, for every flag indicating the existence or non-existence of the abnormality obtained for each cause. Furthermore, hereinafter, in the case where there is no particular need to distinguish the exposure abnormality flag, the white balance abnormality flag, the focus abnormality flag, the hand shaking abnormality flag, the imaging direction abnormality flag, the face loss abnormality flag, and the battery abnormality flag, these flags are simply referred to as an abnormality flag.

The imaging device 11 generates a warning flag for every abnormality flag and transmits the warning flag to the warning generation device 12. Hereinafter, the warning determination process by the imaging device 11 will be described with reference to a flowchart of FIG. 15. Furthermore, the warning determination process is performed for every abnormality flag.

In step S341, the warning determination processing unit 79 determines with reference to the abnormality flag stored in the image quality control processing unit 78 whether or not the abnormality flag is set, that is, whether or not the abnormality flag is on.

In the case where it is determined in step S341 that the abnormality flag is set, in step S342, the warning determination processing unit 79 sets (on) the warning flag, and the process proceeds to step S344.

For example, in the warning determination process, in the case where the exposure abnormality flag is a process object, the warning flag associated with the exposure is set.

On the contrary, in the case where it is determined in step S341 that the abnormality flag is not set, in step S343, the warning determination processing unit 79 resets (off) the warning flag, and the process proceeds to step S344.

If the warning flag is set in step S342 or if the warning flag is set in step S343, the process of step S344 is performed.

Namely, in step S344, the warning determination processing unit 79 supplies the warning flag to the wireless transmission unit 69 through the digital signal process LSI 62 and instructs the transmission of the warning flag.

In step S345, the wireless transmission unit 69 transmits the warning flag supplied from the warning determination processing unit 79 to the warning generation device 12 in a wireless manner.

In step S346, the warning determination processing unit 79 determines whether or not the process is ended. For example, in the case where the imaging process described with reference to FIG. 6 is ended, that is, in the case where the imaging is ended, it is determined that the process is ended.

In the case where it is determined in step S346 that the process is not ended, the process returns to step S341, and the above-described processes are repeated. Namely, the warning flag is continuously transmitted at a predetermined time interval.

On the contrary, in the case where it is determined in step S346 that the imaging is ended, the warning determination process is ended.

In the manner described above, the imaging device 11 monitors the abnormality flag to generate a warning flag and transmits the warning flag to the warning generation device 12. Therefore, the warning can be issued to the user for every cause of the occurrence of abnormality, so that the user can simply grasp the imaging situation by the warning generation device 12 separated from the imaging device 11. Furthermore, the warning flag is not always transmitted to the warning generation device 12, but only when the abnormality occurs, the warning flag may be configured to be transmitted.

<Description of Warning Process>

Figure 7:
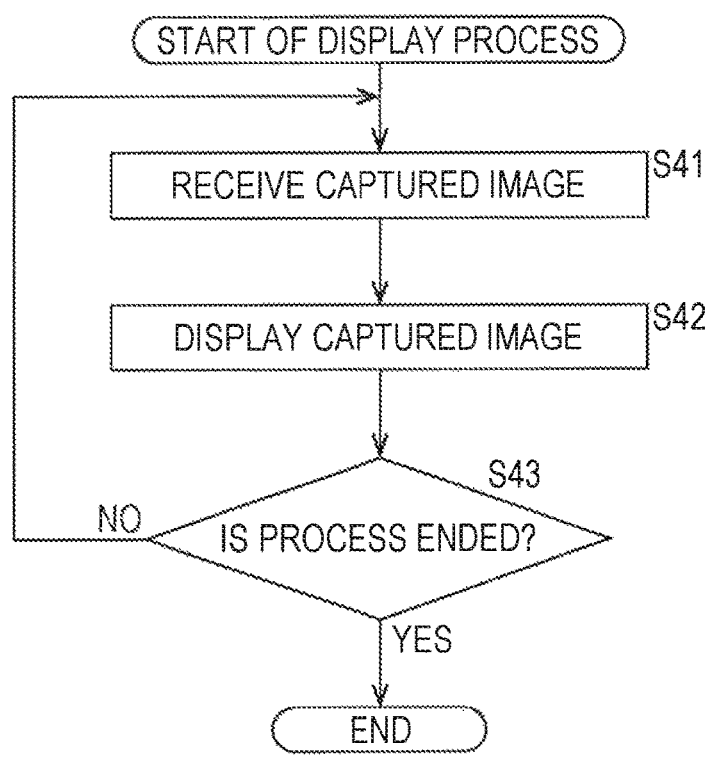
FIG. 7 is a flowchart for explaining a display process.

As described above, during the time when the imaging process of FIG. 6 is performed by the imaging device 11, in the warning generation device 12, the display process of FIG. 7 is performed.

In addition, during the time when the imaging process is performed, the warning generation device 12 performs the warning process at the same time of the display process to issue the warning according to the warning flag. Hereinafter, the warning process by the warning generation device 12 will be described with reference to a flowchart of FIG. 16.

Furthermore, the warning process is performed for the respective causes of the occurrence of abnormality, that is, for each of the abnormality caused by the light source condition, the abnormality caused by the illumination condition, the abnormality caused by the imaging distance, the abnormality caused by the hand shaking, the abnormality caused by the imaging direction, the abnormality caused by the face loss, and the abnormality caused by the battery.

In step S371, the wireless reception unit 91 receives the warning flag transmitted from the wireless transmission unit 69 of the imaging device 11 and supplies the warning flag to the digital signal processing unit 92. In addition, the digital signal processing unit 92 supplies the warning flag supplied from the wireless reception unit 91 to the control unit 93.

In step S372, the warning means control processing unit 105 of the control unit 93 determines whether or not the warning flag supplied from the digital signal processing unit 92 is on, that is, whether or not the warning flag is set.

In the case where it is determined in step S372 that the warning flag is not on, namely, the warning flag is off, the process proceeds to step S376.

On the contrary, in the case where it is determined in step S372 that the warning flag is on, in step S373, the warning means control processing unit 105 selects a warning ion according to the cause of abnormality.

For example, in the case where the warning flag which is a process object is a warning flag associated with the abnormality caused by the light source condition, the warning means control processing unit 105 selects a warning icon which is defined in advance with respect to the abnormality caused by the light source condition. Namely, different warning icons for the respective causes (types) of the abnormality are selected.

In step S374, the warning means control processing unit 105 supplies the selected warning icon to the display processing unit 101 of the digital signal processing unit 92 and instructs the display processing unit 101 to display the warning icon. The display processing unit 101 supplies the warning icon supplied from the warning means control processing unit 105 to the display unit 31 according to the instruction of the warning means control processing unit 105 and controls the display of the warning icon.

In step S375, the display unit 31 displays the warning icon supplied from the display processing unit 101. Namely, the display unit 31 displays the warning icon by superposing the warning icon on the captured image received from the imaging device 11. Therefore, for example, the warning icon AC11 illustrated in FIG. 3 is displayed. Furthermore, information such as a text message together with the warning icon may also be displayed.

If the warning icon is displayed in step S375 or if it is determined in step S372 that the warning flag is off, the process of step S376 is performed.

In step S376, the warning means control processing unit 105 determines whether or not the process is ended. For example, in the case where the display process described with reference to FIG. 7 is ended, it is determined that the process is ended.

In the case where it is determined in step S376 that the process is not ended, the process returns to step S371, and the above-described processes are repeated. Namely, a new warning flag is received, and display of a warning icon is updated according to the warning flag.

On the contrary, in the case where it is determined in step S376 that the process is ended, the warning process is ended.

In the manner described above, the warning generation device 12 receives the warning flag and issues the warning according to the warning flag. In this manner, by issuing the warning according to the warning flag, the user can simply grasp the imaging situation by the warning generation device 12 separated from the imaging device 11. In addition, since the warning is issued for every cause of the abnormality, the user can easily and instantaneously check what kind of abnormality occurs.

Modified Example 1 of First Embodiment

Description of Warning Process

Furthermore, as described above, although the warning by display is exemplified as the method of issuing the warning to the user, as another method of issuing the warning to the user, warning by vibration may be configured to be performed.

Figure 16:
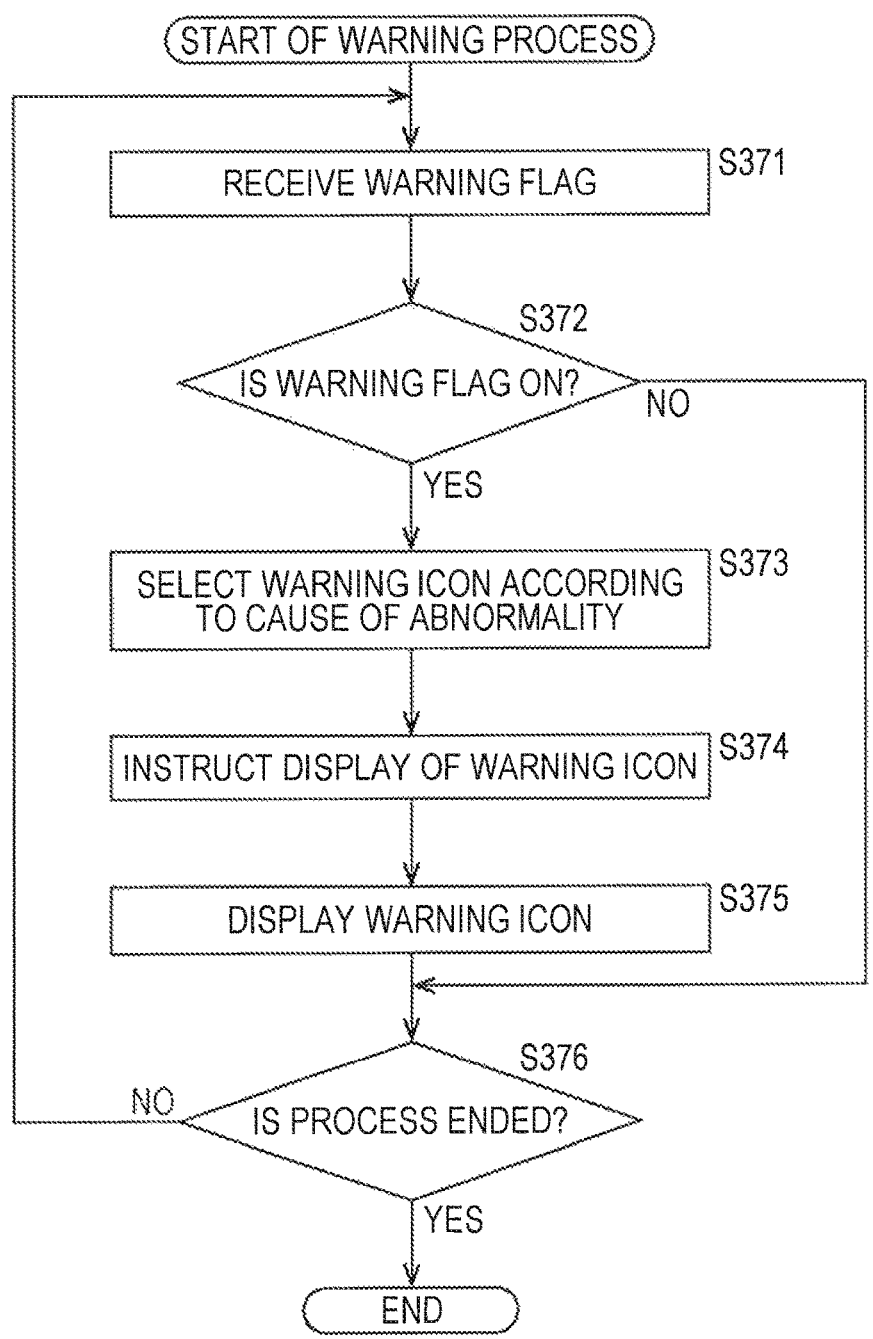
FIG. 16 is a flowchart for explaining a warning process.
Figure 17:
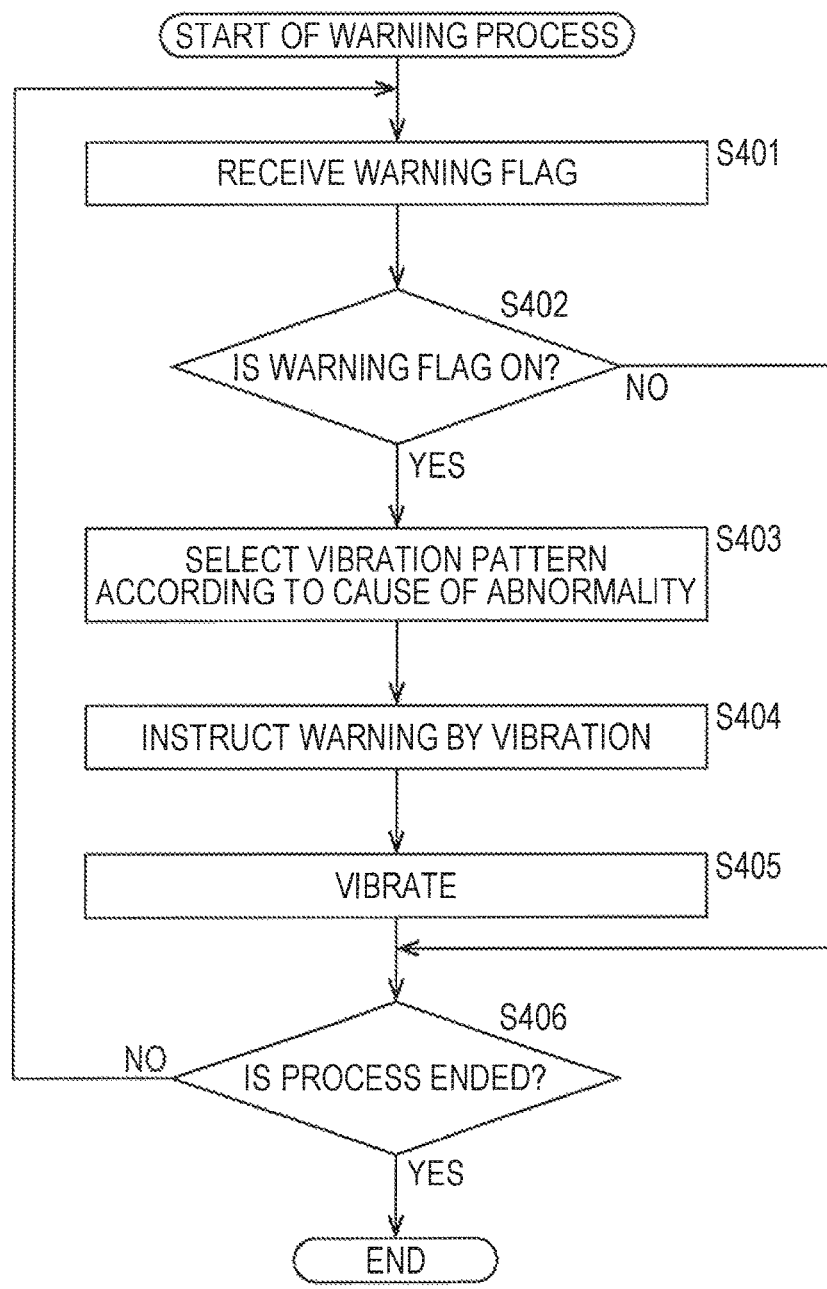
FIG. 17 is a flowchart for explaining a warning process.

In this case, as the process corresponding to the warning process described with reference to FIG. 16, for example, the process illustrated in FIG. 17 is performed. Hereinafter, the warning process using vibration performed by the warning generation device 12 will be described with reference to a flowchart of FIG. 17.

Furthermore, the warning process is also performed for every cause of the occurrence of abnormality. In addition, the processes of steps S401 and S402 are similar to the processes of steps S371 and S372 of FIG. 16, and thus, the description thereof is omitted.

In the case where it is determined in step S402 that the warning flag is on, in step S403, the warning means control processing unit 105 selects a vibration pattern according to the cause of abnormality.

For example, in the case where the warning flag which is a process object is a warning flag associated with the abnormality caused by the light source condition, the warning means control processing unit 105 selects a vibration pattern which is defined in advance with respect to the abnormality caused by the light source condition. Namely, different vibration patterns for the respective causes of the abnormality are selected.

In step S404, the warning means control processing unit 105 instructs the vibration driving processing unit 102 of the digital signal processing unit 92 to issue warning by vibration according to the selected vibration pattern.

In step S405, the vibration driving processing unit 102 drives the vibration unit 94 to be vibrated according to the instruction of the warning means control processing unit 105. If the vibration unit 94 is driven by the vibration driving processing unit 102, the vibration unit issues warning by vibrating in a predetermined vibration pattern.

If the warning is issued by vibration, after that, the process of step S406 is performed, and the warning process is ended. The process is similar to the process of step S376 of FIG. 16, and thus, the description thereof is omitted.

In the manner described above, the warning generation device 12 receives the warning flag and issues the warning by vibration according to the warning flag. In this manner, by issuing the warning according to the warning flag, the user can check simply the imaging situation without viewing the display unit 31 of the warning generation device 12. In addition, since the warning is issued for every cause of the abnormality, the user can easily and instantaneously check what kind of abnormality occurs.

Modified Example 2 of First Embodiment

Description of Warning Process

In addition, as another method of issuing the warning to the user, the warning by audio may be configured to be performed.

Figure 18:
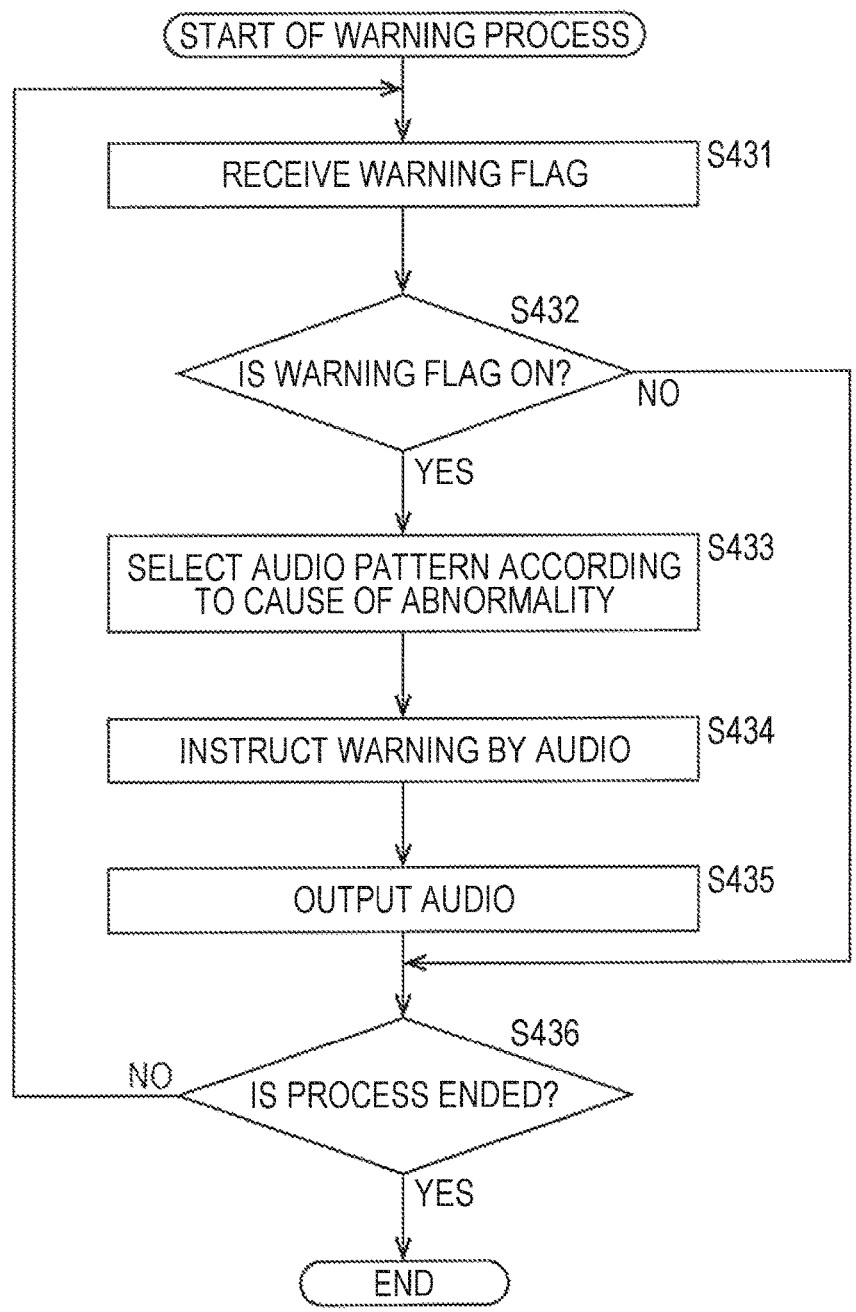
FIG. 18 is a flowchart for explaining a warning process.

In this case, as the process corresponding to the warning process described with reference to FIG. 16, for example, the process illustrated in FIG. 18 is performed. Hereinafter, the warning process using audio performed by the warning generation device 12 will be described with reference to a flowchart of FIG. 18.

Furthermore, the warning process is performed for every cause of the occurrence of abnormality. In addition, the processes of steps S431 and S432 are similar to the processes of steps S371 and S372 of FIG. 16, and thus, the description thereof is omitted.

In the case where it is determined in step S432 that the warning flag is on, in step S433, the warning means control processing unit 105 selects an audio pattern according to the cause of abnormality.

For example, in the case where the warning flag which is a process object is a warning flag associated with the abnormality caused by the light source condition, the warning means control processing unit 105 selects an audio pattern which is defined in advance with respect to the abnormality caused by the light source condition. Namely, different audio patterns for the respective causes of the abnormality are selected.

In step S434, the warning means control processing unit 105 instructs the speaker driving processing unit 103 of the digital signal processing unit 92 to issue the warning by audio output according to a selected audio pattern.

In step S435, the speaker driving processing unit 103 supplies the audio signal according to a designated audio pattern to the speaker 95 according to the instruction of the warning means control processing unit 105 to output audio. The speaker 95 issues the warning by reproducing warning audio in a predetermined audio pattern based on the audio signal supplied from the speaker driving processing unit 103.

If the warning is issued by audio, after that, the process of step S436 is performed, and the warning process is ended. The process is similar to the process step S376 of FIG. 16, and thus, the description thereof is omitted.

In the manner described above, the warning generation device 12 receives the warning flag and issues the warning by audio according to the warning flag. In this manner, by issuing the warning according to the warning flag, the user can check simply the imaging situation without viewing the display unit 31 of the warning generation device 12. In addition, since the warning is issued for every cause of the abnormality, the user can easily and instantaneously check what kind of abnormality occurs.

Modified Example 3 of First Embodiment

Description of Warning Process

In addition, as another method of issuing the warning to the user, the warning by lighting may be configured to be performed.

Figure 19:
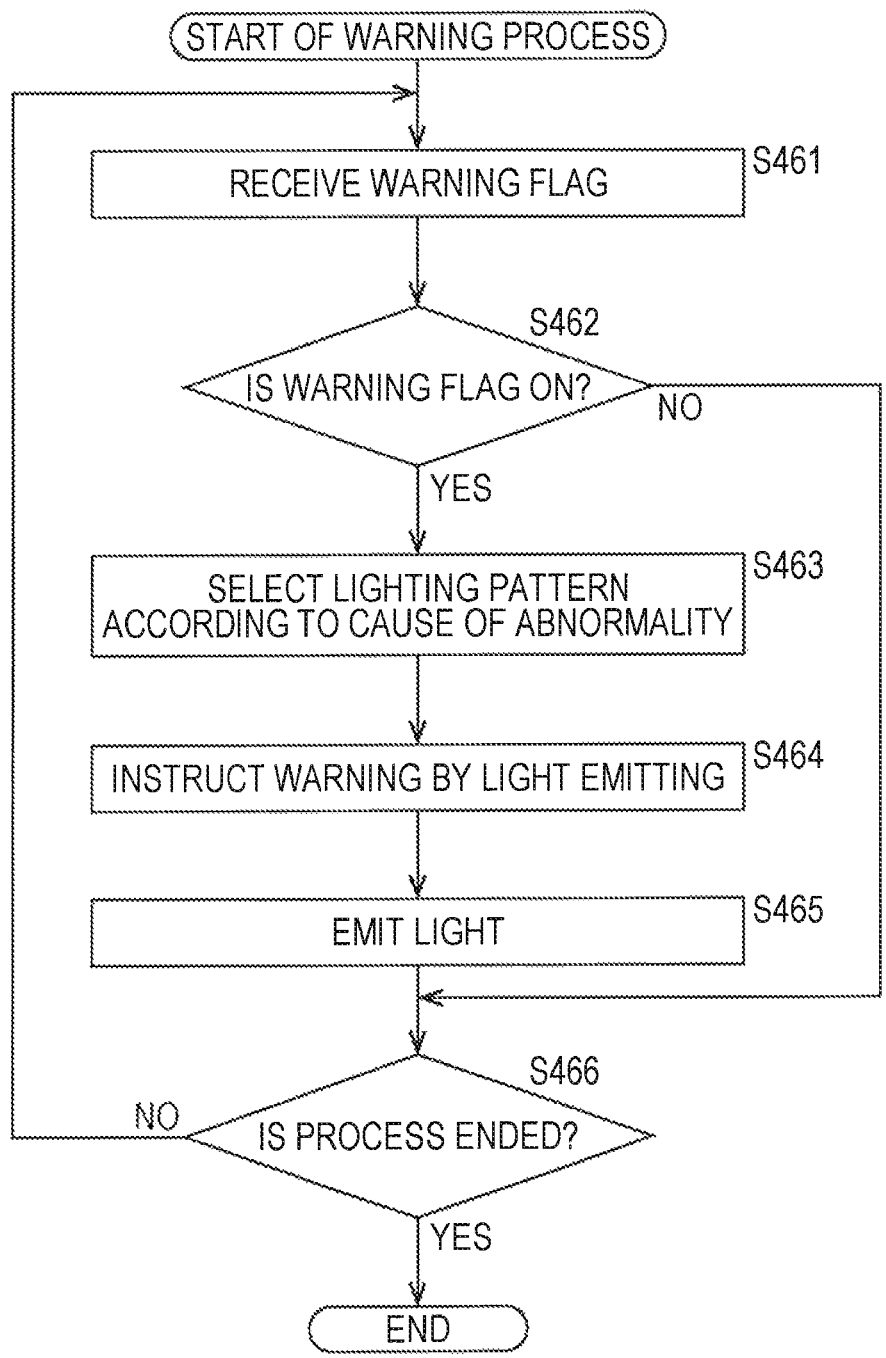
FIG. 19 is a flowchart for explaining a warning process.

In this case, as the process corresponding to the warning process described with reference to FIG. 16, for example, the process illustrated in FIG. 19 is performed. Hereinafter, the warning process by lighting performed by the warning generation device 12 will be described with reference to a flowchart of FIG. 19.

Furthermore, the warning process is also performed for every cause of the occurrence of abnormality. In addition, the processes of steps S461 and S462 are similar to the processes of steps S371 and S372 of FIG. 16, and thus, the description thereof is omitted.

In the case where it is determined in step S462 that the warning flag is on, in step S463, the warning means control processing unit 105 selects a lighting pattern according to the cause of abnormality.

For example, in the case where the warning flag which is a process object is a warning flag associated with the abnormality caused by the light source condition, the warning means control processing unit 105 selects a lighting pattern which is defined in advance with respect to the abnormality caused by the light source condition. Namely, different lighting patterns for the respective causes of the abnormality are selected.

In step S464, the warning means control processing unit 105 instructs the light-emitting element driving processing unit 104 of the digital signal processing unit 92 to issue the warning by light-emitting (lighting) according to a selected lighting pattern.

In step S465, the light-emitting element driving processing unit 104 drives the light-emitting element 96 according to the instruction of the warning means control processing unit 105 and allows the light-emitting element 96 to emit light according to a designated lighting pattern. If the light-emitting element 96 is driven by the light-emitting element driving processing unit 104, the light-emitting element emits (lights) light in a predetermined lighting pattern, so that the warning is issued.

If the warning is issued by light, after that, the process of step S466 is performed, and the warning process is ended. The process is similar to the process of step S376 of FIG. 16, and thus, the description thereof is omitted.

In the manner described above, the warning generation device 12 receives the warning flag and issues the warning by light corresponding to the warning flag. In this manner, by issuing the warning according to the warning flag, the user can simply check the imaging situation without viewing the display unit 31 of the warning generation device 12. In addition, since the warning is issued for every cause of the abnormality, the user can easily and instantaneously check what kind of abnormality occurs.

Furthermore, heretofore, although the examples where warning is issued by image display, audio output, vibration, and light emitting are described, warning may be issued by a combination of the methods, and warning may be issued by different methods for the respective causes of the abnormality. For example, in the case where the warning is issued by different methods for the respective causes of the abnormality, for example, with respect to the abnormality caused by the light source condition, an image may be displayed, and with respect to the abnormality caused by the illumination condition, the warning by audio may be issued.

In addition, heretofore, although the example where the warning generation device 12 issues warning is described, the imaging device 11 may issue warning based on the warning flag.

Second Embodiment

Configuration Example of Warning Generation Device

In addition, heretofore, although the example where the imaging situation is monitored and the warning flag is generated in the imaging device 11 side is described, the warning flag may be configured to be generated in the warning generation device side. In this case, the warning generation device is configured as illustrated in, for example, FIG. 20. Furthermore, in FIG. 20, the components corresponding to those of the case of FIG. 2 are denoted by the same reference numerals, and the description thereof is appropriately omitted.

Figure 20:
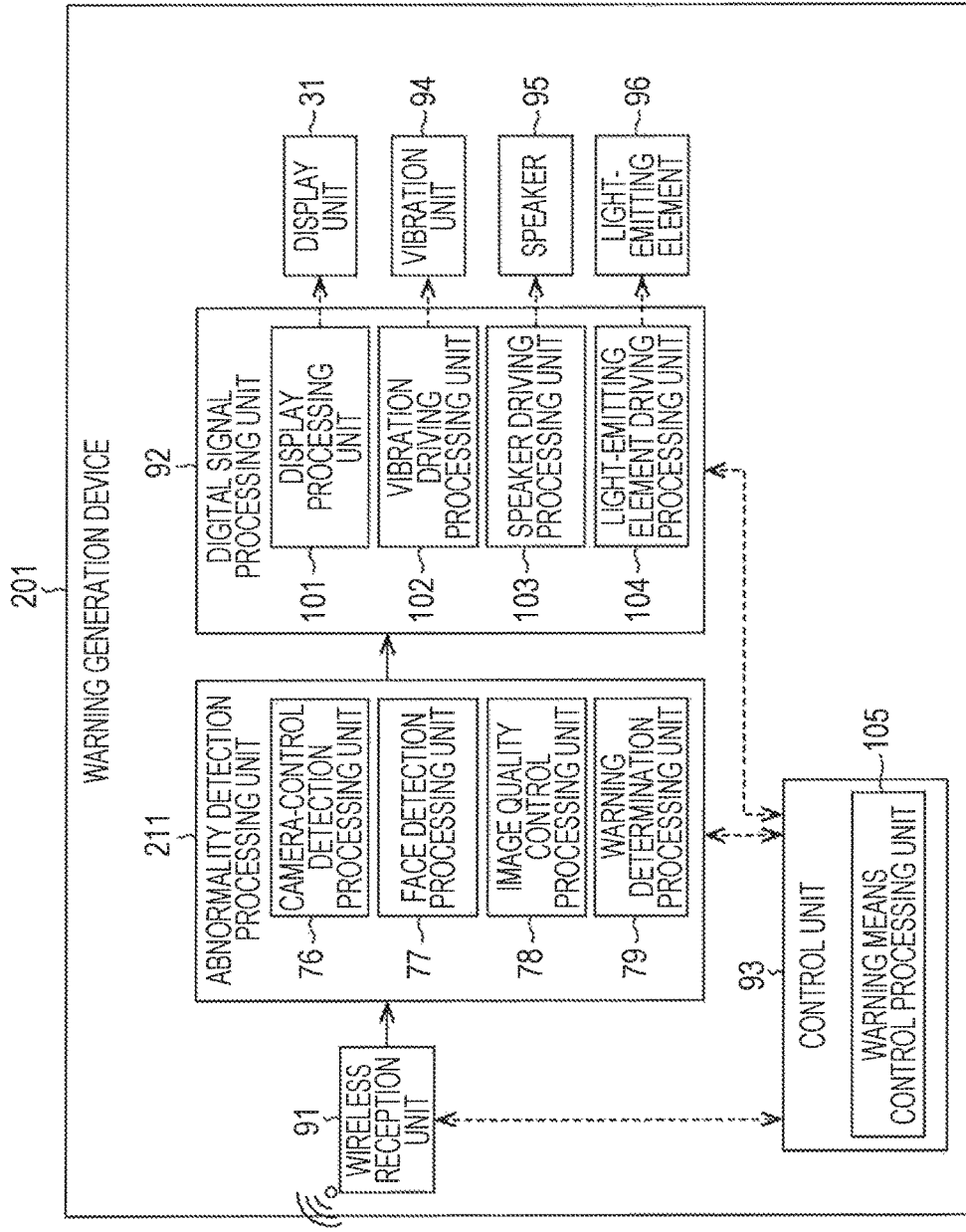
FIG. 20 is a diagram illustrating a configuration example of functions of a warning generation device.

The warning generation device 201 illustrated in FIG. 20 is configured to include a wireless reception unit 91, an abnormality detection processing unit 211, a digital signal processing unit 92, a control unit 93, a display unit 31, a vibration unit 94, a speaker 95, and a light-emitting element 96.

The configuration of the warning generation device 201 of FIG. 20 is different from the configuration of the warning generation device 12 of FIG. 2 in terms that an abnormality detection processing unit 211 is newly installed, and other configurations are the same as those of the warning generation device 12.

Under the control of the control unit 93, the abnormality detection processing unit 211 monitors the imaging situation based on the captured image supplied from the wireless reception unit 91 and generates a warning flag.

The abnormality detection processing unit 211 is configured to include a camera-control detection processing unit 76, a face detection processing unit 77, an image quality control processing unit 78, and a warning determination processing unit 79. The abnormality detection processing unit 211 performs a portion of the processes performed by the imaging device 11 in the first embodiment.

Since the abnormality detection processing unit 211 appropriately detects the occurrence of abnormality by treating the captured image reduced by the resolution conversion unit 74 as a process object, the abnormality detection processing unit can perform the same process with a smaller process amount than the case where the imaging device 11 detects the occurrence of abnormality.

<Description of Display Process>

Next, detailed operations of the warning generation device 201 will be described. First, the display process by the warning generation device 201 will be described with reference to a flowchart of FIG. 21.

Furthermore, when the captured image imaged by the imaging device 11 is transmitted, the display process is started. In addition, the processes of steps S491 and S492 are similar to the processes of steps S41 and S42 of FIG. 7, and thus, the description thereof is omitted. In steps S491 and S492, the captured image is received by the wireless reception unit 91, and the captured image is displayed on the display unit 31.

In step S493, the face detection processing unit 77 performs face detection on the captured image supplied from the wireless reception unit 91 to detect the face area of the person from the captured image.

In step S494, the camera-control detection processing unit 76 performed the detection process based on the captured image.

Furthermore, the processes of steps S493 and S494 are similar to the processes of steps S12 and S13 of FIG. 6, and thus, the description thereof is omitted.

In step S495, the control unit 93 determines whether or not the process is ended. For example, in the case where the frames of a new captured image are not transmitted from the imaging device 11, it is determined that the process is ended.

In the case where it is determined in step S495 that the process is not ended, the process returns to step S491, and the above-described processes are repeated.

On the contrary, in the case where it is determined in step S495 that the process is ended, the display process is ended.

In the manner described above, the warning generation device 201 receives and displays the captured image, and the warning generation device may detect the face from the captured image or may perform the detection process. Therefore, the user can check an angle of view and the like by viewing the captured image displayed on the warning generation device 201 separated from the imaging device 11. In addition, the warning generation device 201 side can detect the abnormality.

<Description of Detection Process for Occurrence of Abnormality Caused by Light Source Condition>

In addition, while performing the display process described with reference to FIG. 21, the warning generation device 201 simultaneously performs the process of detecting the occurrence of abnormality. Hereinafter, the processes of detecting the occurrence of abnormality for the respective causes will be described with reference to FIGS. 22 to 26.

Figure 22:
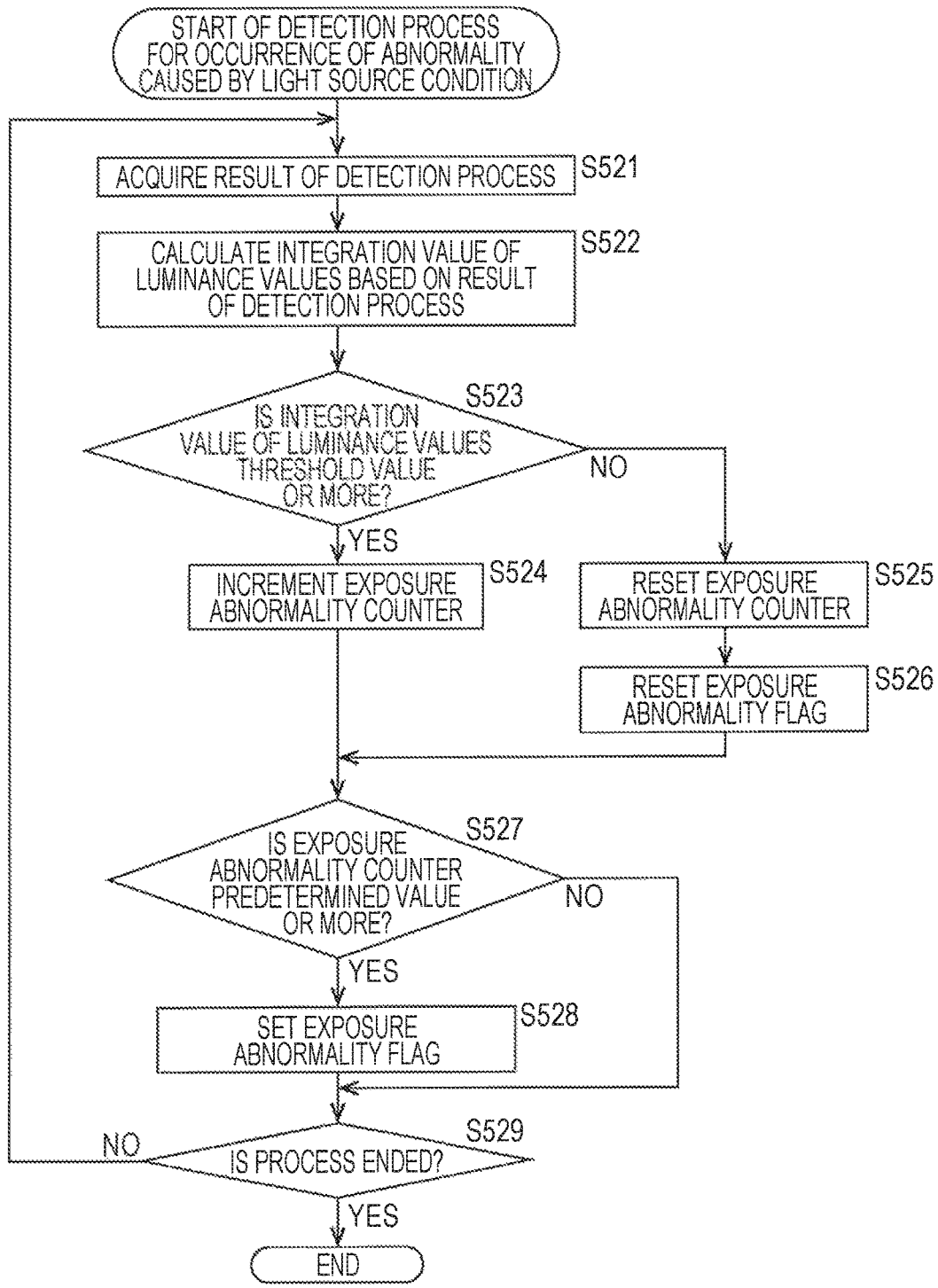
FIG. 22 is a flowchart for explaining a detection process for occurrence of abnormality caused by a light source condition.

First, the detection process for the occurrence of abnormality caused by the light source condition performed by warning generation device 201 will be described with reference to a flowchart of FIG. 22.

Figure 21:
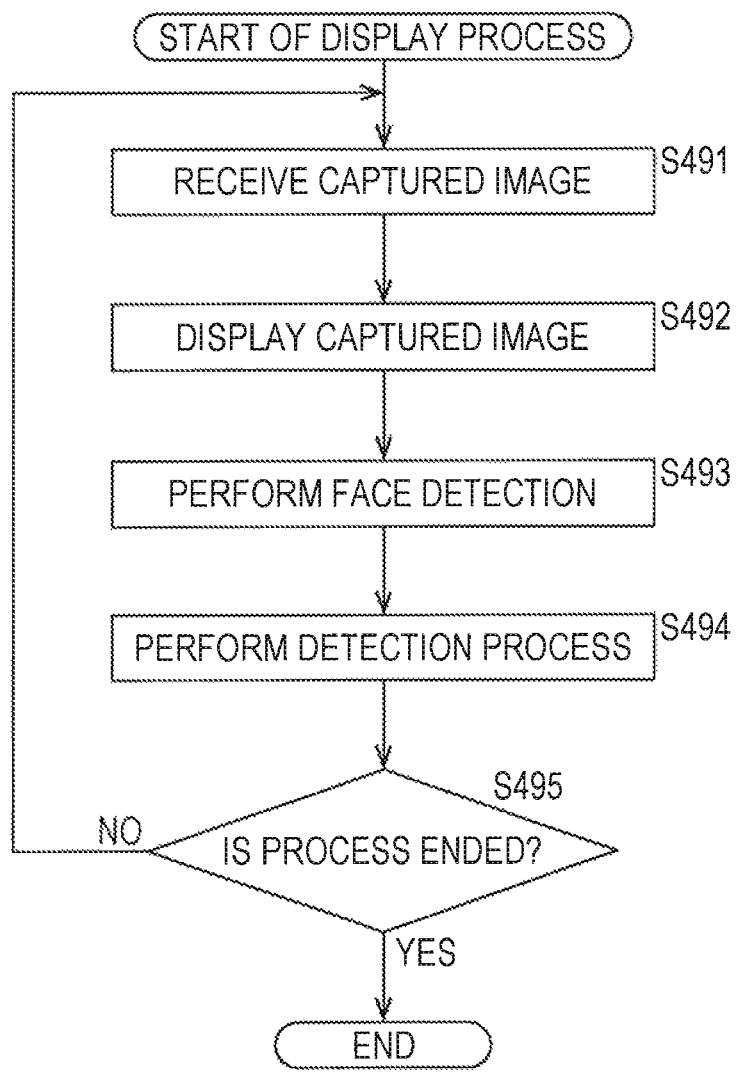
FIG. 21 is a flowchart for explaining a display process.

In step S521, the image quality control processing unit 78 acquires the result of the detection process performed in step S494 of FIG. 21 from the camera-control detection processing unit 76. More specifically, the integration value of the luminance values of each divided area of the captured image is acquired.

If the result of the detection process is acquired, after that, the processes of steps S522 to S529 are performed, and the detection process for the occurrence of abnormality caused by the light source condition is ended. The processes are similar to the processes of steps S72 to S79 of FIG. 8, and thus, the description thereof is omitted.

In the manner described above, the warning generation device 201 detects the occurrence of abnormality caused by the light source condition and sets or resets the exposure abnormality flag based on the detection result for the luminance.

<Description of Detection Process for Occurrence of Abnormality Caused by Illumination Condition>

Figure 23:
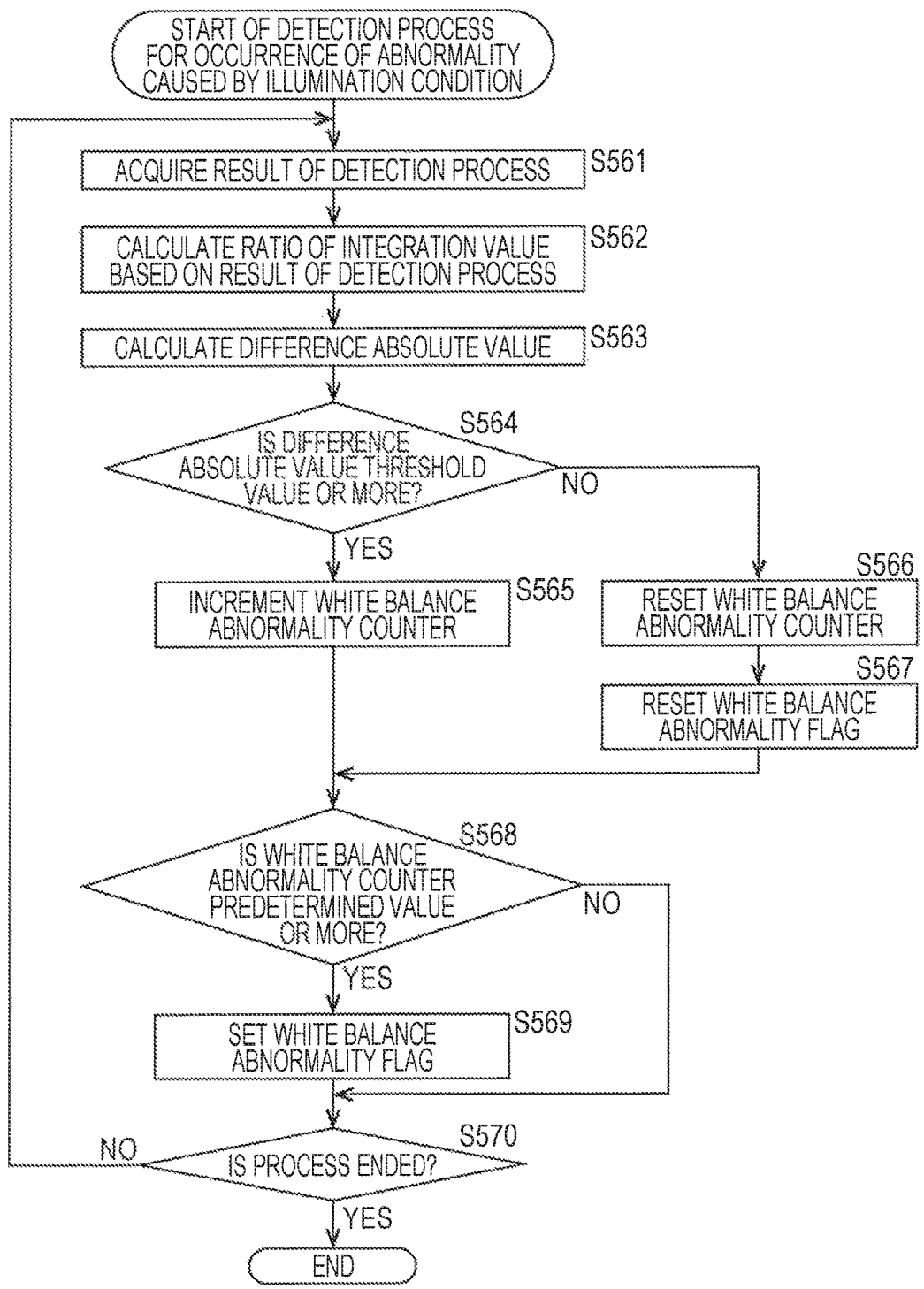
FIG. 23 is a flowchart for explaining a detection process for occurrence of abnormality caused by an illumination condition.

Next, the detection process for the occurrence of abnormality caused by the illumination condition performed by the warning generation device 201 will be described with reference to a flowchart of FIG. 23.

In step S561, the image quality control processing unit 78 acquires the result of the detection process performed in step S494 of FIG. 21 from the camera-control detection processing unit 76. More specifically, the integration values of the R, G, and B color components obtained for every divided area of the captured image are acquired.

If the result of the detection process is acquired, after that, the processes of steps S562 to S570 are performed, and the detection process for the occurrence of abnormality caused by the illumination condition is ended. The processes are similar to the processes of steps S112 to S120 of FIG. 9, and thus, the description thereof is omitted.

In the manner described above, the warning generation device 201 detects the occurrence of abnormality caused by the illumination condition and sets or resets the white balance abnormality flag based on the detection result for the color components.

<Description of Detection Process for Occurrence of Abnormality Caused by Imaging Distance>

Figure 24:
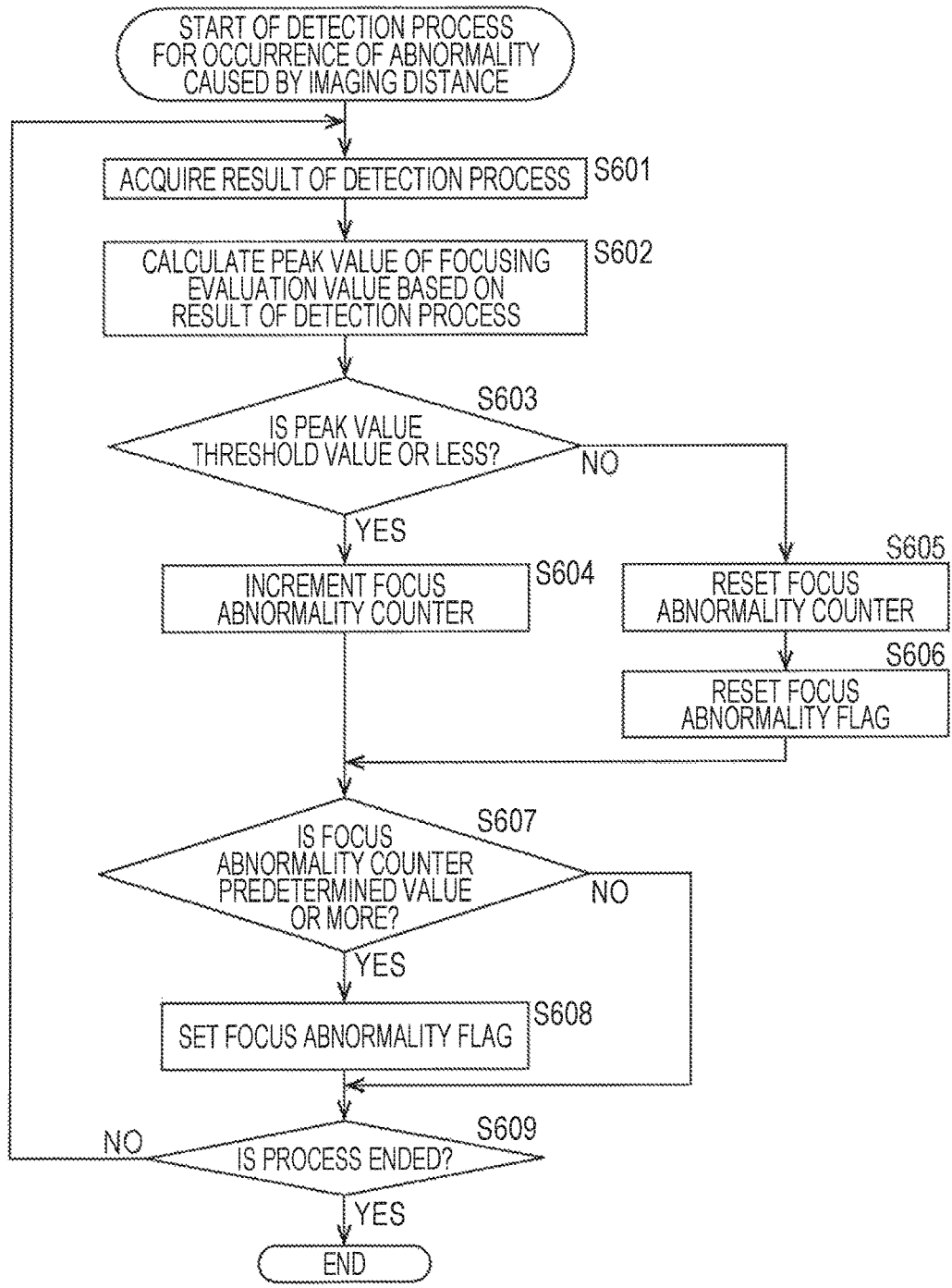
FIG. 24 is a flowchart for explaining a detection process for occurrence of abnormality caused by an imaging distance.

Next, the detection process for the occurrence of abnormality caused by the imaging distance performed by the warning generation device 201 will be described with reference to a flowchart of FIG. 24.

In step S601, the image quality control processing unit 78 acquires the result of the detection process performed in step S494 of FIG. 21 from the camera-control detection processing unit 76. More specifically, the focusing evaluation value of each divided area of the captured image is acquired.

In step S602, the image quality control processing unit 78 calculates the peak value of the focusing evaluation value based on the acquired result of the detection process. Namely, the image quality control processing unit 78 obtains, for example, the maximum value of the focusing evaluation value of a predetermined area such as a face area obtained from some number of most recent frames of the captured image as the peak value of the focusing evaluation value.

If the peak value of the focusing evaluation value is obtained, after that, the processes of steps S603 to S609 are performed, and the detection process for the occurrence of abnormality caused by the imaging distance is ended. The processes are similar to the processes of steps S154 to S160 of FIG. 10, and thus, the description thereof is omitted.

In the manner described above, the warning generation device 201 detects the occurrence of abnormality caused by the imaging distance and sets or resets the focus abnormality flag based on the detection result for the focus.

<Description of Detection Process for Occurrence of Abnormality Caused by Imaging Direction>

Figure 25:
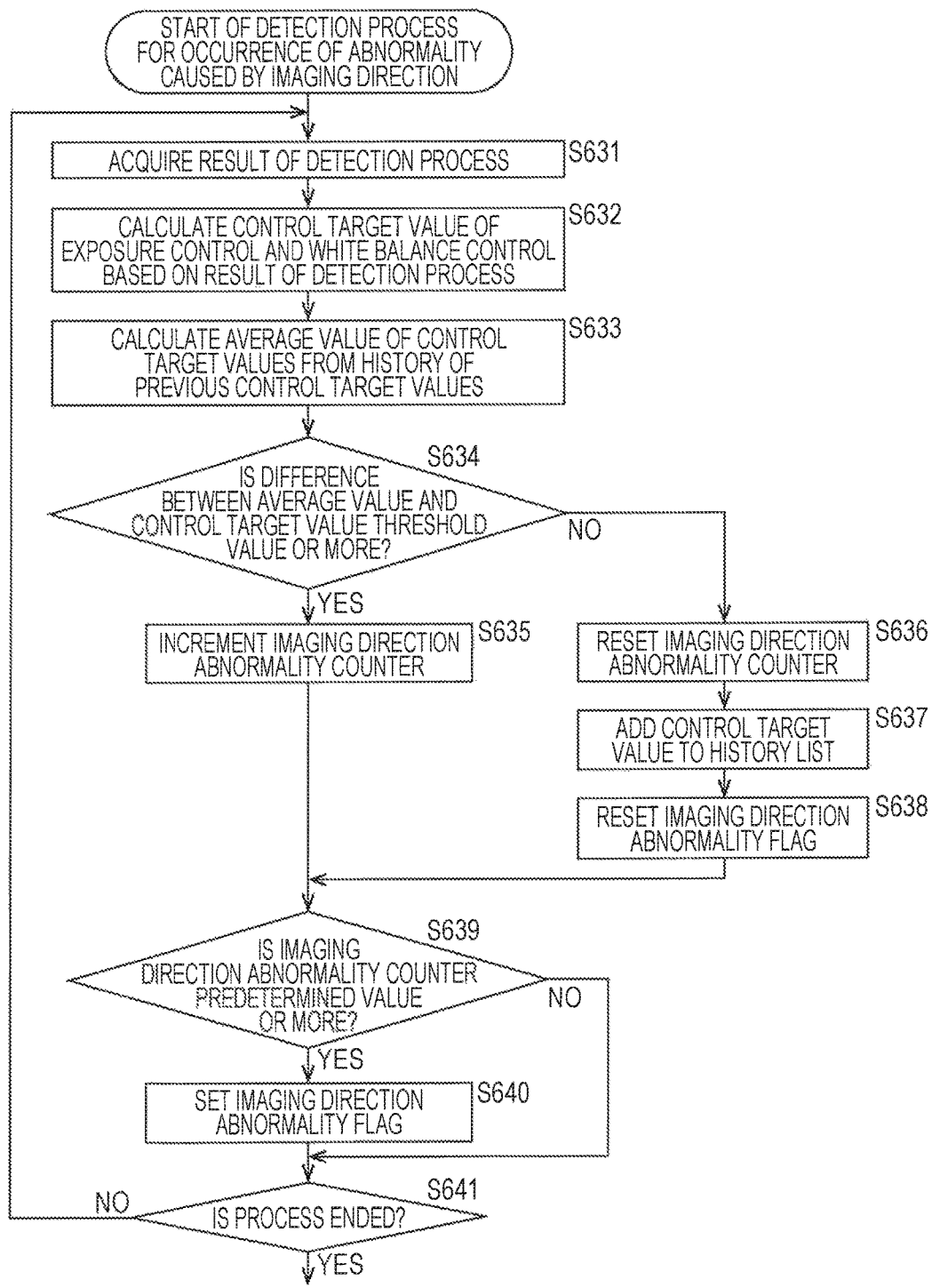
FIG. 25 is a flowchart for explaining a detection process for occurrence of abnormality caused by an imaging direction.

Next, the detection process for the occurrence of abnormality caused by the imaging direction performed by the warning generation device 201 will be described with reference to a flowchart of FIG. 25.

In step S631, the image quality control processing unit 78 acquires the result of the detection process performed in step S494 of FIG. 21 from the camera-control detection processing unit 76. More specifically, the integration value of the luminance values of each divided area of the captured image and the integration values of the respective color components of each divided area are acquired.

In step S632, the image quality control processing unit 78 calculates the control target value for the exposure control and the control target value for the white balance control based on the acquired result of the detection process. Namely, the process similar to that of step S232 of FIG. 12 is performed.

If the control target value is calculated, after that, the processes of steps S633 to S641 are performed, and the detection process for the occurrence of abnormality caused by the imaging direction is ended. The processes are similar to the processes of steps S234 to S242 of FIG. 12, and thus, the description thereof is omitted.

In the manner described above, the warning generation device 201 detects the occurrence of abnormality caused by the imaging direction and sets or resets the imaging direction abnormality flag based on the detection result.

<Description of Detection Process for Occurrence of Abnormality Caused by Face Loss>

Figure 26:
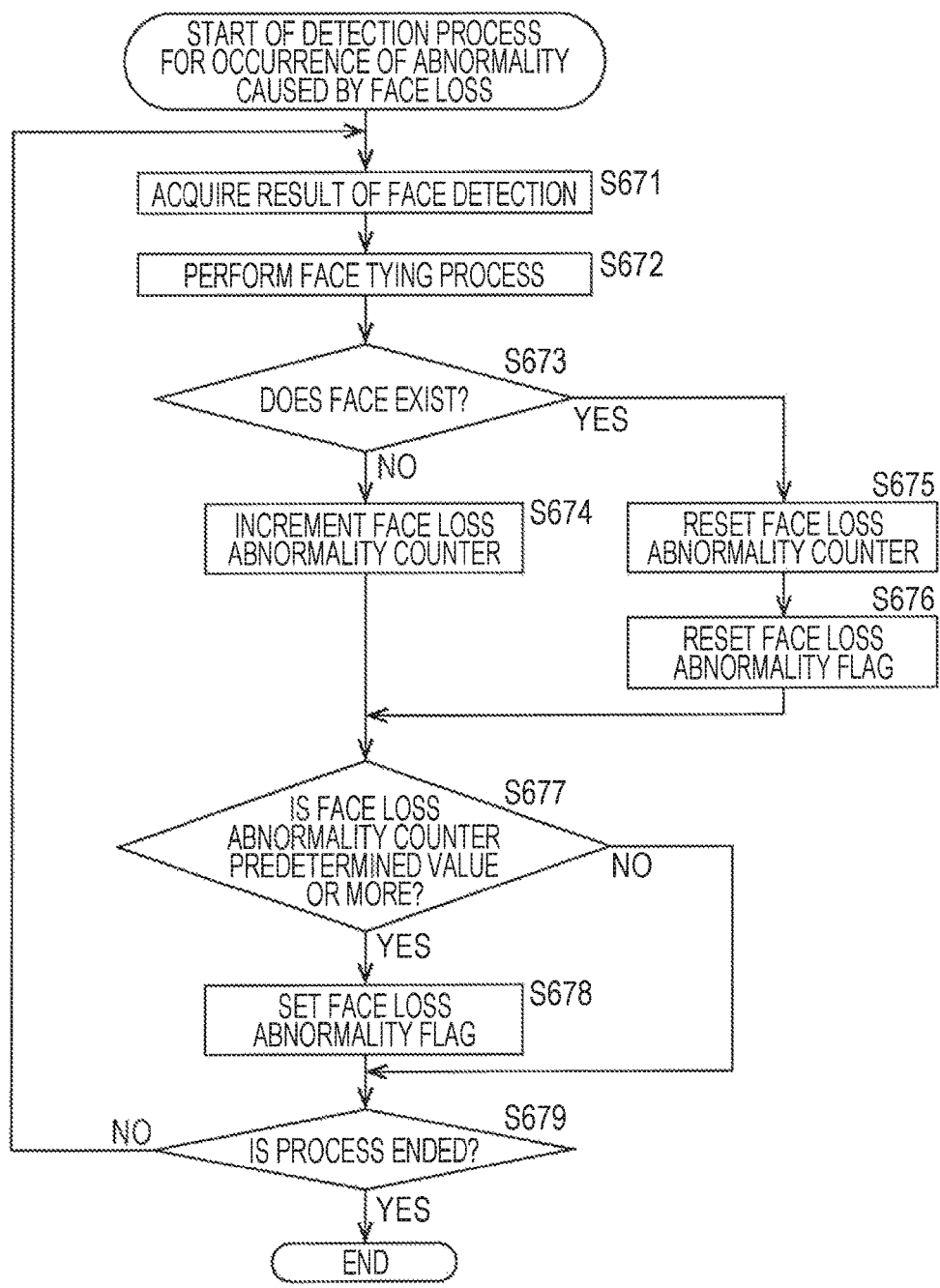
FIG. 26 is a flowchart for explaining a detection process for occurrence of abnormality caused by face loss.

Next, the detection process for the occurrence of abnormality caused by the face loss performed by the warning generation device 201 will be described with reference to a flowchart of FIG. 26.

In step S671, the image quality control processing unit 78 acquires the result of face detection performed in step S493 of FIG. 21 from the face detection processing unit 77.

If the result of face detection is acquired, after that, the processes of steps S672 to S679 are performed, and the detection process for the occurrence of abnormality caused by the face loss is ended. The processes are similar to the processes of steps S272 and S274 to S280 of FIG. 13, and thus, the description thereof is omitted. Furthermore, a weighting factor is set based on the detected area of the tracking target face, and the calculation of the control target value of the exposure control or the white balance control may be performed based on the weighting factor.

In the manner described above, the warning generation device 201 detects the abnormality caused by the face loss and sets or resets the face loss abnormality flag based on the result of face detection.

<Description of Warning Determination Process>

In addition, when the imaging device 11 performs the imaging process, while performing the process of detecting the occurrence of the abnormality corresponding to each cause described heretofore, the warning generation device 201 simultaneously performs the warning determination process to generate a warning flag according to the detection result for the occurrence of abnormality.

Figure 27:
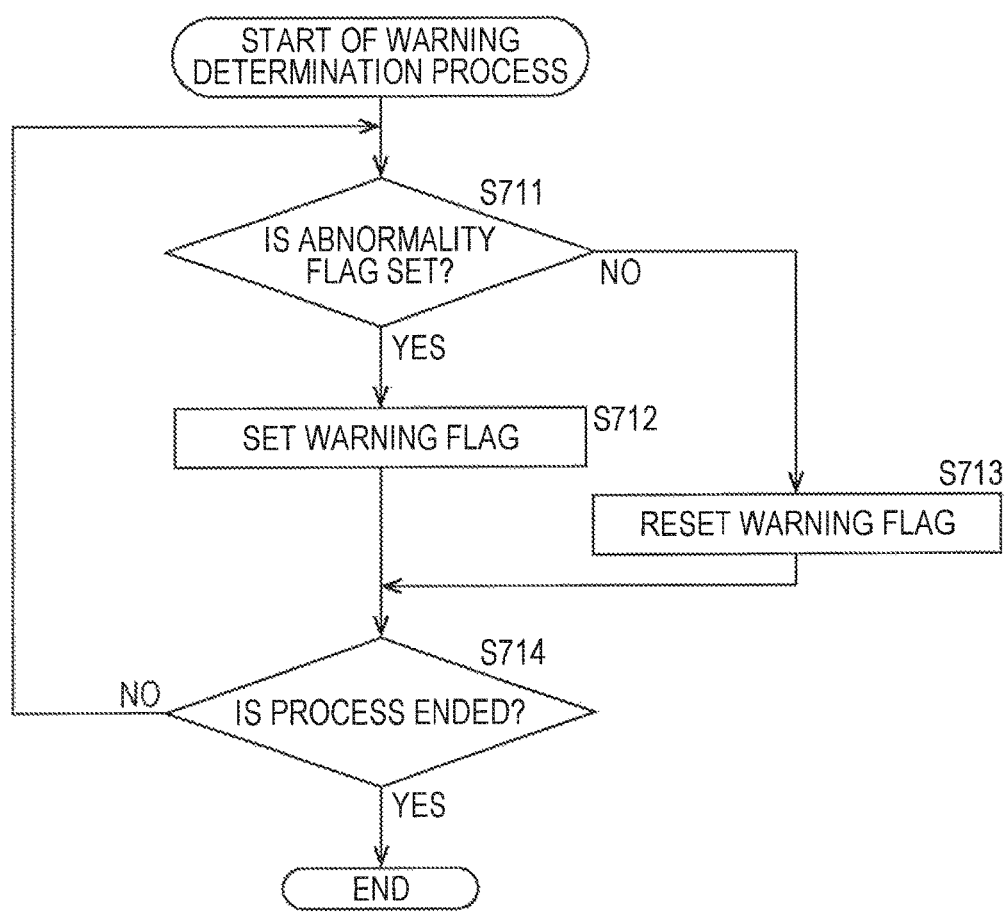
FIG. 27 is a flowchart for explaining a warning determination process.

Hereinafter, the warning determination process by the warning generation device 201 will be described with reference to a flowchart of FIG. 27. Furthermore, the warning determination process is performed for every abnormality flag.

Figure 15:
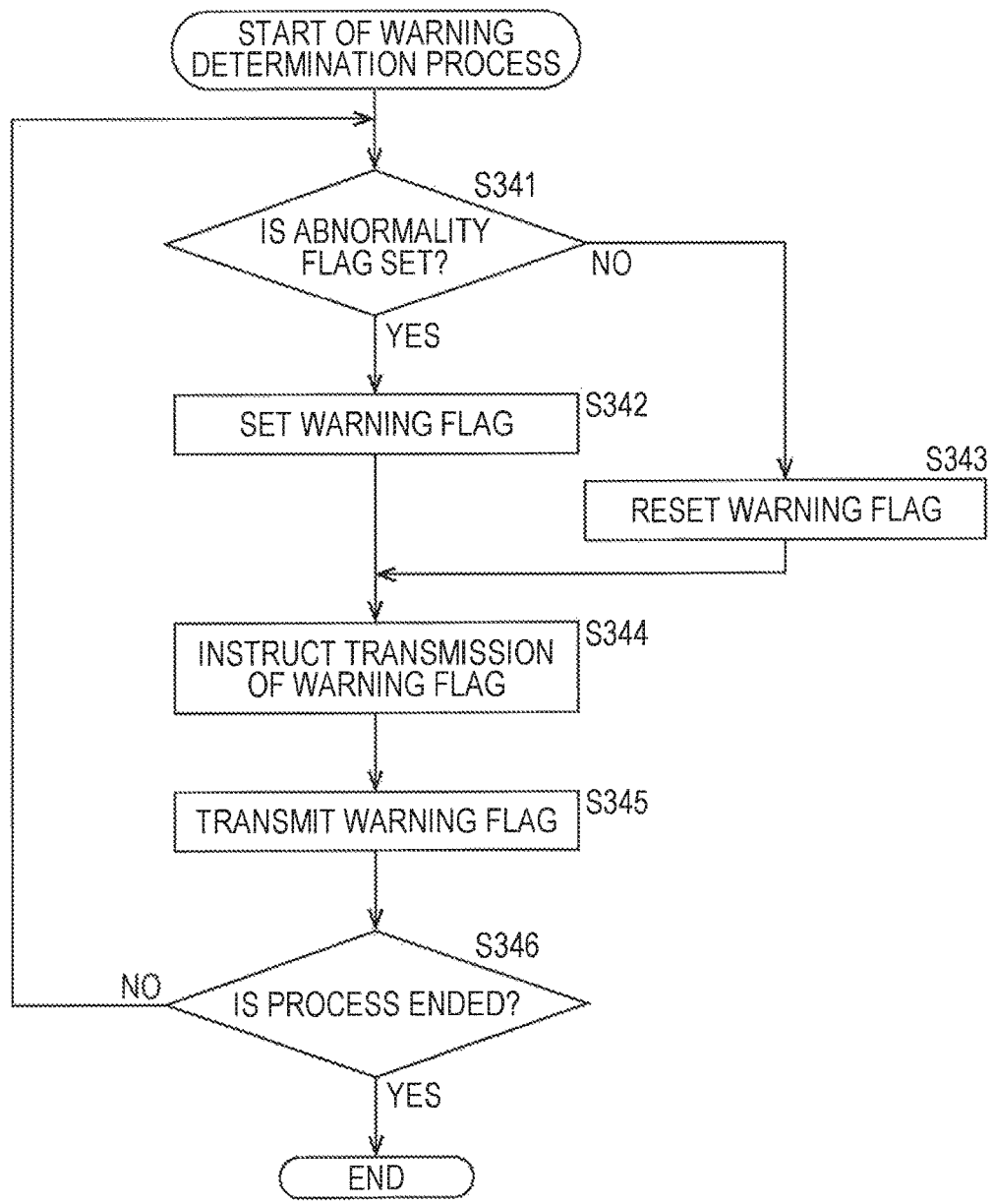
FIG. 15 is a flowchart for explaining a warning determination process.

In addition, the processes of steps S711 to S713 are similar to the processes of steps S341 to S343 of FIG. 15, and thus, the description thereof is omitted. By the processes, the warning flag is set or reset.

If the warning flag is set or reset, after that, the process of step S714 is performed, and the warning determination process is ended. The process of step S714 is similar to the process of step S346 of FIG. 15, and thus, the description thereof is omitted.

In the manner described above, the warning generation device 201 updates the warning flag based on the abnormality flag for every abnormality caused by each cause.

<Description of Warning Process>

Figure 28:
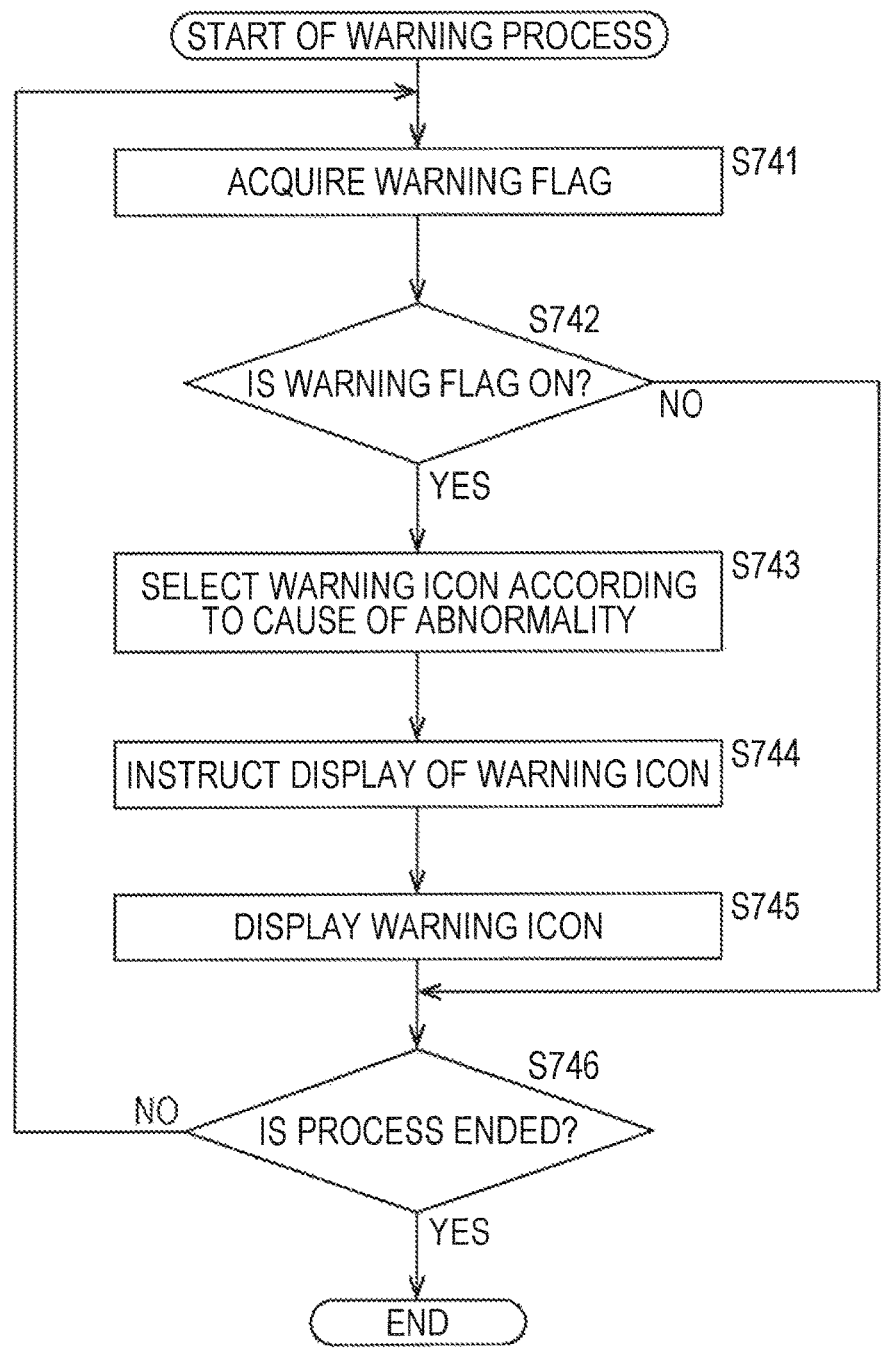
FIG. 28 is a flowchart for explaining a warning process.

Next, the warning process by the warning generation device 201 will be described with reference to a flowchart of FIG. 28. Furthermore, the warning process is performed for every cause of the occurrence of abnormality.

In step S741, the warning means control processing unit 105 acquires the warning flag from the warning determination processing unit 79 of the abnormality detection processing unit 211.

If the warning flag is acquired, after that, the processes of steps S742 to S746 are performed, and the warning process is ended. The processes are similar to the processes of steps S372 to S376 of FIG. 16, and thus, the description thereof is omitted.

In the manner described above, the warning generation device 201 issues warning according to the warning flag. Therefore, the user can more simply grasp imaging situation.

Modified Example 1 of Second Embodiment

Description of Warning Process

Figure 29:
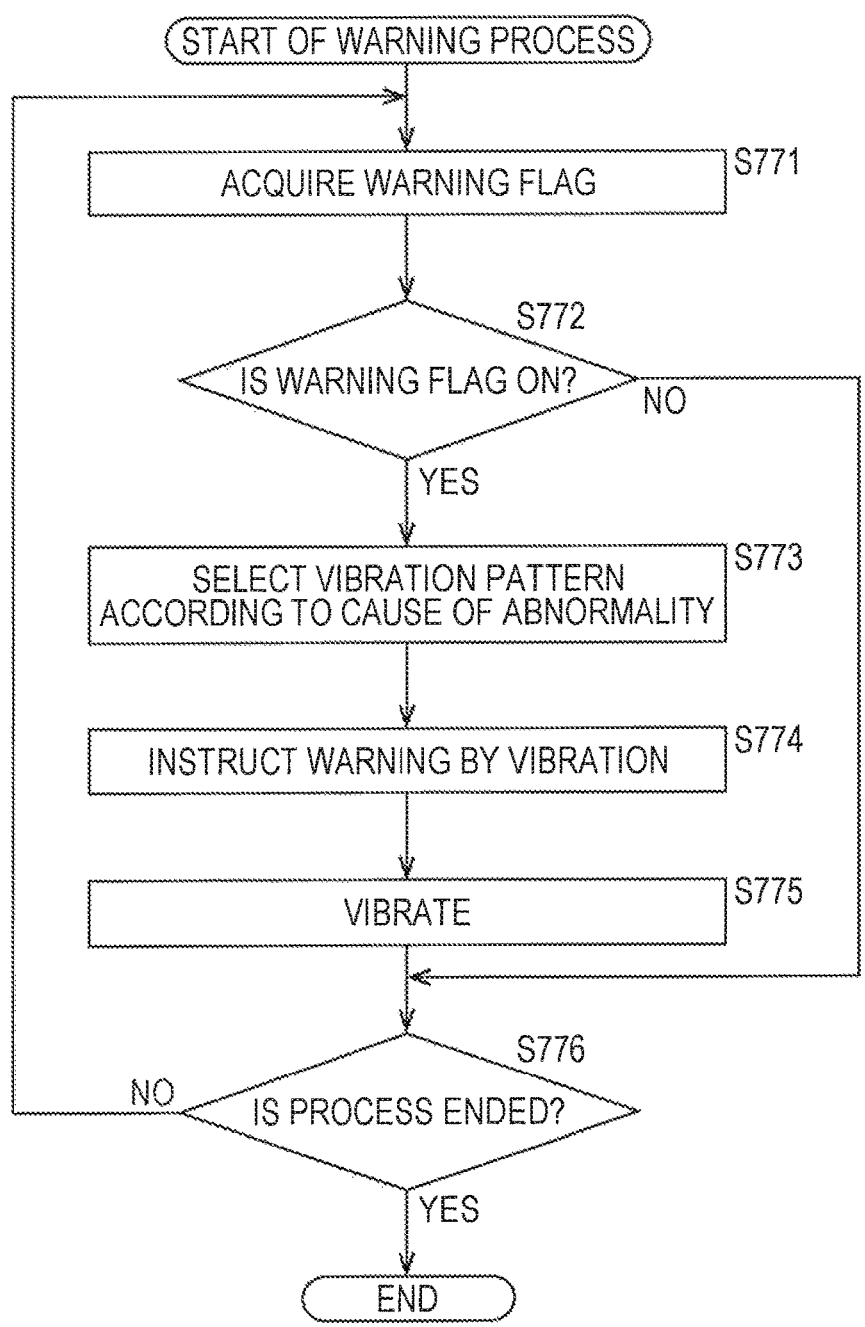
FIG. 29 is a flowchart for explaining a warning process.

Furthermore, as another method of issuing the warning to the user, warning by vibration may be configured to be performed. In this case, for example, a process illustrated in FIG. 29 is performed. Hereinafter, the warning process by vibration performed by the warning generation device 201 will be described with reference to a flowchart of FIG. 29.

In step S771, the warning means control processing unit 105 acquires the warning flag from the warning determination processing unit 79 of the abnormality detection processing unit 211.

If the warning flag is acquired, after that, the processes of steps S772 to S776 are performed, and the warning process is ended. The processes are similar to the processes of steps S402 to S406 of FIG. 17, and thus, the description thereof is omitted.

In the manner described above, the warning generation device 201 issues warning by vibration according to the warning flag. Therefore, the user can more simply grasp imaging situation.

Modified Example 2 of Second Embodiment

Description of Warning Process

Figure 30:
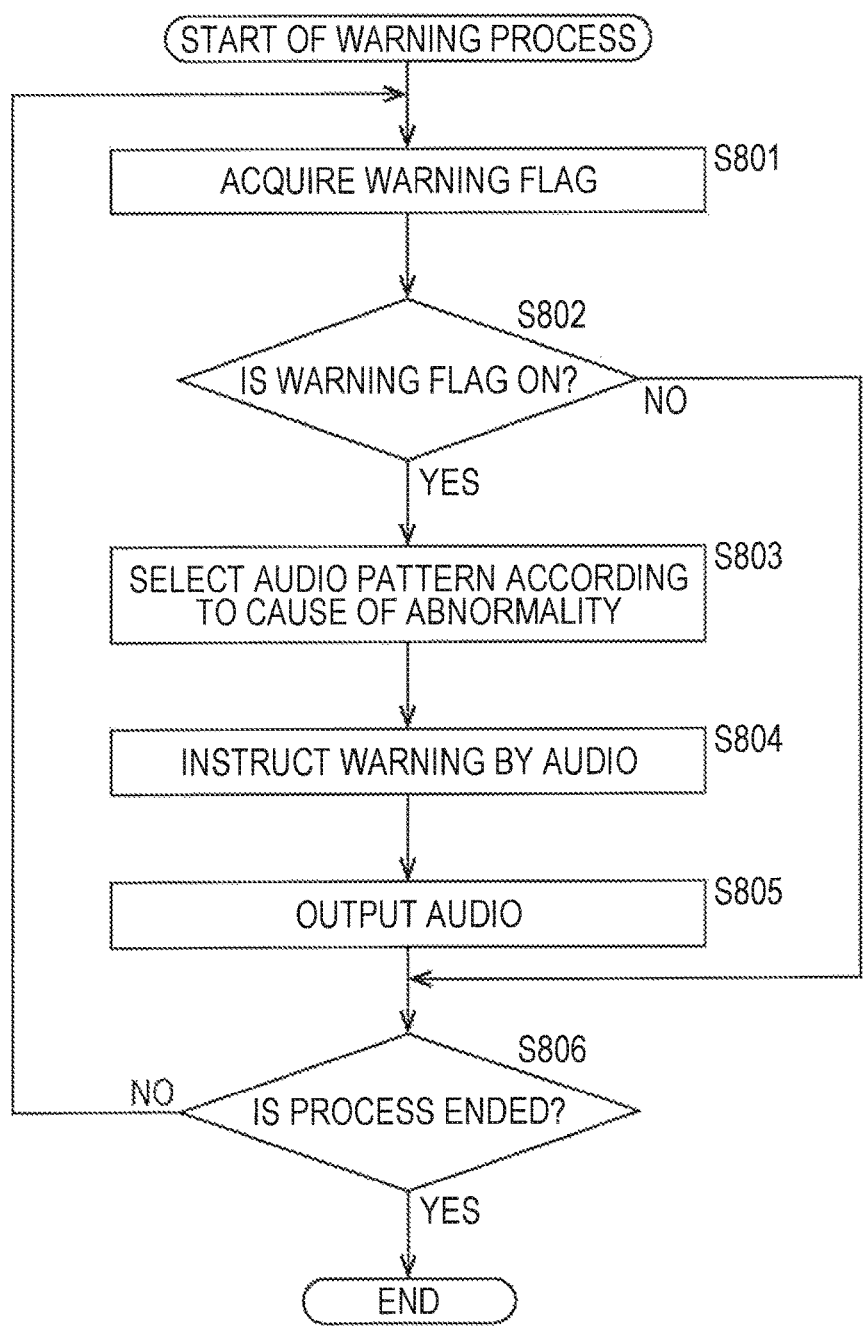
FIG. 30 is a flowchart for explaining a warning process.

In addition, as another method of issuing the warning to the user, warning by audio may be configured to be performed. In this case, for example, a process illustrated in FIG. 30 is performed. Hereinafter, the warning process by audio performed by the warning generation device 201 will be described with reference to a flowchart of FIG. 30.

In step S801, the warning means control processing unit 105 acquires the warning flag from the warning determination processing unit 79 of the abnormality detection processing unit 211.

If the warning flag is acquired, after that, the processes of steps S802 to S806 are performed, and the warning process is ended. The processes are similar to the processes of steps S432 to S436 of FIG. 18, and thus, the description thereof is omitted.

In the manner described above, the warning generation device 201 issues the warning by audio according to the warning flag. Therefore, the user can more simply grasp imaging situation.

Modified Example 3 of Second Embodiment

Description of Warning Process

Figure 31:
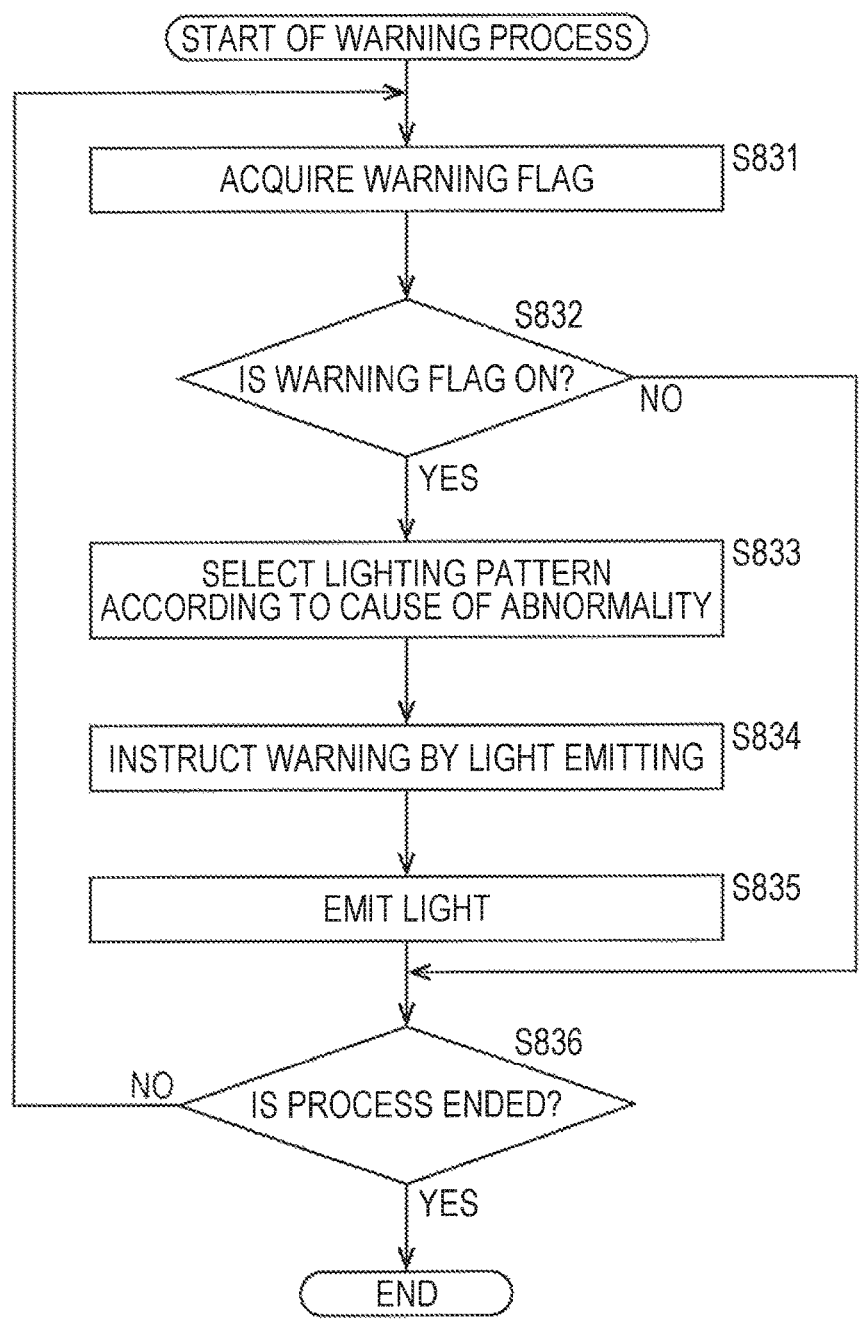
FIG. 31 is a flowchart for explaining a warning process.

In addition, as another method of issuing the warning to the user, warning by light may be configured to be performed. In this case, for example, a process illustrated in FIG. 31 is performed. Hereinafter, the warning process by lighting performed by the warning generation device 201 will be described with reference to a flowchart of FIG. 31.

In step S831, the warning means control processing unit 105 acquires the warning flag from the warning determination processing unit 79 of the abnormality detection processing unit 211.

If the warning flag is acquired, after that, the processes of steps S832 to S836 are performed, and the warning process is ended. The processes are similar to the processes of steps S462 to S466 of FIG. 19, and thus, the description thereof is omitted.

In the manner described above, the warning generation device 201 issues the warning by light according to the warning flag. Therefore, the user can more simply grasp imaging situation.

Third Embodiment

Configuration Example of Outer Appearance of Warning Generation Device

Furthermore, heretofore, although the example where the warning generation device 12 or the warning generation device 201 is configured with a mobile phone is described, any device having a display function can be used as the warning generation device.

Figure 32:
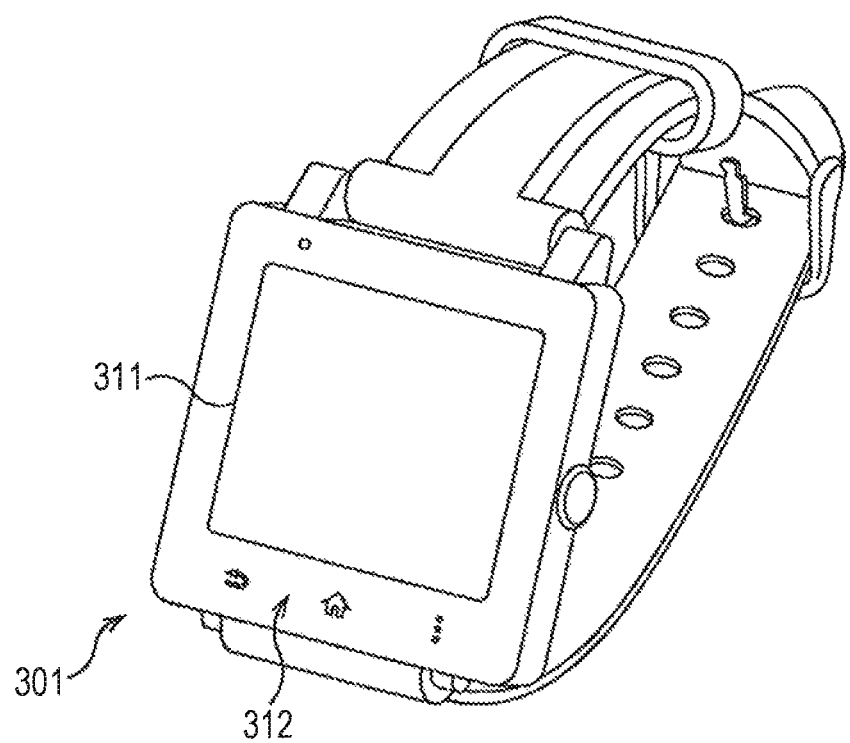
FIG. 32 is a diagram illustrating a configuration example of outer appearance of a warning generation device.

For example, as illustrated in FIG. 32, the warning generation device 12 or the warning generation device 201 may be configured with a multi-functional watch 301 having a display function and a communication function.

In this example, in the multi-functional watch 301, a display unit 311 configured with a liquid crystal panel and the like is installed, and in the lower side of the figure of the display unit 311, a button group 312 which is manipulated at the time of performing various types of manipulation is installed. In this case, for example, the multi-functional watch 301 receives the captured image from the imaging device 11 to display the captured image on the display unit 311 or receives the warning flag from the imaging device 11 to display a warning icon on the display unit 311. Furthermore, the multi-functional watch 301 may issue the warning by vibration, audio, or light.

Fourth Embodiment

Configuration Example of Outer Appearance of Warning Generation Device

Figure 33:
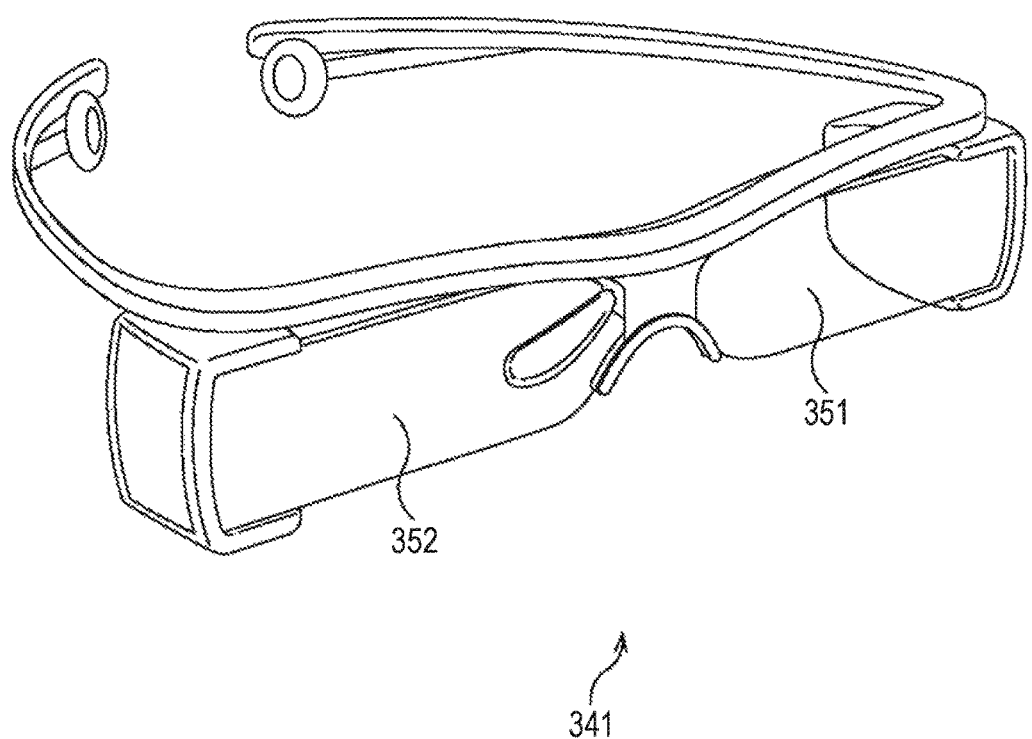
FIG. 33 is a diagram illustrating a configuration example of outer appearance of a warning generation device.

In addition, for example, as illustrated in FIG. 33, the warning generation device 12 or the warning generation device 201 may be configured with a glasses-type head-mounted display 341 having a display function and a communication function.

In this example, when the user wears the head-mounted display 341, the captured image or the warning icon is displayed on display units 351 and 352 which are disposed at positions opposite to user's left and right eyes. In addition, a button (not shown) is installed in a temple (frame) portion of the head-mounted display 341, and the button is manipulated by the user. Furthermore, the head-mounted display 341 may issue warning by vibration, audio, or light.

A series of the above-described processes may be performed by hardware or may be performed by software. In the case where a series of the processes is performed by software, a program constituting the software is installed in a computer.

Herein, the computer includes a computer incorporated in dedicated hardware, a computer where various types of programs are installed and, thus, various types of functions can be performed, for example, a general-purpose computer, or the like.

Figure 34:
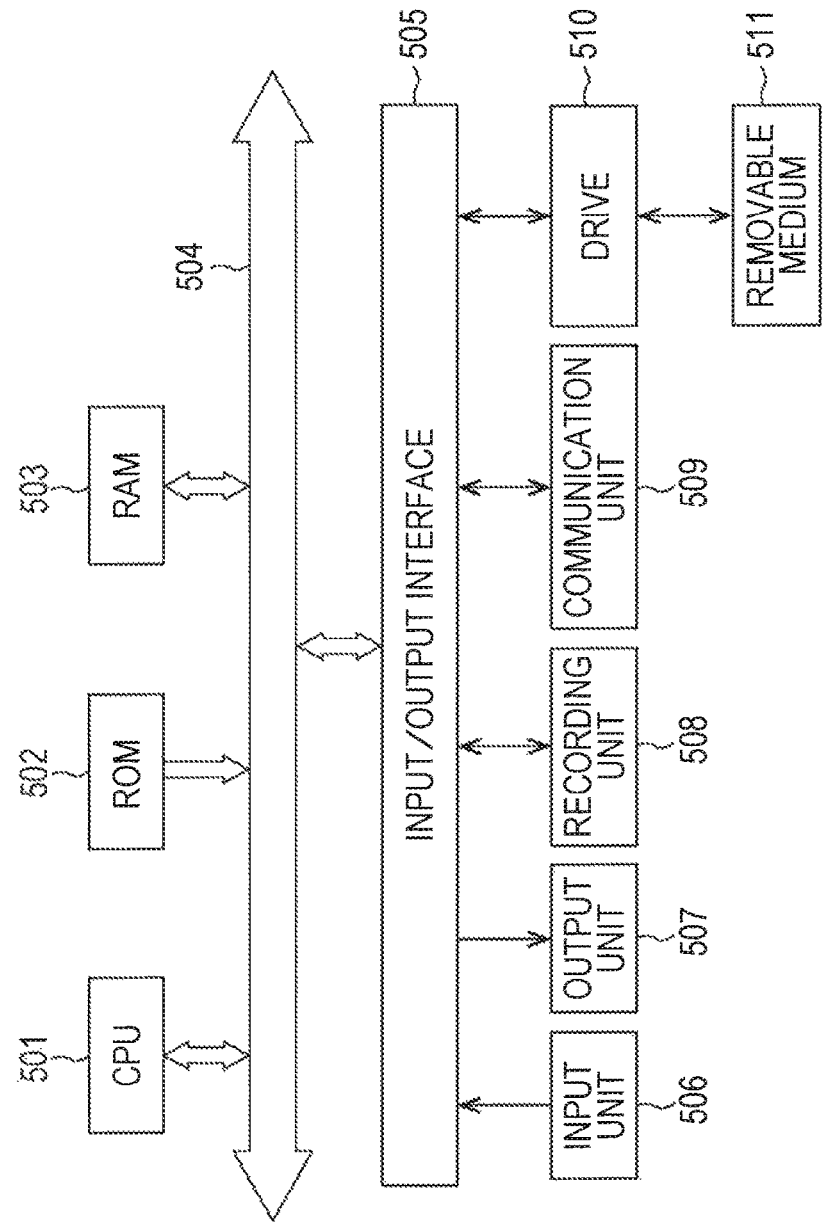
FIG. 34 is a diagram illustrating a configuration example of a computer.

FIG. 34 is a block diagram illustrating a configuration example of hardware of a computer which performs a series of the above-described processes by a program.

In the computer, a Central Processing Unit (CPU) 501, a Read Only Memory (ROM) 502, and a Random Access Memory (RAM) 503 are connected to each other via a bus 504.

In addition, an input/output interface 505 is connected to the bus 504. An input unit 506, an output unit 507, a recording unit 508, a communication unit 509, and a drive 510 are connected to the input/output interface 505.

The input unit 506 is configured with a keyboard, a mouse, a microphone, an imaging element, or the like. The output unit 507 is configured with a display, a speaker, or the like. The recording unit 508 is configured with a hard disk, a non-volatile memory, or the like. The communication unit 509 is configured with a network interface or the like. The drive 510 drives a removable medium 511 such as a magnetic disk, an optical disk, an opto-magnetic disk, or a semiconductor memory.

In the computer having the above-described configuration, for example, the CPU 501 loads the program recorded in the recording unit 508 on the RAM 503 through the input/output interface 505 and the bus 504 and executes the program to perform a series of the above-described processes.

The program executed by the computer (CPU 501) may be recorded in the removable medium 511, for example, a package medium or the like to be supplied. In addition, the program may be supplied through a wired or wireless transmission medium such as a local area network, the Internet, digital satellite broadcasting.

In the computer, the removable medium 511 is attached to the drive 510, so that the program can be installed in the recording unit 508 through the input/output interface 505. In addition, the program can be received by the communication unit 509 through the wired or wireless transmission medium to be installed in the recording unit 508. Besides, the program may be installed in the ROM 502 or the recording unit 508 in advance.

Furthermore, the program executed by the computer may be a program which is processed in a time sequence according to the order described in this specification or may be a program which is processed in parallel or at a necessary timing such as a calling time.

In addition, the embodiment of the present technology is not limited to the above-described embodiments, but various changes are available within the scope without departing from the spirit of the present technology.

For example, the present technology may adopt a cloud computing configuration where one function is shared by a plurality of devices via a network to be cooperatively processed.

In addition, the steps described in the above-described flowcharts may be shared to be performed by a plurality of devices in addition to the performing of one device.

In addition, in the case where a plurality of processes are included in one step, the plurality of processes included in the one step may be shared to be performed by a plurality of devices in addition to the performing of one device.

In addition, the effects disclosed in this specification are exemplary ones but not limited to ones, and thus, there may be other effects.

In addition, the present technology may have the following configurations.

(1)

An imaging system including:
an imaging device; and
a warning generation device,
wherein the imaging device includes:
an imaging unit which images an image to be captured;
a detection unit which monitors an imaging situation of the captured image and detects abnormality associated with the imaging situation; and
a transmission unit which transmits information representing a detection result of the abnormality to the warning generation device, and the warning generation device includes:

a reception unit which receives the information representing the detection result of the abnormality transmitted from the transmission unit;

a warning means control processing unit which instructs warning based on the information representing the detection result of the abnormality; and a warning unit which issues the warning according to the instruction of the warning by the warning means control processing unit.

(2)

A warning generation device including:

a reception unit which receives information which is transmitted from an imaging device imaging an image to be captured and represents a detection result of abnormality associated with an imaging situation of the captured image;

a warning means control processing unit which instructs warning based on the information representing the detection result of the abnormality; and a warning unit which issues the warning according to the instruction of the warning by the warning means control processing unit.

(3)

The warning generation device according to (2), wherein the warning unit issues the warning which is different according to types of the abnormality.

(4)

The warning generation device according to (2)or (3), wherein the abnormality associated with the imaging situation is at least one of abnormality associated with exposure control, abnormality associated with white balance control, abnormality associated with focus control, abnormality associated with hand shaking correction, abnormality associated with imaging direction, abnormality associated with face detection, and abnormality associated with battery.

(5)

The warning generation device according to any one of (2) to (4), wherein the warning unit issues the warning by performing warning display.

(6)

The warning generation device according to any one of (2) to (4), wherein the warning unit issues the warning by outputting audio.

(7)

The warning generation device according to any one of (2) to (4), wherein the warning unit issues the warning by vibrating.

(8)

The warning generation device according to any one of (2) to (4), wherein the warning unit issues the warning by emitting light.

(9)

The warning generation device according to any one of (2) to (8), wherein the reception unit further receives the captured image from the imaging device, and the warning generation device further includes a display unit which displays the captured image.

(10)

The warning generation device according to any one of (2) to (9), wherein the reception unit receives information representing the detection result of the abnormality in a wireless manner.

(11)

A warning generating method including:

a reception step of receiving information which is transmitted from an imaging device imaging an image to be captured and represents a detection result of abnormality associated with an imaging situation of the captured image;

a warning means control processing step of instructing warning based on the information representing the detection result of the abnormality; and a warning step of issuing the warning according to the instruction of the warning by the warning means control processing step.

(12)

A program allowing a computer to execute processes including:

a reception step of receiving information which is transmitted from an imaging device imaging an image to be captured and represents a detection result of abnormality associated with an imaging situation of the captured image;

a warning means control processing step of instructing warning based on the information representing the detection result of the abnormality; and a warning step of issuing the warning according to the instruction of the warning by the warning means control processing step.

(13)

An imaging device including:

an imaging unit which images an image to be captured;

a detection unit which monitors an imaging situation of the captured image and detects abnormality associated with the imaging situation; and a transmission unit which transmits information representing a detection result of the abnormality to the warning generation device.

(14)

An imaging method including:

an imaging step of imaging an image to be captured;

a detection step of monitoring an imaging situation of the captured image and detecting abnormality associated with the imaging situation; and a transmission step of transmitting information representing a detection result of the abnormality to a warning generation device which issues warning of occurrence of the abnormality.

(15)

A program allowing a computer to execute processes including:

an imaging step of imaging a captured image;

a detection step of monitoring an imaging situation of the captured image and detecting abnormality associated with the imaging situation; and a transmission step of transmitting information representing a detection result of the abnormality to a warning generation device which issues warning of occurrence of the abnormality.

REFERENCE SIGNS LIST

11 Imaging device
12 Warning generation device
31 Display unit
63 User interface
69 Wireless transmission unit
76 Camera-control detection processing unit
77 Face detection processing unit
78 Image quality control processing unit
79 Warning determination processing unit
91 Wireless reception unit
94 Vibration unit
95 Speaker
96 Light-emitting element 101 Display processing unit
102 Vibration driving processing unit
103 Speaker driving processing unit
104 Light-emitting element driving processing unit
105 Warning means control processing unit

The invention claimed is:

1. An imaging system comprising:
an imaging device having a first housing, the first housing including
an imaging sensor configured to capture an image,
a detection circuitry configured to
monitor a plurality of imaging characteristics of the image that is captured, and
detect one or more abnormalities in the plurality of imaging characteristics that is monitored, and
a transmission circuitry configured to transmit information indicative of the one or more abnormalities that are detected; and
a warning generation device having a second housing different than the first housing, the second housing including
a reception circuitry configured to receive the information indicative of the one or more abnormalities that are detected,
a processing circuitry configured to generate one or more warning instructions based on the information indicative of the one or more abnormalities that are detected; and
a warning circuitry configured to issue one or more warnings based on the one or more warning instructions that are generated, the one or more warnings indicating the one or more abnormalities in the plurality of imaging characteristics to a user of the imaging device.

2. The imaging system according to claim 1, wherein, to monitor the plurality of imaging characteristics of the image that is captured, the detection circuitry is further configured to simultaneously monitor each imaging characteristic of the plurality of imaging characteristics of the image that is captured.

3. A warning generation device comprising:
a first housing, the first housing including
a reception circuitry configured to receive information indicative of one or more abnormalities in a plurality of imaging characteristics of an image that is captured by an imaging sensor of an imaging device having a second housing that is different than the first housing;
a processing circuitry configured to generate one or more warning instructions based on the information indicative of the one or more abnormalities in the plurality of imaging characteristics of the image that is captured by the imaging sensor; and
a warning circuitry configured to issue one or more warnings based on the one or more warning instructions that are generated, the one or more warnings indicating the one or more abnormalities in the plurality of imaging characteristics to a user of the imaging device.

4. The warning generation device according to claim 3, wherein the one or more warnings is a plurality of warnings, wherein each of the plurality of warnings corresponds to and is indicative of only one of the plurality of imaging characteristics.

5. The warning generation device according to claim 3, wherein the plurality of imaging characteristics includes at least two selected from a group consisting essentially of:
an exposure control,
a white balance control,
a focus control,
a hand shaking correction,
an imaging direction, and
a face detection.

6. The warning generation device according to claim 3, further comprising a display unit, and wherein, to issue the one or more warnings, the warning circuitry is further configured to display the one or more warnings with the display unit.

7. The warning generation device according to claim 3, further comprising a speaker, and wherein, to issue the one or more warnings, the warning circuitry is further configured to output audio with the speaker.

8. The warning generation device according to claim 3, further comprising a vibration device, and wherein, to issue the one or more warnings, the warning circuitry is further configured to control the vibration device to vibrate.

9. The warning generation device according to claim 3, further comprising a light source, and wherein, to issue the one or more warnings, the warning circuitry is further configured to control the light source to emit light.

10. The warning generation device according to claim 3, further comprising:
a display unit,
wherein the reception circuitry is further configured to receive the image that is captured by the imaging sensor, and
the display unit is configured to
display the image that is captured by the imaging sensor, and
display the one or more warnings.

11. The warning generation device according to claim 3, wherein the reception circuitry is a wireless receiver, and wherein the wireless receiver is configured to wirelessly receive the information indicative of the one or more abnormalities in the plurality of imaging characteristics.

12. The warning generation device according to claim 3, wherein the information indicative of the one or more abnormalities in the plurality of imaging characteristics of the image is based on simultaneously monitoring each imaging characteristic of the plurality of imaging characteristics of the image that is captured.

13. A warning generating method, the method comprising:
receiving, with a reception circuitry of a warning device having a first housing, information indicative of one or more abnormalities in a plurality of imaging characteristics of an image that is captured by an imaging sensor of an imaging device having a second housing that is different than the first housing;
generating one or more warning instructions based on the information indicative of the one or more abnormalities in the plurality of imaging characteristics of the image that is captured by the imaging sensor; and
issuing one or more warnings based on the one or more warning instructions that are generated, the one or more warnings indicating the one or more abnormalities in the plurality of imaging characteristics to a user of the imaging device.

14. The warning generating method according to claim 13, wherein the plurality of imaging characteristics includes at least two selected from a group consisting essentially of:
an exposure control,
a white balance control,
a focus control, a hand shaking correction,
an imaging direction, and
a face detection.

15. A non-transitory computer-readable medium comprising a program that, when executed by a processing circuitry of warning device having a first housing, causes the processing circuitry to perform a set of operations comprising:
receiving information indicative of one or more abnormalities in a plurality of imaging characteristics of an image that is captured by an imaging sensor of an imaging device having a second housing that is different than the first housing;
generating one or more warning instructions based on the information indicative of the one or more abnormalities in the plurality of imaging characteristics of the image that is captured by the imaging sensor; and
issuing one or more warnings based on the one or more warning instructions that are generated, the one or more warnings indicating the one or more abnormalities in the plurality of imaging characteristics to a user of the imaging device.

16. The non-transitory computer-readable medium according to claim 15, wherein the plurality of imaging characteristics includes at least two selected from a group consisting essentially of:
an exposure control,
a white balance control,
a focus control,
a hand shaking correction,
an imaging direction, and
a face detection.

17. An imaging device comprising:
a first housing including
an imaging sensor configured to capture an image;
a detection circuitry configured to
monitor a plurality of imaging characteristics of the image that is captured, and
detect one or more abnormalities in the plurality of imaging characteristics that is monitored, and
a transmission circuitry configured to transmit information indicative of the one or more abnormalities that are detected to a warning generation device having a second housing that is different than the first housing,
wherein the plurality of imaging characteristics includes at least three selected from a group consisting essentially of:
an exposure control,
a white balance control,
a focus control,
a hand shaking correction,
an imaging direction, and
a face detection.

18. An imaging method, the method comprising:
capturing, with an imaging sensor of an imaging device having a first housing, an image;
monitoring a plurality of imaging characteristics of the image that is captured;
detecting one or more abnormalities in the plurality of imaging characteristics that is monitored; and
transmitting information indicative of the one or more abnormalities that are detected to a warning generation device having a second housing that is different than the first housing,
wherein the plurality of imaging characteristics includes at least three selected from a group consisting essentially of:
an exposure control,
a white balance control,
a focus control,
a hand shaking correction,
an imaging direction, and
a face detection.

19. A non-transitory computer-readable medium comprising a program, that when executed by a processing circuitry of a imaging device having a first housing, causes the processing circuitry to perform a set of operations comprising:
capturing an image;
monitoring a plurality of imaging characteristics of the image that is captured;
detecting one or more abnormalities in the plurality of imaging characteristics that is monitored; and
transmitting information indicative of the one or more abnormalities that are detected to a warning generation device having a second housing that is different than the first housing,
wherein the plurality of imaging characteristics includes at least three selected from a group consisting essentially of:
an exposure control,
a white balance control,
a focus control,
a hand shaking correction,
an imaging direction, and
a face detection.

* * * * *